(12) United States Patent
Chu et al.

(10) Patent No.: US 9,511,329 B2
(45) Date of Patent: Dec. 6, 2016

(54) HIGH FLUX HIGH EFFICIENCY NANOFIBER MEMBRANES AND METHODS OF PRODUCTION THEREOF

(71) Applicant: The Research Foundation for The State University of New York, Albany, NY (US)

(72) Inventors: Benjamin Chu, Stony Brook, NY (US); Benjamin S. Hsiao, Stony Brook, NY (US); Hongyang Ma, Stony Brook, NY (US)

(73) Assignee: The Research Foundation for The State University of New York, Albany, NY (US)

( * ) Notice: Subject to any disclaimer, the term of this patent is extended or adjusted under 35 U.S.C. 154(b) by 26 days.

(21) Appl. No.: 14/676,107

(22) Filed: Apr. 1, 2015

(65) Prior Publication Data

US 2015/0298065 A1  Oct. 22, 2015

Related U.S. Application Data

(62) Division of application No. 13/123,097, filed as application No. PCT/US2009/059884 on Oct. 7, 2009, now abandoned.

(60) Provisional application No. 61/153,666, filed on Feb. 19, 2009, provisional application No. 61/153,669, (Continued)

(51) Int. Cl.
  *B01D 39/00* (2006.01)
  *B01D 39/14* (2006.01)
  (Continued)

(52) U.S. Cl.
  CPC ........... *B01D 69/10* (2013.01); *B01D 39/1615* (2013.01); *B01D 39/1623* (2013.01); *B01D 39/18* (2013.01); *B01D 67/0002* (2013.01); *B01D 71/12* (2013.01); *B01D 71/38* (2013.01); *D01D 5/0084* (2013.01); *D01F 2/00* (2013.01);

(Continued)

(58) Field of Classification Search
  None
  See application file for complete search history.

(56) References Cited

U.S. PATENT DOCUMENTS

| 5,401,588 A | 3/1995 | Garvey et al. |
| 6,156,086 A | 12/2000 | Zhang |

(Continued)

FOREIGN PATENT DOCUMENTS

| JP | 2008001728 | 1/2008 |
| JP | 2008104931 | 5/2008 |

(Continued)

OTHER PUBLICATIONS

PCT/ISA/237 Written Opinion issued on PCT/US2009/059884 (4pp.).

*Primary Examiner* — Joseph Drodge
*Assistant Examiner* — Clare Perrin
(74) *Attorney, Agent, or Firm* — The Farrell Law Firm, P.C.

(57) ABSTRACT

A membrane is provided including a coating layer having cellulose nanofibers produced from oxidized cellulose microfibers and an electrospun substrate upon which the coating layer is applied. The nanofibers of the electrospun substrate have a diameter greater than that of the cellulose nanofibers. The membrane also has non-woven support upon which the electrospun substrate is disposed. Microfibers of the non-woven support have a diameter greater than that of the nanofibers of the electrospun substrate. Application of electrospun membrane is in microfiltration area, while the cellulose nanofiber membrane serves in ultrafiltration, nanofiltration, and reverse osmosis after chemical modification.

1 Claim, 53 Drawing Sheets

Related U.S. Application Data filed on Feb. 19, 2009, provisional application No. 61/146,939, filed on Jan. 23, 2009, provisional application No. 61/103,479, filed on Oct. 7, 2008.

(51) Int. Cl.

| | | |
|---|---|---|
| *B01D 71/10* | (2006.01) | |
| *C08J 7/04* | (2006.01) | |
| *B01D 69/10* | (2006.01) | |
| *B01D 39/16* | (2006.01) | |
| *B01D 39/18* | (2006.01) | |
| *B01D 67/00* | (2006.01) | |
| *B01D 71/12* | (2006.01) | |
| *D01D 5/00* | (2006.01) | |
| *D01F 2/00* | (2006.01) | |
| *D01F 2/24* | (2006.01) | |
| *D06M 13/123* | (2006.01) | |
| *D06M 15/263* | (2006.01) | |
| *D06M 17/00* | (2006.01) | |
| *B01D 71/38* | (2006.01) | |
| *B01D 24/00* | (2006.01) | |
| *C08F 2/46* | (2006.01) | |
| *C08J 7/18* | (2006.01) | |
| *B05D 5/00* | (2006.01) | |

(52) U.S. Cl.
CPC .............. *D01F 2/24* (2013.01); *D06M 13/123* (2013.01); *D06M 15/263* (2013.01); *D06M 17/00* (2013.01); *B01D 2239/025* (2013.01); *B01D 2239/0478* (2013.01); *B01D 2239/0631* (2013.01); *B01D 2239/0654* (2013.01); *B01D 2239/10* (2013.01); *B01D 2239/1208* (2013.01); *B01D 2239/1216* (2013.01); *B01D 2239/1233* (2013.01); *B01D 2323/39* (2013.01); *Y10T 428/2495* (2015.01); *Y10T 428/249921* (2015.04)

(56) References Cited

U.S. PATENT DOCUMENTS

| | | | |
|---|---|---|---|
| 6,315,805 B1 | 11/2001 | Strauss | |
| 6,521,321 B2 | 2/2003 | Kahlbaugh et al. | |
| 6,783,937 B1 * | 8/2004 | Hou | B01D 15/362 210/483 |
| 7,390,760 B1 * | 6/2008 | Chen | A61F 13/514 442/340 |
| 2001/0040136 A1 * | 11/2001 | Wei | B01D 39/1607 210/767 |
| 2004/0241436 A1 | 12/2004 | Hsieh et al. | |
| 2008/0110342 A1 | 5/2008 | Ensor et al. | |
| 2008/0149561 A1 | 6/2008 | Chu et al. | |
| 2009/0123700 A1 * | 5/2009 | Conley | A41D 31/02 428/152 |
| 2010/0216211 A1 * | 8/2010 | Shauer | A61L 27/20 435/183 |

FOREIGN PATENT DOCUMENTS

| | | |
|---|---|---|
| WO | WO 03064006 | 8/2003 |
| WO | WO 2007001405 | 1/2007 |

* cited by examiner

6%

8%

10%

12%

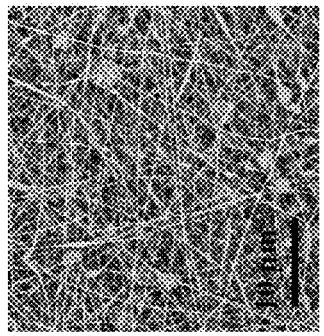
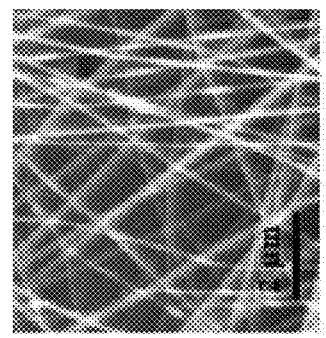
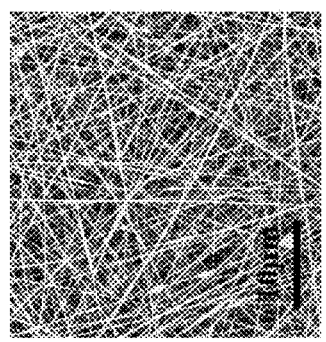
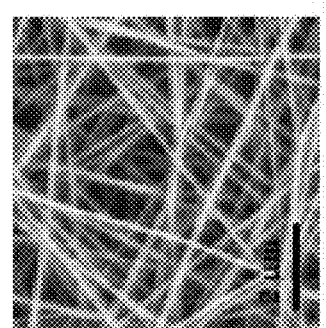
FIG. 10
FIG. 11
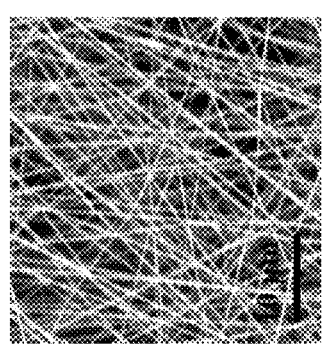
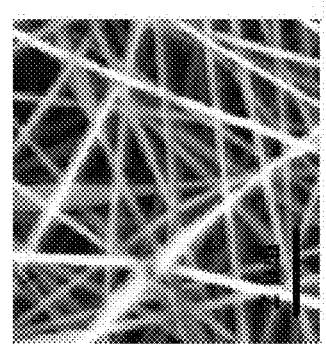

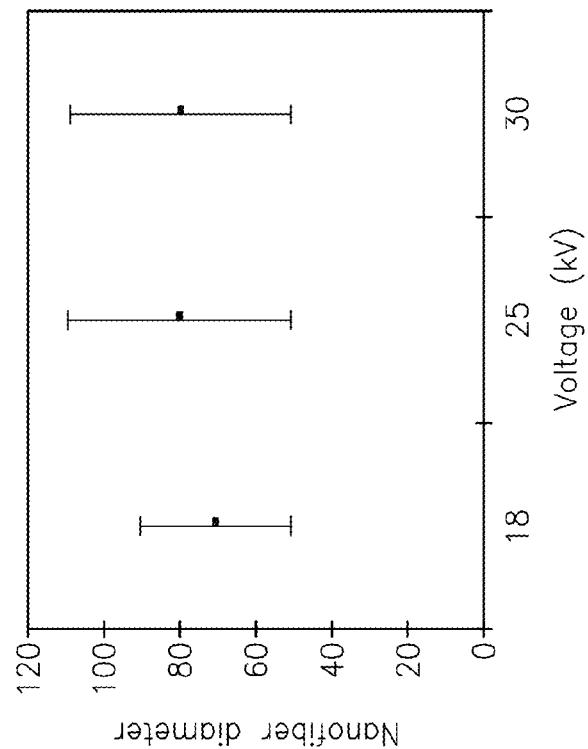
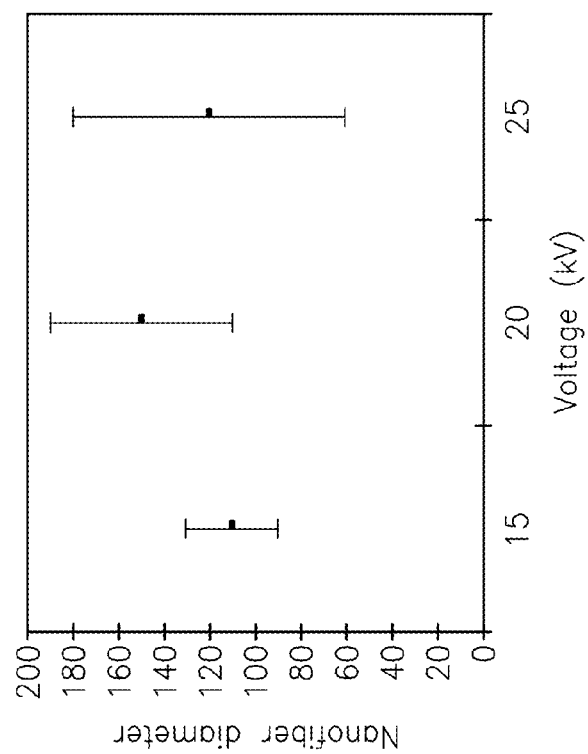
FIG. 12(a)
FIG. 12(b)

| NaClO (mmol/g cellulose) | Yield (%) | SEM images (The scale is 300μm) | NaClO (mmol/g cellulose) | Yield (%) | SEM images (The scale is 300μm) |
|---|---|---|---|---|---|
| 0 | 100.0 | | 7.5 | 95.0 | |
| 1.25 | 94.8 | | 10 | 92.3 | |
| 2.5 | 95.3 | | 20 | 88.4 | |
| 5.0 | 95.3 | | 30 | 78.5 | |

FIG. 20

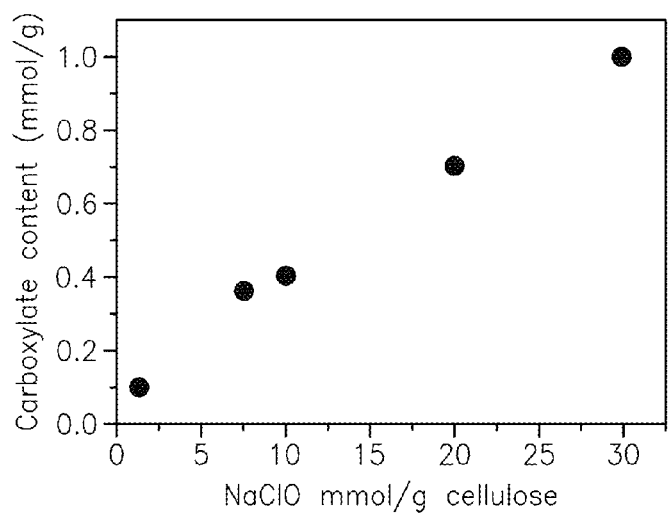
FIG. 21
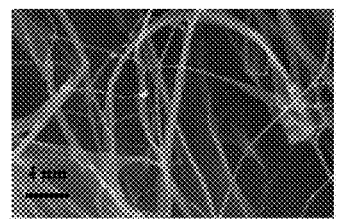 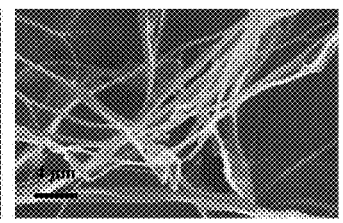
FIG. 22(a)  FIG. 22(b)  FIG. 22(c)
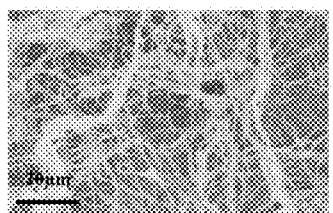  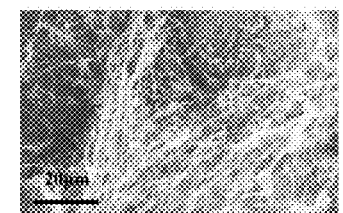
FIG. 22(d)  FIG. 22(e)  FIG. 22(f)

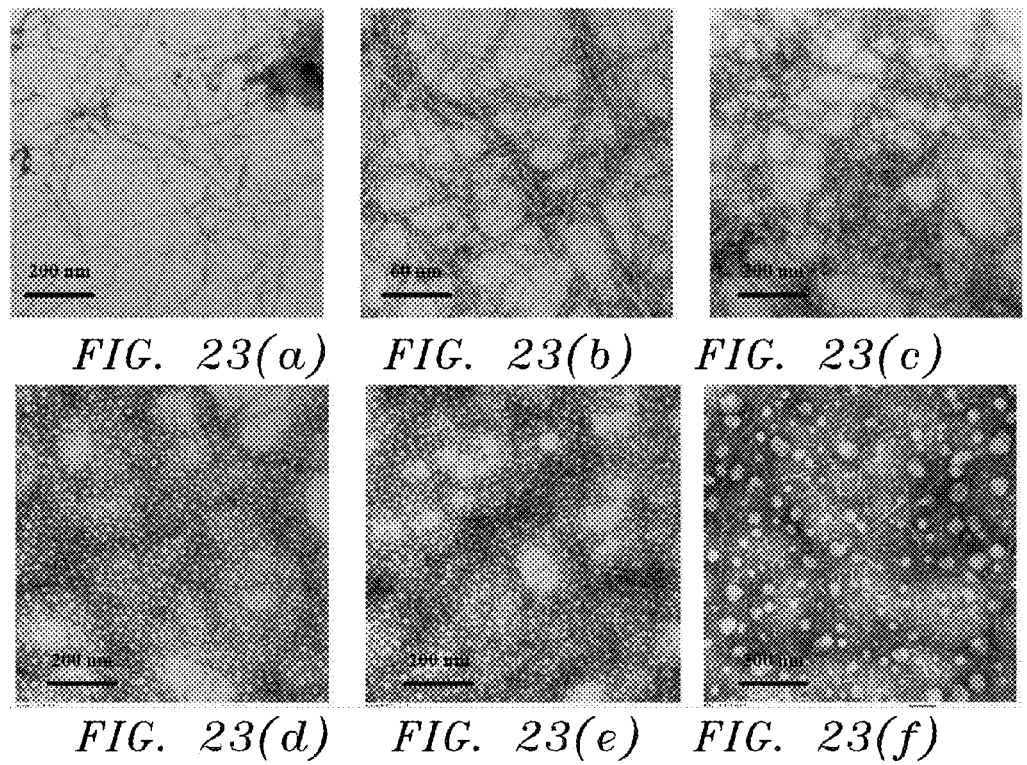
FIG. 23(a)  FIG. 23(b)  FIG. 23(c)
FIG. 23(d)  FIG. 23(e)  FIG. 23(f)
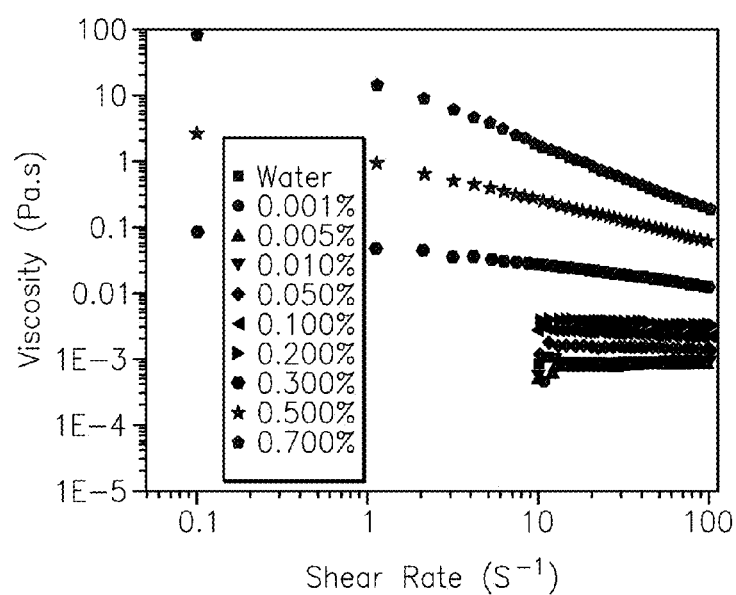
FIG. 24

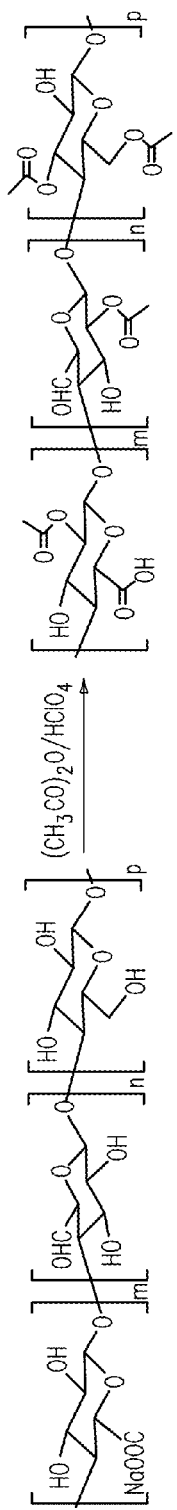
FIG. 36
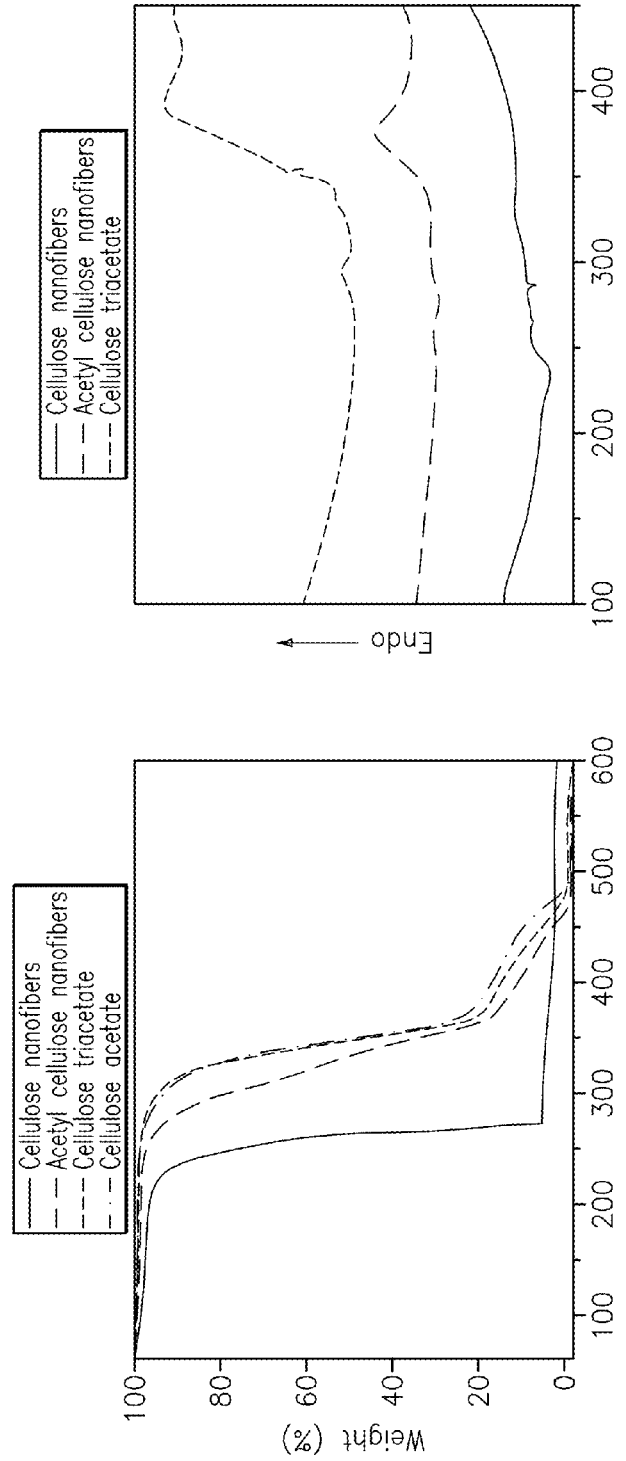
FIG. 37(a)
FIG. 37(b)

Average fiber diameter:
159.7 ± 60.7 nm

Average fiber diameter:
159.0 ± 58.6 nm

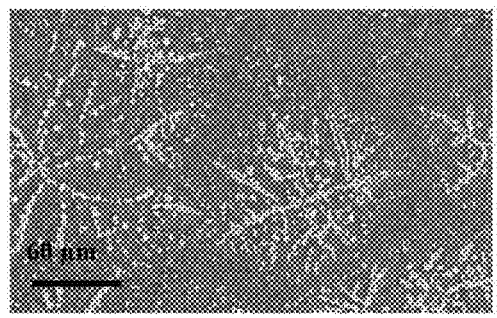
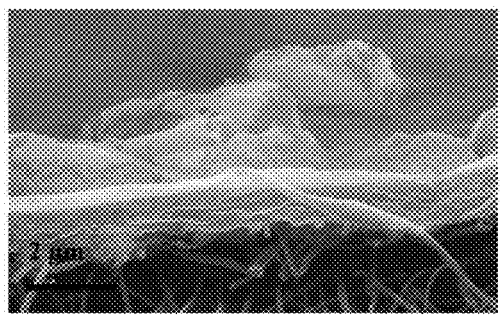
FIG. 47(a)          FIG. 47(b)
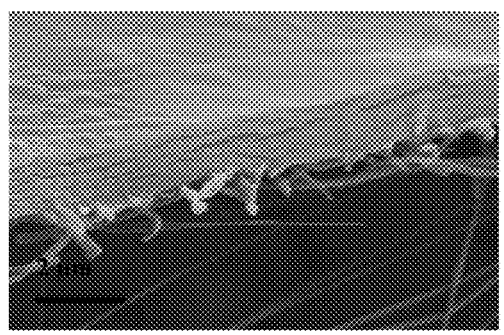
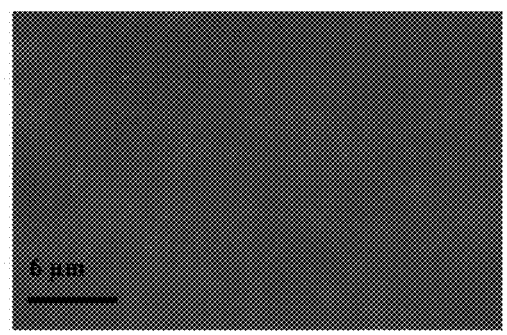
FIG. 48(a)          FIG. 48(b)

n=0, 2, 4, 8

HIGH FLUX HIGH EFFICIENCY NANOFIBER MEMBRANES AND METHODS OF PRODUCTION THEREOF

PRIORITY

This application is a divisional application of co-pending U.S. patent application Ser. No. 13/123,097, filed Apr. 7, 2011, which claims benefit of and is a U.S. National Phase of PCT/US2009/059884, filed Oct. 7, 2009, which claims priority under 35 U.S.C. §119(e) to provisional application No. 61/153,666, filed Feb. 19, 2009, to provisional application No. 61/153,669, filed Feb. 19, 2009, to provisional application No. 61/146,939, filed Jan. 23, 2009, and to provisional application No. 61/103,479, filed Oct. 7, 2008, the contents of which are incorporated herein by reference.

GOVERNMENT RIGHTS

The invention of the present application was made with government support under grant number N0014-03-1-0932 awarded by the Office of Naval Research. The government has certain rights in the invention.

BACKGROUND OF THE INVENTION

1. Field of the Invention

The present invention relates generally to nanofiber filtration and, more particularly, to a three-layer filter membrane having a top coating layer with cellulose nanofibers.

2. Description of the Related Art

The present application is related to Publication No. US 2009/0078640 A1 of U.S. patent application Ser. No. 12/126,732, filed May 23, 2008, and provisional application Nos. 60/931,765 and 60/947,045 filed on May 26, 2007 and Jun. 29, 2007, respectively, the contents of each of which is incorporated herein by reference.

A unique class of nanofibrous membranes with fiber diameters of approximately 100 nanometers (nm) and lengths on the order of thousands of meters have been created by precision multi-jet electrospinning technology. This technology takes advantage of a non-woven nanofibrous structure with uniform distributions of fiber diameter and membrane pore size that can significantly improve the flux of water transport at low operating pressures without loss of selectivity. The diameter of a fiber prepared from an electrospinning technique ranges from 1 micron to 50 nm. This implies that a mean pore size of the nanofiber membrane will range from 3 microns to 150 nm, enabling its use as a microfiltration membrane. However, it is difficult for the electrospinning process to prepare a nanofiber having a diameter that is less than 50 nm.

Methods have also been developed for the fabrication of cellulose nanofibrous scaffolds from cellulosic biomass. These nanofibers have diameters of approximately 5 nm and lengths of a few micrometers (μm). The use of cellulose nanofibers for water filtration is especially advantageous because the surface of cellulose nanofibers can be functionalized to guide the flow of water inside water channels, or to selectively alter the adsorptive or repulsive properties for particulate separation. The cellulose nanofibers are mostly crystalline in nature and, unlike amorphous cellulose, they have shown to be relatively bio-inactive.

A first type of nanofibrous membrane created through electrospinning technology utilizes PolyVinyl Alcohol (PVA), preferably on a non-woven PolyEthylene Terephthalate (PET) substrate. Different concentrations (such as 6, 8, 10, 12 wt %) of PVA solutions have different effects on fiber diameter in the membrane. Due to the fact that electrospun PVA nanofibers can be dissolved in water, the electrospun PVA membrane is chemically cross-linked before use with one of many aldehydes, such as GlutarAldehyde (GA) and glyoxal. A reaction forms acetal bridges between the hydroxyl groups in PVA and the aldehyde molecules.

The maximum pore size of the electrospun membrane may be determined by a bubble-point method, which is based on a pressure measurement that is necessary to blow air though a liquid-filled membrane. Water is preferably used as the wetting reagent. The relationship between maximum pore size (d) and the corresponding pressure is given by Young-Laplace Equation (1):

$$d = \frac{4\gamma\cos\theta}{\Delta p} \quad (1)$$

A schematic diagram of the bubble point test set-up is shown in FIG. 1. An immersed electrospun PVA membrane is placed in a membrane cell 102 having a diameter of 1.2 inches. A syringe 104 is connected to one end of the cell to provide the gas pressure, and a pressure gauge 106 is connected to the other end to monitor the pressure. A plastic tube is connected to the pressure gauge and inserted within a water filled beaker 108 to observe the air bubble. When the membrane is completely wetted by liquid, $\cos\theta=1$, and γ is the surface tension of the membrane. The minimum pressure that blows the first air bubble is recorded, and related to the maximum pore size of the membrane.

The pure water flux of the electrospun membranes is characterized using a dead-end filtration set-up, as shown in FIG. 2. A water tank 202 is placed at the water level located at 1.6 meters higher than a membrane cell 204. Therefore, it provides a differential pressure of 2.28 psi higher than gravity. The pressure was kept within 1% deviation by adding water periodically to the tank for all the measurements. Set-up of a rejection test is achieved by replacing the pure water in the flux test by a polycarboxylate feed solution.

As illustrated in FIG. 3, the average fiber diameter is reduced to 140 nm at 28 kV and 100 nm at 32 kV in electrospinning. The decrease in the average fiber diameter could be attributed to the greater elongation force provided by the increase in the electric field strength. FIG. 4 illustrates that viscosity values for PVA solutions were found to increase as the concentration increased. Specifically, there was a sharp increase in the viscosity from 50 cp to 669 cp when the concentration was increased from 10% to 12%.

FIGS. 5(a)-(d) show a series of Scanning Electron Microscope (SEM) images in order to illustrate the effect of concentration of PVA solutions on the morphological appearance of the electrospun membranes. At a low concentration of 6% or low viscosity of 16 cp, only a few nanofibers were produced, and a large number of microdroplets were formed creating a porous film-like structure. As the concentration was increased to 8% and 10%, beads gradually became less and were eliminated at 10%, whereby a uniform fiber-structure with the fiber diameter of 100 nm was formed. With a further increase in concentration to 12%, beads were formed again in the structure, and the fiber diameter increased to 150 nm.

The porosity of electrospun PVA membranes fabricated using different PVA concentrations is shown FIG. 6. At a concentration of 6%, the porosity of the membrane is quite low, 57%. Other membranes all exhibited porosity higher than 75%, and the largest reached 83% at 10% concentration.

Using a 10% PVA solution, 32 kV for the electrospinning, and membranes electrospun into sheets of 20 cm (width)×30 cm (length) at different thicknesses ranging from 3 μm to 35 μm, properties of the membranes are listed in Table 1. The pure water flux of Millex-GS is in the range of 1300-1400 (L/m² h), with average pore size determined by the image analysis of multiple SEM images, sampled at different membrane locations.

TABLE 1

| Thickness (μm) | 3 | 5 | 8 | 15 | 18 | 24 | 35 |
|---|---|---|---|---|---|---|---|
| Porosity | 85% | 84% | 85% | 85% | 85% | 85% | 83% |
| Maximum pore size (μm) | 21.0 | 14.0 | 8.4 | 3.2 | 2.8 | 1.4 | 0.4 |
| Average pore size* (μm) | 7.0 | 4.7 | 2.8 | 1.1 | 0.9 | 0.5 | 0.1 |
| Flux (L/m²h) | 16400 | 14900 | 11600 | 8500 | 8200 | 7500 | 5900 |

FIG. 7 illustrates that with a thickness of 8 μm, a membrane exhibits a rejection of 89% to 0.2 μm microparticles. With the membrane being thicker, the rejection increased to higher than 95% and reached 98% as a highest value. Therefore, the rejection of electrospun PVA membranes is also affected by the thickness of the membrane.

A second type of nanofibrous membrane created through electrospinning technology utilizes PolyAcryloNitrile (PAN) solutions. Different wt % PAN solutions are prepared by dissolving PAN powder in DiMethylFormamide (DMF) and stirring the solution at 60° C. for 2 days until homogeneous. PAN/DMF is preferably electrospun directly onto a PET substrate in an electrospinning machine.

TABLE 2

| | Solution | Apparatus | | |
|---|---|---|---|---|
| Sample | Concentration (wt %) | Distance (cm) | Voltage (kV) | E-field strength (kV/cm) |
| A-1 | 4 | 6 | 18 | 3.0 ± 0.1 |
| A-2 | 4 | 11 | 25 | 2.3 ± 0.1 |
| A-3 | 4 | 19 | 30 | 1.6 ± 0.1 |
| A-4 | 4 | 24 | 29 | 1.2 ± 0.1 |
| A-5 | 6 | 6 | 14 | 2.3 ± 0.1 |
| A-6 | 6 | 11 | 17 | 1.6 ± 0.1 |
| A-7 | 6 | 19 | 26 | 1.4 ± 0.1 |
| A-8 | 6 | 24 | 28 | 1.2 ± 0.1 |
| A-9 | 8 | 6 | 13 | 2.2 ± 0.1 |
| A-10 | 8 | 11 | 16 | 1.5 ± 0.1 |

TABLE 2-continued

| | Solution | Apparatus | | |
|---|---|---|---|---|
| Sample | Concentration (wt %) | Distance (cm) | Voltage (kV) | E-field strength (kV/cm) |
| A-11 | 8 | 19 | 23 | 1.2 ± 0.1 |
| A-12 | 10 | 6 | 12 | 2.0 ± 0.1 |
| A-13 | 10 | 11 | 14 | 1.3 ± 0.1 |
| A-14 | 10 | 19 | 21 | 1.1 ± 0.1 |
| B-1 | 4 | 6 | 18 | 3.0 ± 0.1 |
| B-2 | 4 | 6 | 25 | 4.2 ± 0.1 |
| B-3 | 4 | 6 | 30 | 5.0 ± 0.1 |
| B-4 | 6 | 6 | 15 | 2.5 ± 0.1 |
| B-5 | 6 | 6 | 20 | 3.3 ± 0.1 |
| B-6 | 6 | 6 | 25 | 4.2 ± 0.1 |

Dead-end filtration cells are used for bubble point testing on the membranes, in order to determine the maximum pore size. The Young-Laplace Equation shown in Equation (1), after substitution, is used to determine maximum pore size. Bulk porosity of the electrospun membrane is calculated by Equation (2), where $\rho$ is density of electrospun PAN and $\rho_0$ is density of PAN powder:

$$\text{Bulk porosity} = (1 - \rho/\rho_0) \times 100\% \quad (2)$$

FIGS. 8(a) and 8(b) illustrate that both dynamic viscosity and conductivity increase with increased solution concentration. According to FIGS. 9, 10 and 11, nanofibrous membranes having higher concentrations have a fairly constant larger fiber diameter, without beads or melting parts. Higher conductivity increases the stretching forces of the electric field on the polymer, which typically results in a decreased fiber diameter. However, the increasing intermolecular forces of the polymer solution, represented by increasing viscosity, counteract the stretching of the polymer. Additionally, at higher concentrations, the polymer chains entangle to a greater degree and viscoelastic properties of the solution favor thicker fiber formation, and not beads. 2 wt % is likely to be close to the critical overlap concentration (1.8%) for PAN, which prevents the stable formation of fibers.

With increasing voltage, the variability of the fiber diameters increases, as shown in FIGS. 12(a) and 12(b). Because increasing the voltage has the same effect as increasing solution conductivity, it is believed that the decreasing uniformity is due to electron repulsion.

FIG. 13 illustrates the effects of average fiber diameter, controlled by PAN concentration, on both maximum pore size and pure water flux. For a given membrane thickness and amount of polymer, the fiber length decreases with increasing fiber diameter per unit area, resulting in a lower number of fiber crossings. A decreased number of fiber crossings reduces the amount of times that pores are defined per unit area, thereby increasing the pore size. This is also consistent with the fact that smaller fiber diameter will provide a smaller pore size. Flux and bubble point data for electrospun membranes of various thicknesses, prepared from 6 wt % solution, are listed in Table 3.

TABLE 3

| Sample # | Average Fiber Diameter (nm) | Membrane Thickness (μm) | Maximum Pore Size (μm) | Pure Water Flux (L/m² h) | | Pure Water Flux after Ethanol Pre-treatment (L/m² h) | |
|---|---|---|---|---|---|---|---|
| | | | | 1st Minute | 5th Minute | 1st Minute | 5th Minute |
| E-1 | 110 ± 20 | 10 | 1.7 | 7100 | 2400 | 10000 | 6000 |
| E-2 | 110 ± 20 | 20 | 0.9 | 5600 | 2000 | 6800 | 4100 |
| E-3 | 110 ± 30 | 30 | 0.7 | 4400 | 2800 | 5700 | 3400 |
| Millex-GS | N/A | N/A | 0.7 | 1400 | 1300 | 1400 | 1300 |

The smallest maximum pore size attained was 0.7 μm by sample E-3, which is equal to that of a Millipore Millex-GS™ microfiltration membrane. Pure water flux rates for this sample were three times higher than those of Millex-GS during the 1st minute and two times higher in the 5th minute. Sample E-3 exhibited the highest rejection out of all of the electrospun membranes produced, which was predicted by bubble point results. Compared to Millex-GS, it showed significantly higher flux (2800 to 800) at comparable rejection of 1 μm particles, as shown in FIG. 14. During filtration of 0.20 μm particles, electrospun PAN performed significantly better in both flux (2600 to 700) and rejection (90% to 25%).

Cellulose nanofibers are new nano-scale materials, which can be prepared from natural plants after chemical and mechanical treatments. Nano-scale cellulose-based fibers have many applications because of their smaller diameters and the ability for surface modifications. Advantages of cellulose nanofibers over other nano-scale materials are set forth below.

(1) The diameter of cellulose nanofiber is very small, usually only ~5 nm, implying higher surface area (about 600 $m^2/g$) and higher slip flow for gas (e.g., air) filtration.

(2) The surface of cellulose nanofibers is very hydrophilic since there is one primary hydroxyl group (12 mol % or more can be transferred into carboxyl groups) and two secondary hydroxyl groups, which can be utilized to change the hydrophilic nature of the surfaces and thereby to construct liquid nano-channels.

(3) Highly functionalized surface of cellulose nanofibers means that the chemical modification can be performed more easily to achieve multiple functions, such as charged or chelating properties.

(4) Biocompatibility of cellulose nanofibers is very good, which permits biomedical applications. For long term use, such as in hemodialysis, the complementary reactions have to be properly taken into account, e.g., by reducing the active groups on cellulose.

(5) Cellulose nanofiber aqueous solutions are pH sensitive and ionic strength sensitive, permitting the formation of new gel-like structures.

(6) The low concentration of cellulose nanofibers in an aqueous solution can be utilized to prepare membranes with very thin barrier layers, useful for low-pressure micro-filtration, ultra-filtration, nano-filtration, and pre-filtration in reverse as well as forward osmosis.

(7) Cellulose nanofibers can be fabricated from cellulose under environmentally benign conditions, including the production of bacterial cellulose.

(8) Cellulose nanofibers with oxidized carboxyl groups have anti-bacterial properties. In addition, the surface property can be modified to resist interaction with bacteria.

(9) Initial source materials for the preparation of cellulose nanofibers are relatively cheap and easily available from natural plants.

The conventional preparation of cellulose nanofibers includes pre-treatment (swelling with alkali aqueous solution) of cellulose fiber bundles, acid hydrolysis to remove pectin and hemicellulose, alkali treatment again to remove lignin, high impacted cryo-crushing to liberate the microfibril from the cell wall, and high impacted and high sheared defibrillation to obtain the individual nanofibers, as shown in FIG. 15.

The diameter of cellulose nanofibers prepared by the above method is about 10 to 100 nm and having a yield of about 20%. Moreover, many of the steps often used highly corrosive reagents, such as strong acids and alkali. The cryo-crushing and defibrillation processes require special devices, which can seriously affect the extension of this method for large scale operations.

One benign preparation of cellulose nanofibers is the production of Bacterial Cellulose (BC) nanofibers using acetobacter xylinum. BC fibers have a network structure with diameters in the 10 to 70 nm range and excellent physical properties.

Physical preparation of cellulose-based nanofibers can also be achieved using the electrospinning technology. A cellulose solution can be prepared using an ionic liquid, such as 1-butyl-3-methylimidazolium chloride, N-methylmorpholine-N-oxide, or a mixture of solvents. Alternatively, cellulose acetate nanofibers are hydrolyzed, as fabricated by the electro-spun method, by using an alkali aqueous solution. However, such cellulose nanofibers have higher fiber diameter in an approximate range of 300 to 1000 nm, and the process includes an additional post-treatment step using either a toxic or volatile reagent.

Membranes suitable for filtration which involve one or more of the above technologies can be found in International Publication Nos. WO 2005/0049102 and WO 2007/001405.

SUMMARY OF THE INVENTION

The present invention has been made to address at least the above problems and/or disadvantages and to provide at least the advantages described below. Accordingly an aspect of the present invention provides a high flux high efficiency nanofiber membrane.

According to one aspect of the present invention, a membrane is provided including a coating layer having a non-woven structure format of polysaccharide nanofibers. The polysaccharide nanofibers have a diameter between 5 to 50 nanometers (nm). The membrane also includes an electrospun substrate having a non-woven structure format upon which the coating layer is applied. Nanofibers of the electrospun substrate have a diameter greater than that of the cellulose nanofibers. The membrane further includes a non-woven support upon which the electrospun substrate is disposed. Microfibers of the non-woven support have a diameter greater than that of the nanofibers of the electrospun substrate.

According to another aspect of the present invention, a membrane is provided including a coating layer comprising a mixture of nanofibers comprising PVA and cellulose. The membrane also includes an electrospun substrate upon which the coating layer is applied. Nanofibers of the electrospun substrate have a diameter greater than that of the cellulose nanofibers. The membrane also includes a non-woven support upon which the electrospun substrate is disposed. Microfibers of the non-woven support have a diameter greater than that of the nanofibers of the electrospun substrate.

According to an addition aspect of the invention, a membrane is provided having a coating layer having a non-woven structure format of at least one of cellulose nanocrystals or microcrystals. The membrane also includes an electrospun substrate having a non-woven structure format upon which the coating layer is applied. Nanofibers of the electrospun substrate have a diameter greater than that of the cellulose nanocrystals and microcrystals. The membrane further includes a non-woven support upon which the electrospun substrate is disposed. Microfibers of the non-woven support have a diameter greater than that of the nanofibers of the electrospun substrate.

According to a further aspect of the present invention, a method is provided for producing a membrane. A coating layer is produced having a non-woven structure format from polysaccharide nanofibers. The polysaccharide nanofibers have a diameter between 5 to 50 nanometers (nm). An electrospun substrate is immersed into a water-based solution. The coating layer is applied to the electrospun substrate. A gel barrier is formed at an interface between the electrospun substrate and the coating layer to slow diffusion of the coating layer into the electrospun substrate. Nanofibers of the electrospun substrate have a diameter greater than that of the cellulose nanofibers. The electrospun substrate is disposed on a non-woven support having microfibers with a diameter greater than that of the nanofibers of the electrospun substrate.

According to another aspect of the present invention, a membrane is provided having an electrospun substrate having a non-woven structure format and a non-woven support upon which the electrospun substrate is disposed. Microfibers of the non-woven support have a diameter greater than that of the nanofibers of the electrospun substrate. A maximum pore size of the electrospun substrate is approximately three times a mean pore size of the electrospun substrate when a porosity of the electrospun substrate is approximately 80%. A mean pore size of the electrospun substrate is approximately three times the fiber diameter of the nanofibers of the electrospun substrate, when a porosity of the electrospun substrate is approximately 80%.

BRIEF DESCRIPTION OF THE DRAWINGS

The above and other aspects, features and advantages of the present invention will be more apparent from the following description when taken in conjunction with the accompanying drawings, in which:

FIG. 10 includes SEM images (×5K) of nanofibrous membrane from solution A9, A5 and A1;

FIG. 11 includes SEM images (×20K) of nanofibrous membrane from solution A9, A5 and A1;

FIGS. 12(a) and 12(b) provide charts showing a relationship between applied voltage and average fiber diameter of electrospun membranes for PAN (A) and (B) solutions;

FIG. 20 is a chart showing yield and morphology of the oxidized cellulose microfibers, according to an embodiment of the present invention;

FIG. 21 is a chart showing contents of carboxylate group of cellulose microfibers at different amounts of oxidizing reagents, according to an embodiment of the present invention;

FIGS. 22(a)-22(f) includes SEM images of cellulose nanofibers prepared by using different concentrations of the solution, according to an embodiment of the present invention;

FIGS. 23(a)-23(f) provide Transmission Electron Microscope (TEM) images of cellulose nanofibers at different cellulose concentrations, according to an embodiment of the present invention;

FIG. 24 is a chart showing viscosity of cellulose nanofiber aqueous solutions at different concentrations, according to an embodiment of the present invention;

FIG. 36 shows esterification of the cellulose nanofibers, according to an embodiment of the present invention;

FIGS. 37(a) and 37(b) are charts showing thermal stability of cellulose nanofibers, acetyl cellulose nanofibers, cellulose triacetate, and cellulose acetate, according to an embodiment of the present invention;

FIGS. 47(a) and 47(b) provide SEM images of cellulose nanofiber membrane based on PAN (cross-sectional and top views) with 1.0 µm thickness of top layer, according to an embodiment of the present invention;

FIGS. 48(a) and 48(b) provide SEM images of cellulose nanofiber membrane based on PAN (cross-sectional and top views) with 1.0 µm thickness of top layer, according to an embodiment of the present invention;

DETAILED DESCRIPTION OF EMBODIMENTS OF THE PRESENT INVENTION

Figure 1:
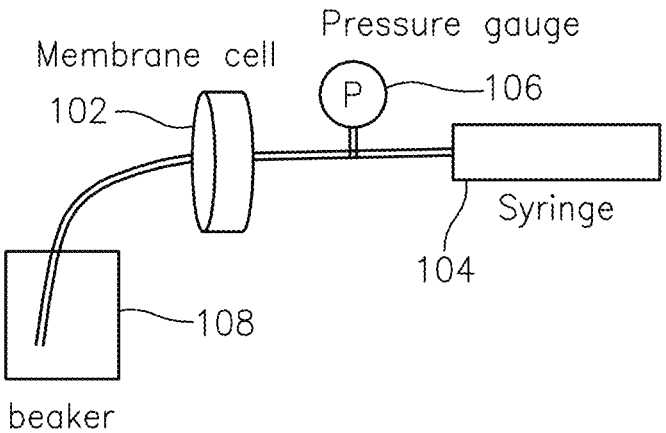
FIG. 1 is a diagram illustrating a bubble point test.
Figure 2:
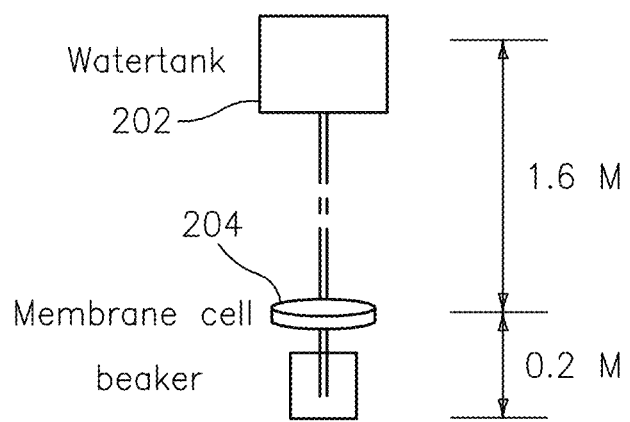
FIG. 2 is a diagram illustrating a dead-end filtration test.
Figure 3:
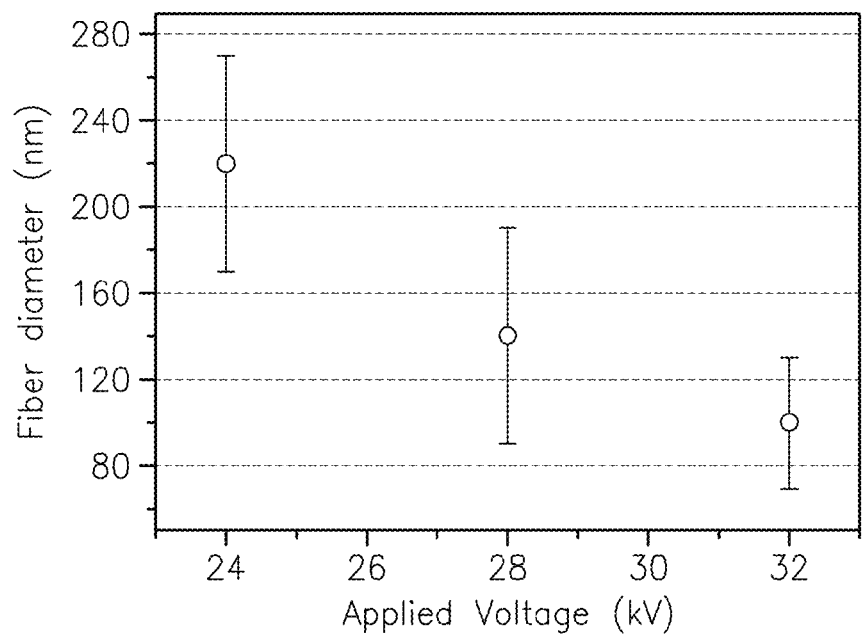
FIG. 3 is a chart showing effects of applied voltage on the diameter of electrospun PVA nanofibers fabricated from 8 wt % PVA solution.
Figure 4:
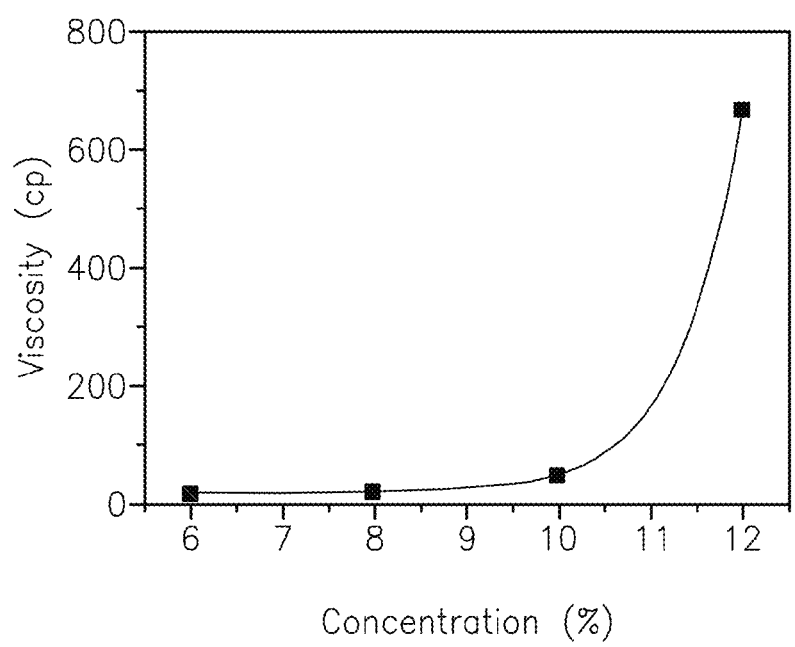
FIG. 4 is a chart showing viscosity as a function of concentration of PVA solutions.
Figure 5A:
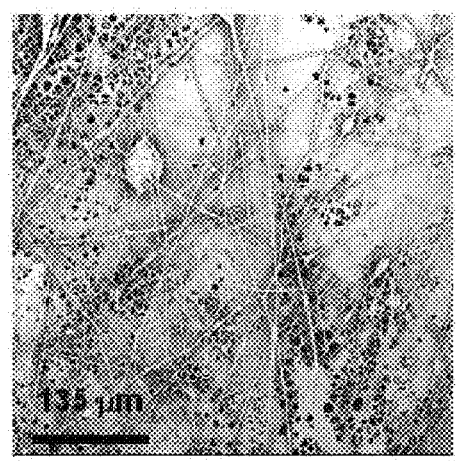
FIGS. 5(a)-(d) are SEM images of PVA membranes fabricated on PET non-woven substrate by electrospinning of PVA solution.
Figure 5B:
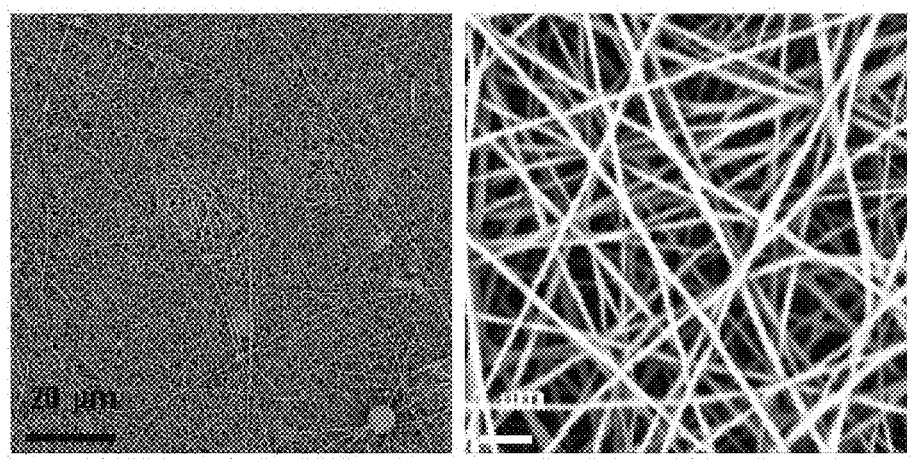
Figure 5C:
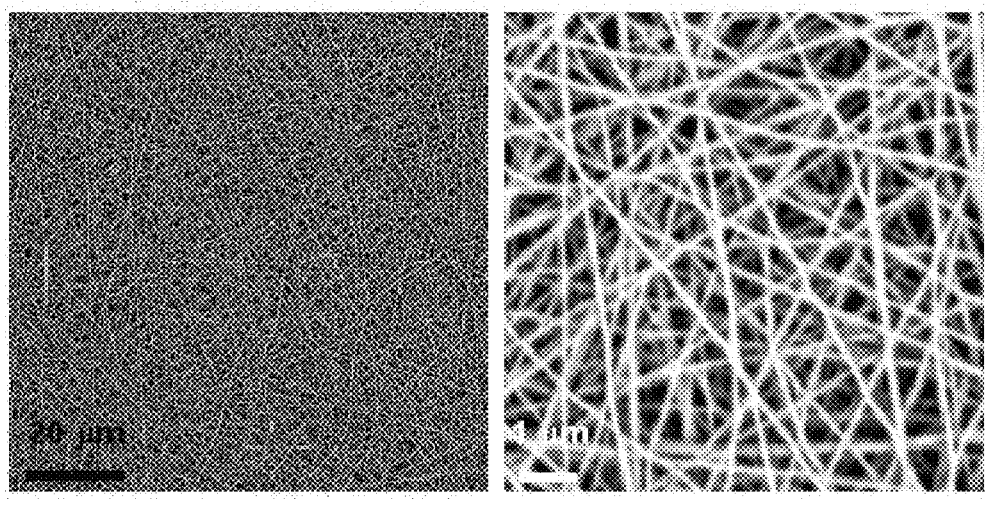
Figure 5D:
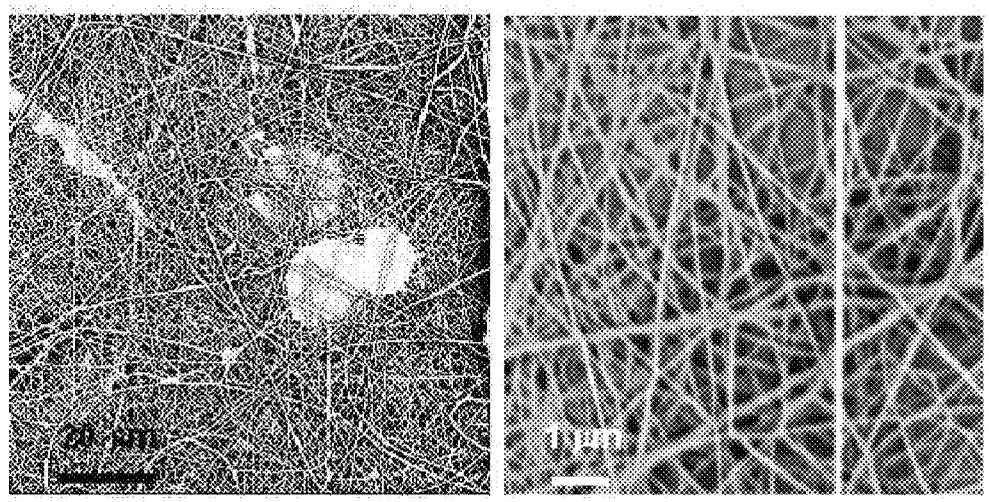
Figure 6:
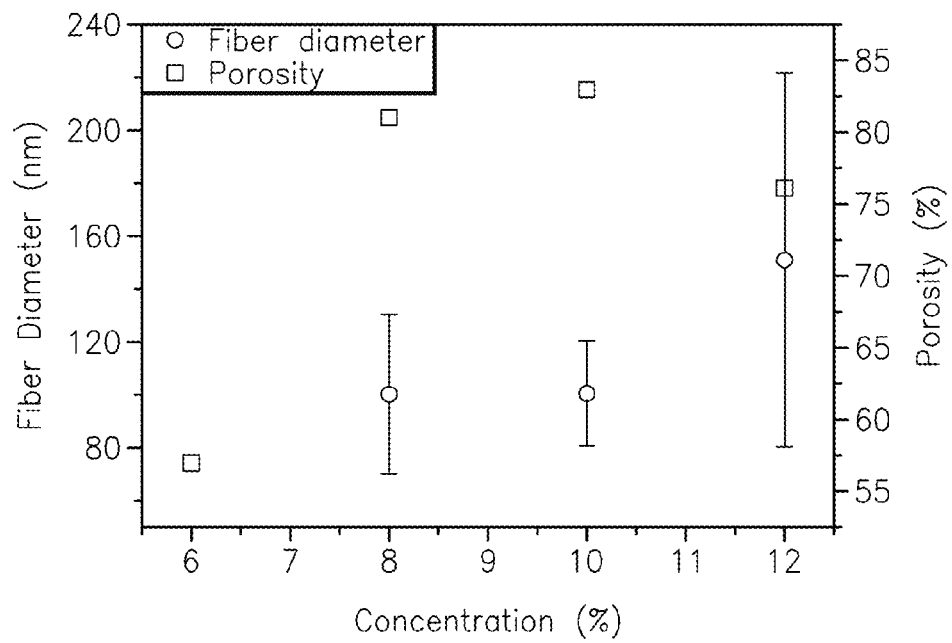
FIG. 6 is a chart showing effects of concentration on fiber diameter and porosity of electrospun PVA membrane.
Figure 7:
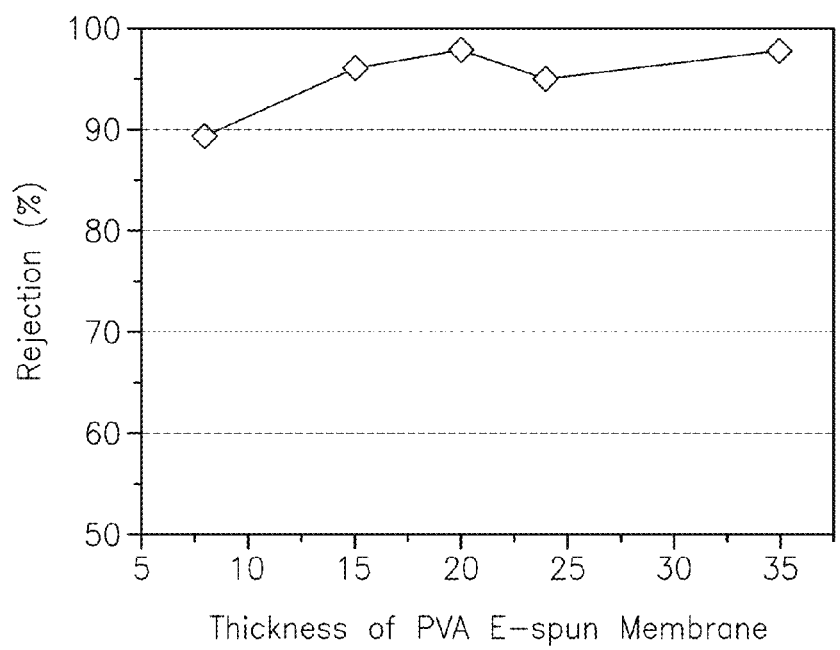
FIG. 7 is a chart showing a rejection ratio of electrospun PVA membranes of different thicknesses to the polycarboxylate particles.
Figure 8B:
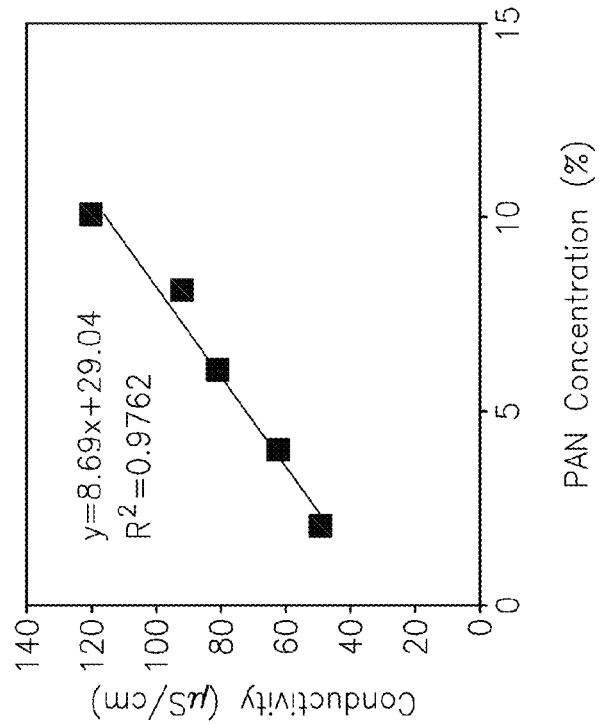
FIGS. 8(a) and 8(b) are charts showing viscosity and conductivity of PAN solutions with different concentrations.
Figure 8A:
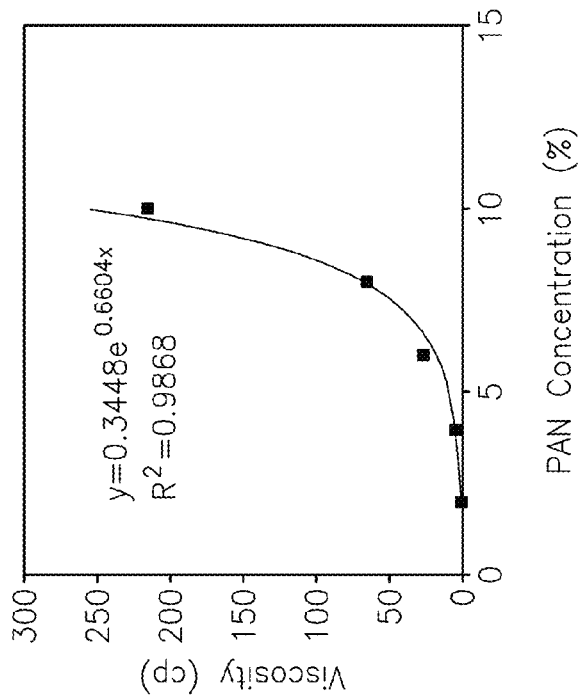
Figure 9:
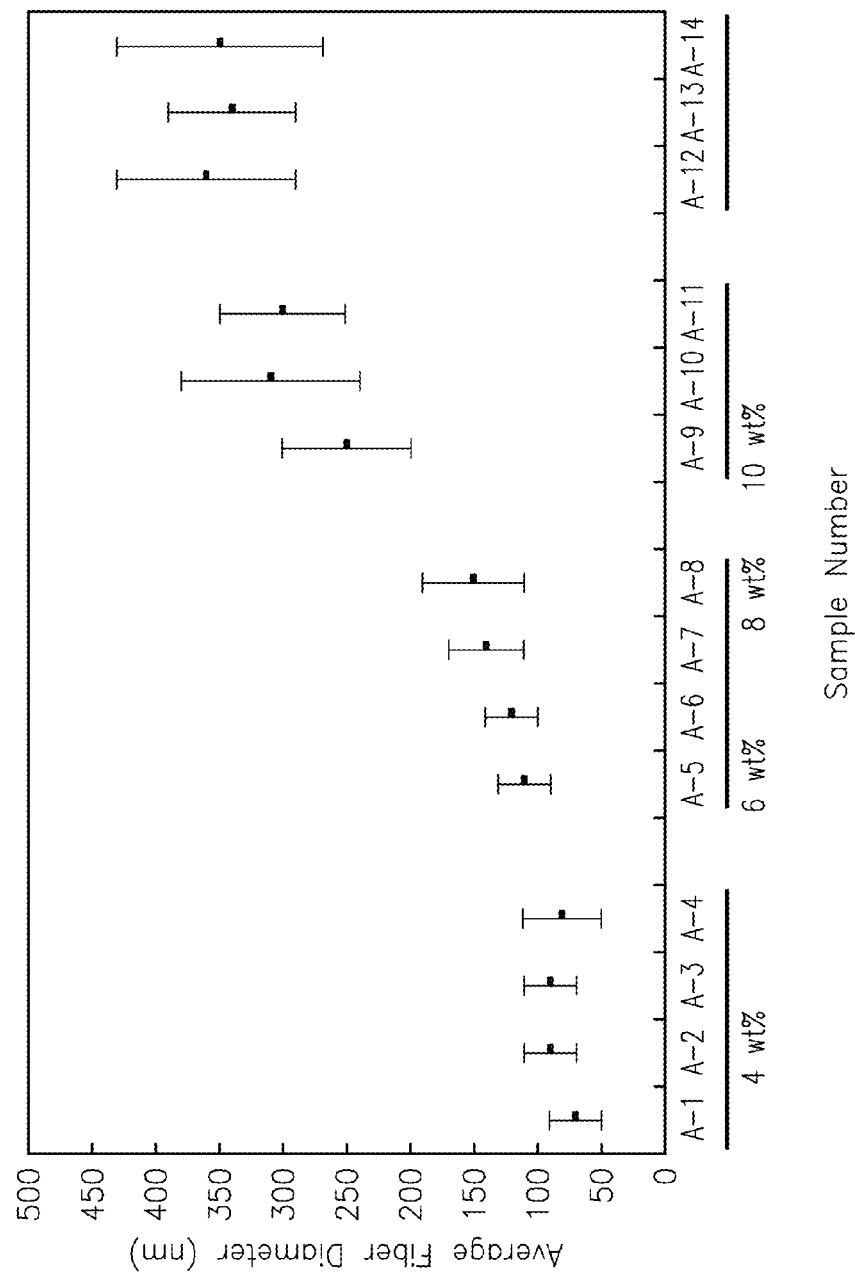
FIG. 9 is a chart showing average fiber diameters of electrospun samples with error bars, grouped by solution concentration and arranged by increasing tip-to-collector distance.
Figure 13:
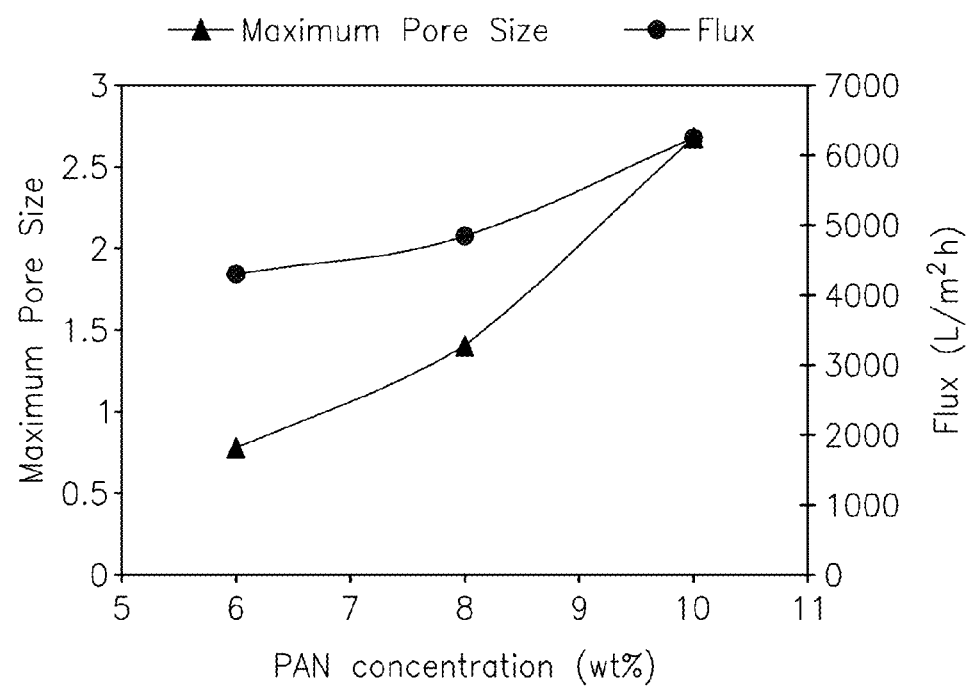
FIG. 13 is a chart showing an effect of PAN concentration on maximum pore size and pure water flux.
Figure 14:
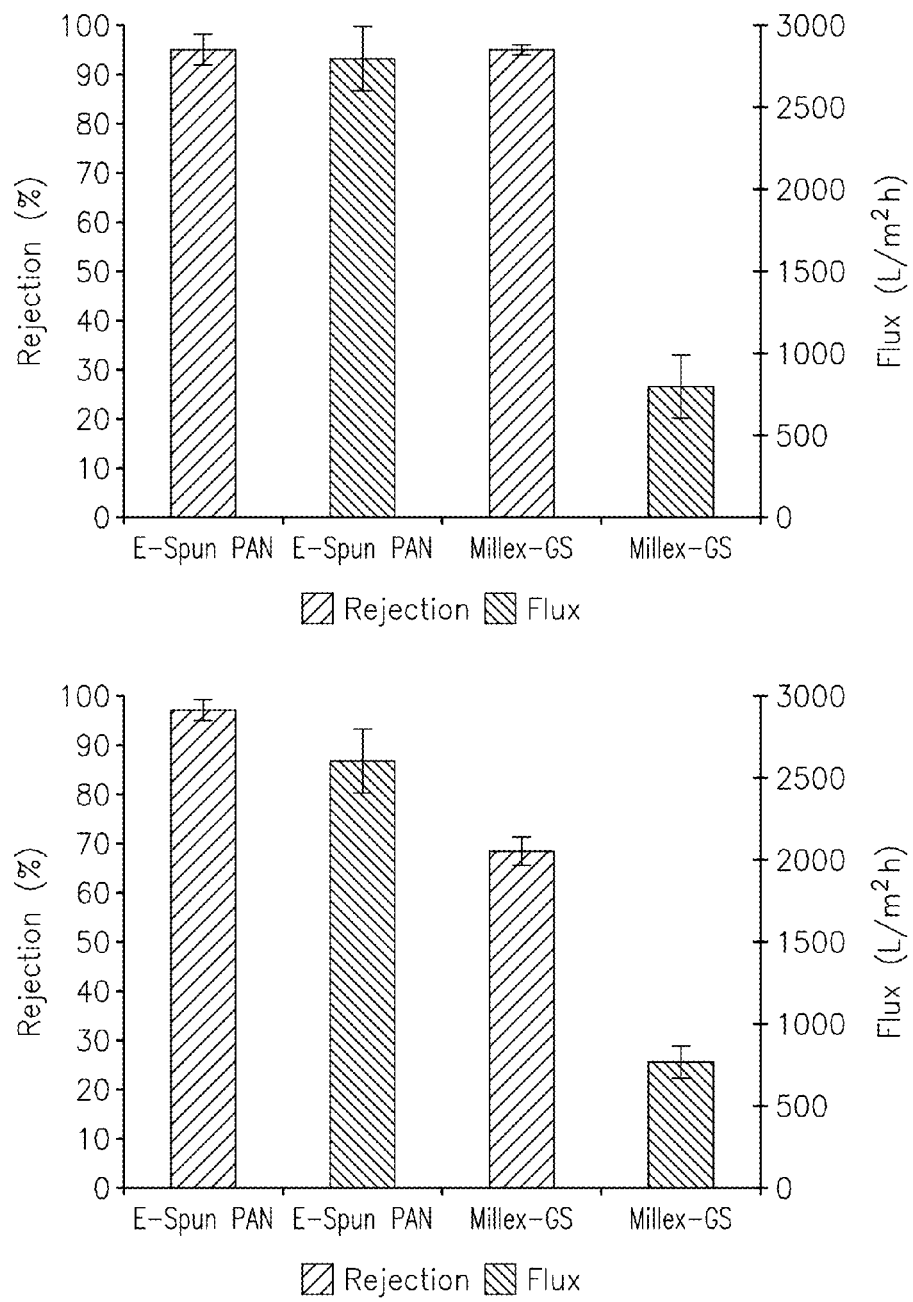
FIG. 14 includes charts showing flux and rejection during filtration of 0.20 µm and 1 µm particles for electrospun PAN and Millipore Millex-GS microfiltration membranes.
Figure 15:
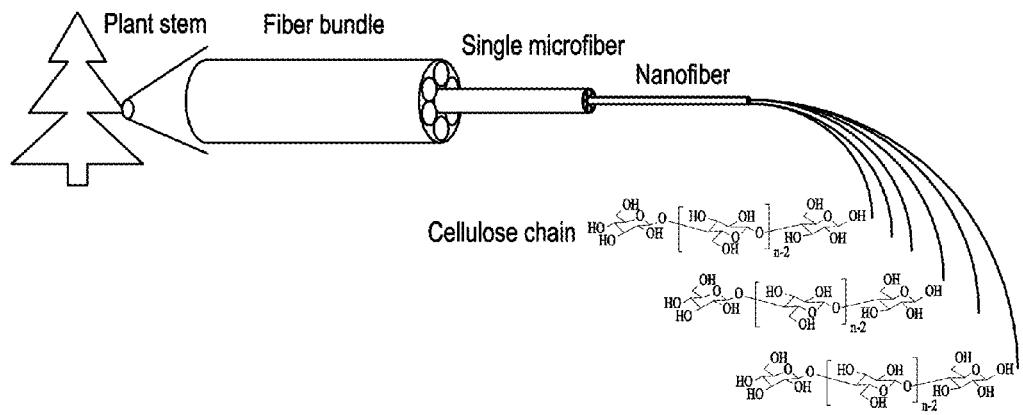
FIG. 15 is a schematic representation of the preparation of cellulose nanofibers.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

The terms and words used in the following description and claims are not limited to their dictionary meanings, but are used to enable a clear and consistent understanding of the invention. Accordingly, it should be apparent to those skilled in the art that the following description of embodiments of the present invention are provided for illustrative purposes only and not for the purpose of limiting the invention, as defined by the appended claims and their equivalents.

It is to be understood that the singular forms "a," "an," and "the" include plural referents unless the context clearly dictates otherwise. Thus, for example, reference to "an identifier" includes reference to one or more of such identifiers.

Figure 16:
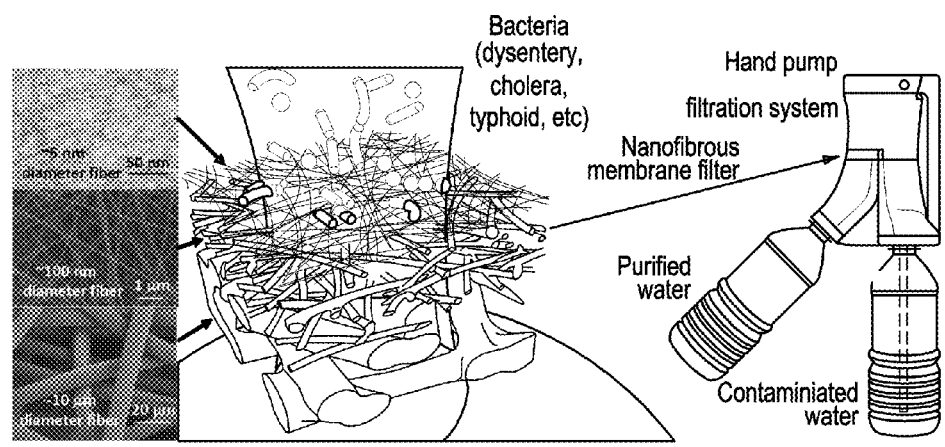
FIG. 16 is a diagram illustrating a three-tier structure of different fiber diameters in a nanofibrous membrane for water purification, according to an embodiment of the present invention.

With the combined nanofiber and cellulose advances in membrane technology, one can benefit from long, safe and inexpensive nanofibers of different diameters. For example, it is possible to design a robust, inexpensive, hand-held device, based on the high-flux and low-pressure nanofibrous membranes, to purify drinking water in developing countries, as shown in FIG. 16. Such a system could largely eliminate water infested with microbes and bacteria that result in dysentery, cholera or typhoid.

A Thin Film Composite (TFC) membrane has a three-tier composite structure. The top cellulose coating layer is the key for separation of solute and permeates. The middle layer serves as a support, in which the high-flux nano-fibrous membrane with large porosity and uniform structure is used. This nanofibrous mid-layer is often fabricated by electro-spinning that replaces the conventional asymmetric porous membrane, normally fabricated by the phase inversion method. The bottom layer is a non-woven microfibrous support possessing strong mechanical property.

Figure 17:
FIG. 17 is a diagram illustrating a nanofibrous composite barrier layer in thin film composite membranes, according to an embodiment of the present invention.

Another embodiment of the present invention, as shown in FIG. 17, includes a very thin, strong and functional nanocomposite barrier layer, imbedded with interconnected and directed water channels guided by the surface of nanofibers. This new membrane configuration offers two critical advantages for the separation of water and small molecules/ions: (1) increase flux, by a factor of 10 or more, while maintaining the same high rejection ratio; and (2) reduce fouling by providing a smooth hydrophilic barrier layer, reducing particulate clogging and adsorption of hydrophobic materials. Further, the integration of a nanofibrous scaffold with the nanocomposite barrier layer also creates a mechanically strong nanocomposite thin film that can withstand frequent back flushing operations for membrane cleaning, and the presence of nanofibers permits surface modifications, yielding directed water pathways to enhance throughput.

The embodiments of the present invention enable the fabrication of water purification systems with a performance/cost ratio exceeding existing commercial systems by factors of 100-1000. For ultra-filtration, an increase in filter throughput is demonstrated by a factor of more than 10. The embodiments of the present invention are based on a unique nanofibrous membrane concept which forms a revolutionary platform suitable for all segments of water purification processes, including micro-filtration (MF), ultra-filtration (UF), nano-filtration (NF) and reverse osmosis (RO). Better flux means less time and less energy to filter the same amount of water, which in turn greatly increases cost efficiency.

Figure 18:
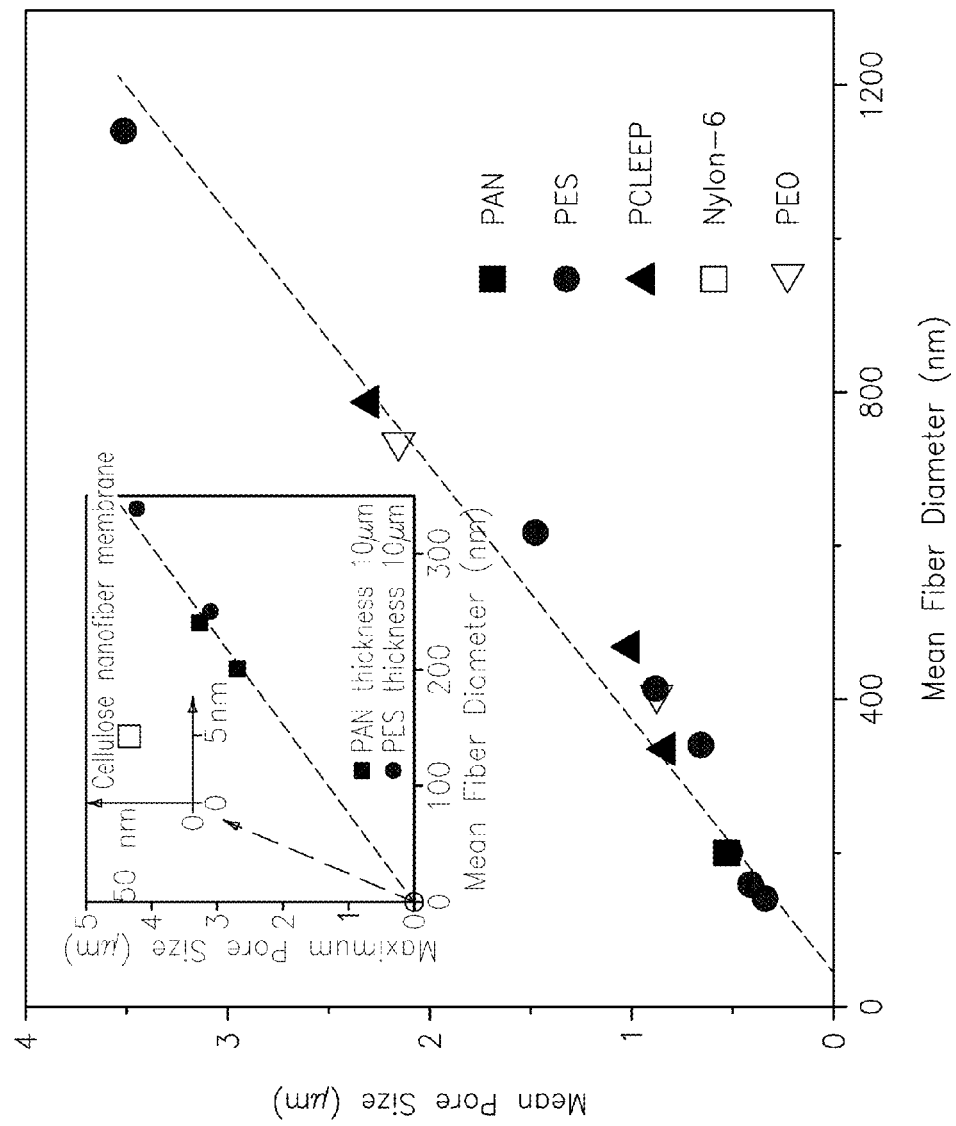
FIG. 18 is a chart showing relationships between mean pore size/maximum pore size and mean fiber diameter in nano-woven nanofibrous membranes, according to an embodiment of the present invention.

A correlation between pore size and fiber diameter is demonstrated based on an ideal non-woven structure with a total porosity about 80%. The maximum pore size of the nanofibrous membrane (determined by the bubble point measurement) is approximately three times of mean pore size of the membrane (also determined by the bubble point measurement or the SEM image analysis), and the mean pore size of the nanofiber membrane is approximately three times the fiber diameter, as shown in FIG. 18.

Oxidized Cellulose Microfibers

The embodiments of the present invention utilize techniques involving the oxidation of cellulose microfibers with TEMPO/NaBr/NaClO in an aqueous solution at ambient temperatures. These techniques are based on the oxidation reaction of the primary hydroxyl group of polysaccharides, such as cellulose, by sodium hypochlorite and a catalytic amount of sodium bromide mediated with TEMPO radicals. After oxidation, the carboxyl group and the aldehyde group are formed, instead of the primary hydroxyl group of cellulose. As a result, the structure of cellulose microfiber becomes very loose, even forming a 'balloon' structure like that in some solvents of cellulose. The loose cellulose fibers can easily be defibrillated by using only mild mechanical treatment, such as a homogenizer, and then cellulose nanofibers dispersed in water are obtained. The yield of oxidized cellulose microfibers is close to 100% using this process. Thus, such a preparation process can provide a new platform, permitting fairly easy preparation of cellulose nanofibers without special instrumentation.

10.0 g of Biofloc 92 MV (2.2 g of cellulose) is dispersed in 192 g of water. 0.2 g of sodium bromide and 0.04 g of TEMPO is dissolved in the suspension solution. The reaction is started by adding a desired amount (e.g., 20 mmol/g cellulose) of sodium hypochlorite solution under stirring condition for 24 h. The pH value is kept at about 10.0 to 10.3 monitored with a pH meter by adding 0.5 mol/L of sodium hydroxide aqueous solution. The reaction 10 is stopped by adding 10 mL of ethanol followed by stirring for 20 minutes. The rough product was separated by centrifuging (5000 rpm) of the reaction mixture and then decanting the supernatant. The product was washed with de-ionized (DI) water 5 times and separated finally by centrifugation. The oxidized cellulose microfiber slurry was kept in a refrigerator with the dry oxidized cellulose microfibers being obtained after freeze drying the product for one day.

Figure 19:
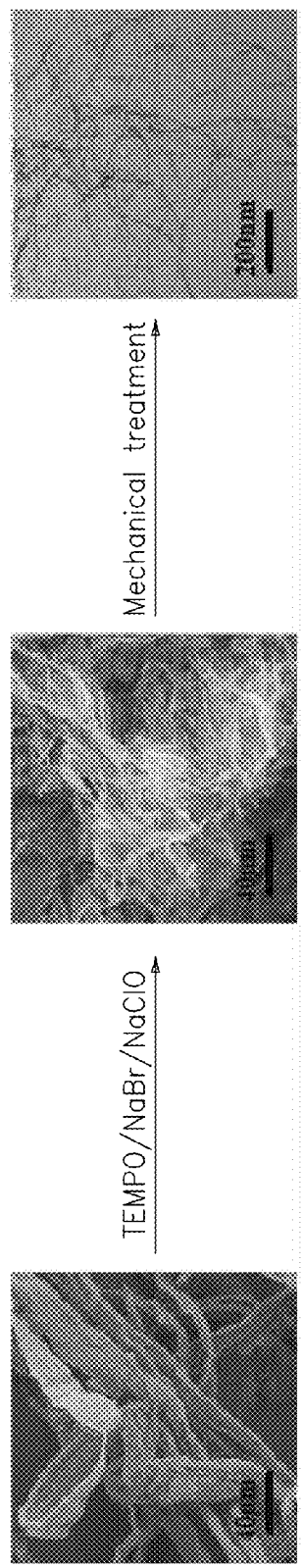
FIG. 19 includes SEM images illustrating preparation of cellulose nanofibers from wood bleached pulps, according to an embodiment of the present invention.

0.01 g of oxidized cellulose microfibers (0.20 g of oxidized cellulose slurry prepared with 20 mmol/g cellulose NaClO) are dispersed in 100 g of water and sonicated for 5 min with a homogenizer. Almost all the oxidized cellulose microfibers were defibrillated and the suspension was centrifuged at 5000 rpm. The supernatant was the cellulose nanofiber suspension in water with a concentration of 0.01 wt %. SEM and TEM images on selected stages of the preparation process of cellulose nanofibers, are shown in FIG. 19.

Different oxidized cellulose microfibers from different cellulose sources, such as wood and cotton pulps, were prepared by using the TEMPO/NaBr/NaClO oxidation system, which contributed to loosen the cellulose microfibers by introducing carboxyl groups onto the surface. The negatively charged nanofibers with repulsion among the same charges helps to defibrillate the cellulose microfibers. Also, the oxidation reaction was carried out in an alkali environment, typically with a pH value between 10 and 10.3, which is partially responsible for removal of the pectin, hemicellulose, and lignin remaining in the cellulose fibers. The yield and morphology of the oxidized cellulose microfibers are listed in FIG. 20.

FIG. 20 shows that the cellulose microfibers have an open 'balloon'-like morphology after the oxidation reaction, and the opening degree is dependent on the amount of oxidizing reagent NaClO. With more amounts of hypochlorite, more opening fibers become available, which means that the cellulose nanofibers become more easily available by subsequent mechanical treatment. However, the yield of cellulose microfibers was affected by the degree of oxidation. Heavy oxidation could actually decrease the yield of the oxidized cellulose microfibers because part of the cellulose and other polysaccharides could be dissolved into the base reaction system and were separated out by later centrifugation. 20 mmol/g cellulose with NaClO was preferable for the preparation of the cellulose microfibers for keeping the yield to about 90%.

After oxidation, cellulose microfibers with carboxyl groups on the surface were obtained. The results of conductivity titration performed to measure the content of carboxylate groups of oxidized cellulose microfibersity titration is shown in FIG. 21.

The contents of the carboxylate group were increased as the amount of NaClO increased, while the solubility of cellulose microfibers in the base aqueous solution also increased as the content of the carboxylate group increased. As described above, the carboxylate group of the oxidized cellulose microfibers with 20 mmol/g of NaClO was approximately 0.7 mmol/g cellulose, which means that approximately 12% of the primary of hydroxyl group of cellulose was oxidized. Further chemical modification of the cellulose nanofibers is dependent upon the amount of the carboxylate group, as discussed in greater detail below.

Cellulose nanofibers can be prepared from either slurry or dry oxidized cellulose microfibers, which can be obtained by freeze drying of the slurry for one day. The slurry can be very easily dispersed further in water and almost all of cellulose therein can be chopped into cellulose nanofibers, while the dry oxidized cellulose microfibers are more difficult to disperse, and only about 50% of the cellulose can be transferred into cellulose nanofibers using the current mechanical treatment. For example, longer time sonication was needed to increase the yield of cellulose nanofibers.

After centrifuging, the supernatant part of the solution was collected which contained the cellulose nanofibers. It should be noted that the morphology of the cellulose nanofibers after freeze drying was dependent on the concentration. FIGS. 22(a)-22(f) show cellulose nanofibers prepared by using different concentrations of the solution (0.7 mmol carboxyl group/g cellulose) after the freeze drying process. The concentrations are: FIG. 22(a) 0.30%, FIG. 22(b) 0.18%, FIG. 22(c) 0.15%, FIG. 22(d) 0.05%, FIG. 22(e) 0.01%, and FIG. 22(f) 0.005%, respectively. Diameters of cellulose nanofibers are about (a) N/A, (b) 1000 nm, (c) 500 nm, (d) 200 nm, (e) 100 nm, (f) 50 nm, respectively. The diameter of cellulose nanofibers decreased with decreasing cellulose concentration of the prepared solution. The diameter of cellulose nanofibers estimated from SEM images ranged from about 1000 to 50 nm with fiber length of more than 100 μm.

Fine cellulose nanofibers with 5 to 10 nm of diameter were observed when the cellulose concentration was about 0.05% or lower, as shown in FIGS. 23(a)-23(f) provide. TEM images of cellulose nanofibers at cellulose concentrations of FIG. 23(a) 0.005%, FIG. 23(b) 0.01%, FIG. 23(c) 0.05%, FIG. 23(d) 0.10%, FIG. 23(e) and FIG. 23(f) 0.15% stained by uranyl acetate (2.0%) shown.

The viscosity of the cellulose nanofibers aqueous solution was dramatically higher (more than 100 Pa·s) than that of pure water (0.001 Pa·s), even when the cellulose concentration was only 0.70%, as shown in FIG. 24.

Based on the average length of cellulose nanofibers, an overlap concentration is estimated by Equation (3):

$$C^* \sim 1/L^3 N_A \qquad (3)$$

L is the length of an isolated chain, and $N_A$ is the Avogadro constant. An approximate estimate suggested that $C^*$ is approximately $10^{-8}$ mol/L.

The overlap concentration of cellulose nanofibers is significantly lower than those of polymer solutions, implying that the viscosity of a cellulose nanofiber 'solution' should be very high even at very low concentrations in terms of regular polymer solutions. Over the normal frequency region, the complex viscosity of a cellulose nanofiber aqueous 'solution' (actually a suspension) changes very little when their concentrations are lower than 0.20%, with their rheological behavior being like that of a Newtonian fluid.

When the concentration of the solution is higher than 0.30%, it is still very low although, however, there is an obvious shear thinning effect, similar to that of concentrated polymer solutions. Thus, the rod stiffness has a remarkable effect on the measured viscosity because there is not much entanglement like that among more flexible polymer chains for more rigid cellulose nanofibers in suspension.

Figure 25A:
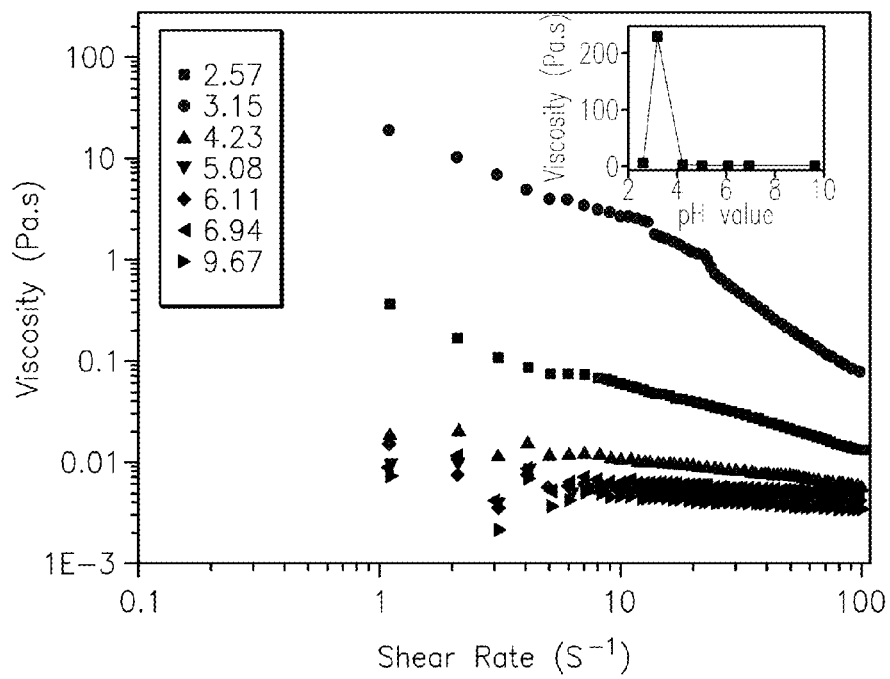
FIG. 25(a)-(b) include charts showing viscosity of cellulose nanofiber aqueous solutions at different pH values, and reversibility of cellulose nanofiber gels at different pH values, according to an embodiment of the present invention.
Figure 25B:
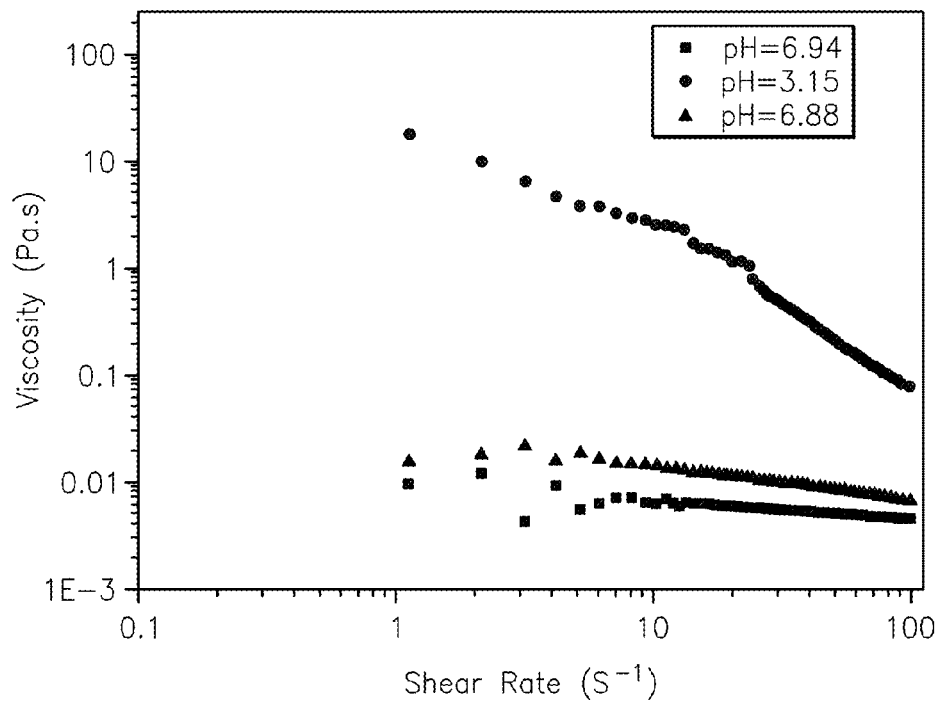

The solution viscosity is pH sensitive. The viscosity of 0.20% cellulose nanofiber solution at different pH values is shown in FIG. 25(a). The viscosity of cellulose nanofiber solution changed from 0.005 to 0.01 Pa·s when the pH varied from 10.0 to 4.0. However, there was a sharp increase (the peak value was 230 Pa·s at pH ~3.2) when the pH value was below 4.0 and gelation appeared due to a hydrogen bond formation between carboxyl groups of the cellulose backbone and hydroxyl groups. The gel became harder with further decrease in the pH value, until almost all cellulose nanofibers participated in the gel network formation whereby the aqueous solution became heterogeneous. The gelation process was reversible according to the viscosity changes of the cellulose nanofiber solutions, as shown in FIG. 25(b).

Figure 26:
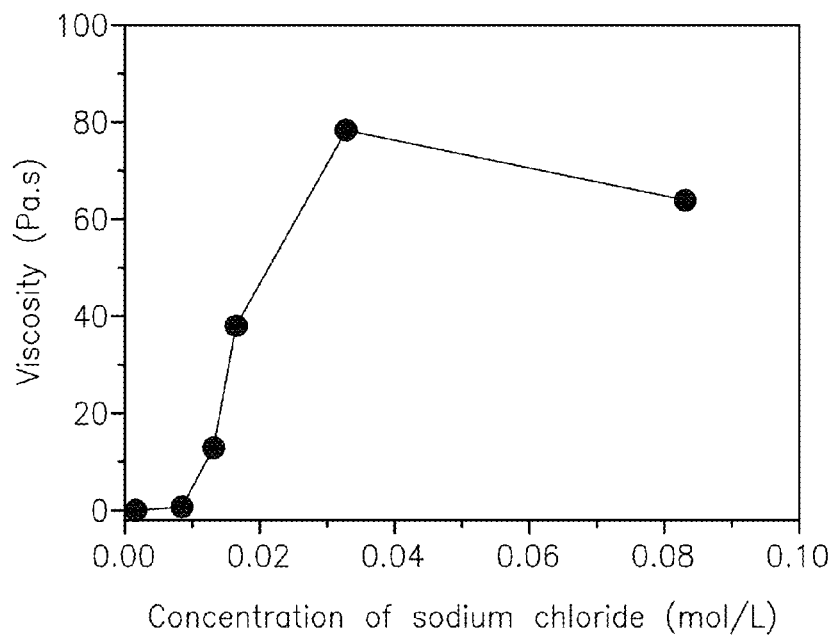
FIG. 26 is a chart showing viscosity of cellulose nanofiber aqueous solutions at different ionic strengths.
Figure 63:
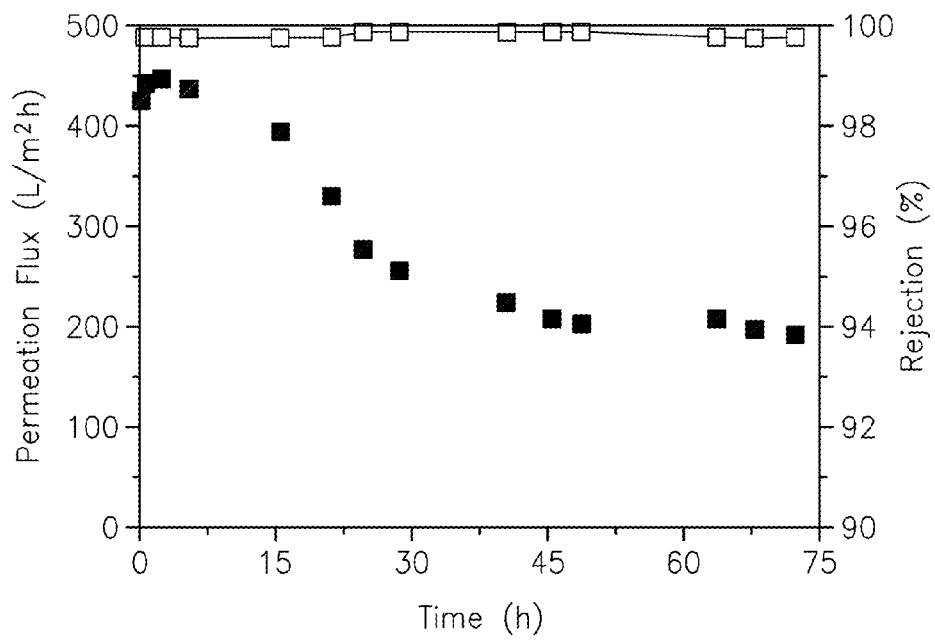
FIG. 63 is a chart showing permeation flux and rejection (%) of cellulose nanofiber membrane during 72 hours for filtration of oil/water emulsion, according to an embodiment of the present invention.

0.20% of cellulose nanofiber aqueous solution was used in determining the effect of ionic strength changes on the solution viscosity. When the concentration of sodium chloride was lower than 0.002 mol/L, nanofibers with approximately 1000 nm diameters after freeze drying were observed. However, the nanofibers could be further aggregated by increasing the ionic strength to above 0.008 mol/L and gelation began to occur, as confirmed from the rheological result, as shown in FIG. 26. The gelation phenomenon occurred very fast when the concentration of sodium chloride was higher than 0.01 mol/L. Ionic liquid EAc (1-methyl-3-ethylimidazolium acetate, melting point: <−20° C., while the melting point of NaCl is 801° C.) can also be used to adjust the ionic strength. The viscosity of cellulose nanofiber aqueous solutions is shown in FIG. 63. The gelatin was observed again when the concentration of EAc was above 0.033 mol/L.

Figure 27:
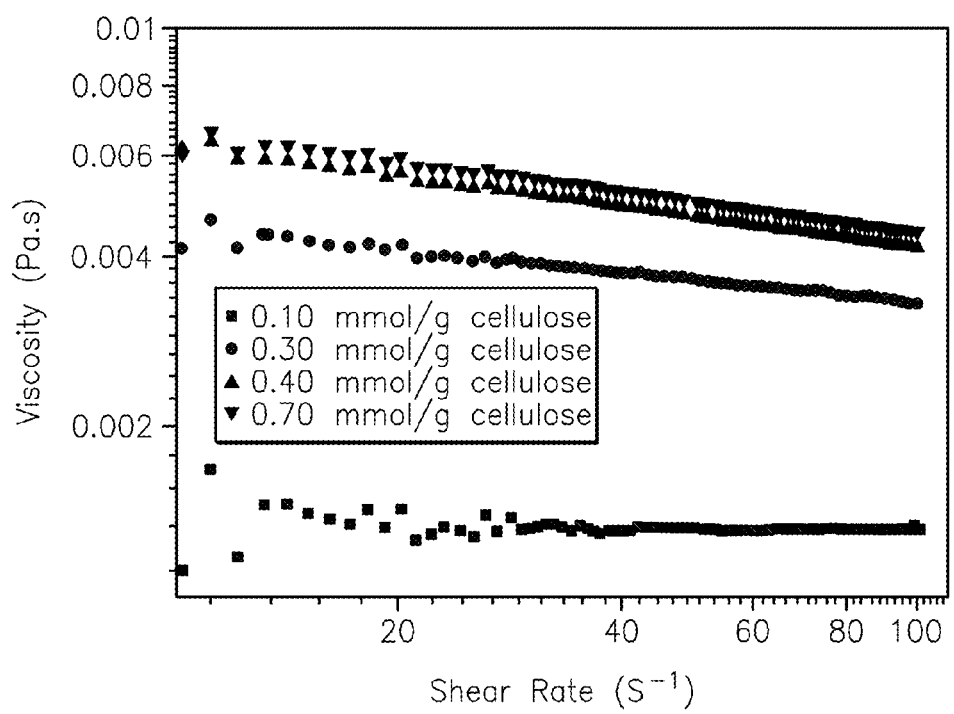
FIG. 27 is a chart showing viscosity of cellulose nanofibers aqueous solution prepared with oxidized cellulose microfibers at different degrees of oxidation, according to an embodiment of the present invention.

Different carboxyl contents of oxidized cellulose microfibers affects the yield of the cellulose nanofibers, based on the same mechanical treatment, as shown in FIG. 27. The viscosity of the cellulose nanofiber solution changed with different amounts of oxidized cellulose microfibers. The yields were almost the same when the carboxyl group content was higher than 10 mmol/g cellulose.

The miscibility of cellulose nanofiber aqueous solution in different organic solvents was tested with UV-Vis spectroscopy. Four different organic solvents, including DMF, acetone, THF, and ethanol, which were miscible with water, were employed to determine the miscibility of the cellulose nanofiber aqueous solutions. The results are listed in Table 4, in which, "CNAS" means a cellulose nanofiber aqueous solution, weight ratio of CNAS/organic solvent, "S" means miscible, "PM" means partially miscible and "I" means immiscible.

TABLE 4

| Solvents | 10:1 | 1:1 | 1:10 |
| --- | --- | --- | --- |
| CNAS/Water | M | M | M |
| CNAS/DMF | M | M | M |
| CNAS/Acetone | M | PM | I |
| CNAS/THF | M | PM | I |
| CNAS/Ethanol | M | I | I |

Table 4 shows that the cellulose nanofiber aqueous solution was completely miscible with DMF as well as with water, and partially miscible with acetone and THF (weight ratio is 1:1). However, only a small amount of the cellulose nanofiber solution (1:10) can be dispersed into acetone, THF or ethanol.

Figure 28:
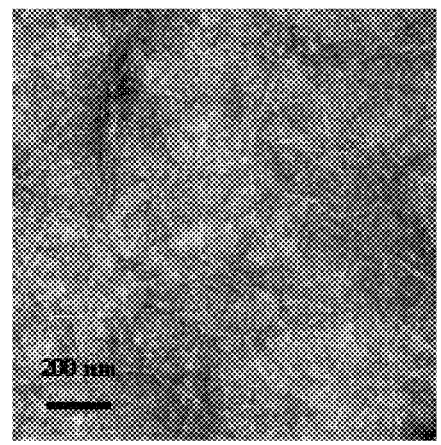
FIG. 28 is a TEM image of cellulose nanofibers (0.01 wt %) dispersed in DMF, according to an embodiment of the present invention.

FIG. 28 is a TEM image of CNAS/DMF showing no gel formation or precipitates observed when CNAS was dispersed into DMF with any weight ratio of DMF to water, indicating that DMF may be regarded as a co-solvent for cellulose nanofibers.

Figure 29:
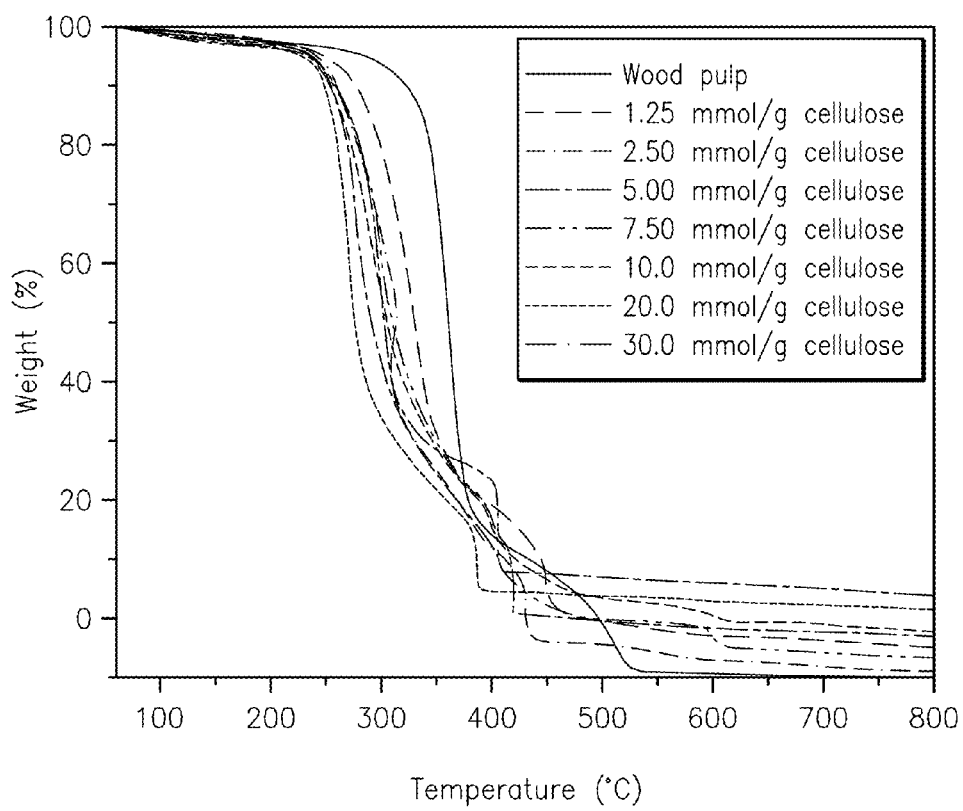
FIG. 29 is a chart showing thermal stability (Thermal Gravimetric Analysis (TGA)) of oxidized cellulose microfibers, according to an embodiment of the present invention.

FIG. 29 shows thermal stability of oxidized cellulose microfibers. Oxidized cellulose fibers started to decompose at about 250° C. 5.0% weight loss), when compared with that of the wood pulp (336° C.). All the oxidized cellulose microfibers have similar decomposition temperatures except for the oxidized cellulose microfibers prepared with 1.25 mmol/g cellulose of NaClO, which showed decomposition at a slightly higher temperature if 259° C. The lower the degree of oxidation, the lower the yield of cellulose microfibers became and the higher the thermal stability.

Figure 30:
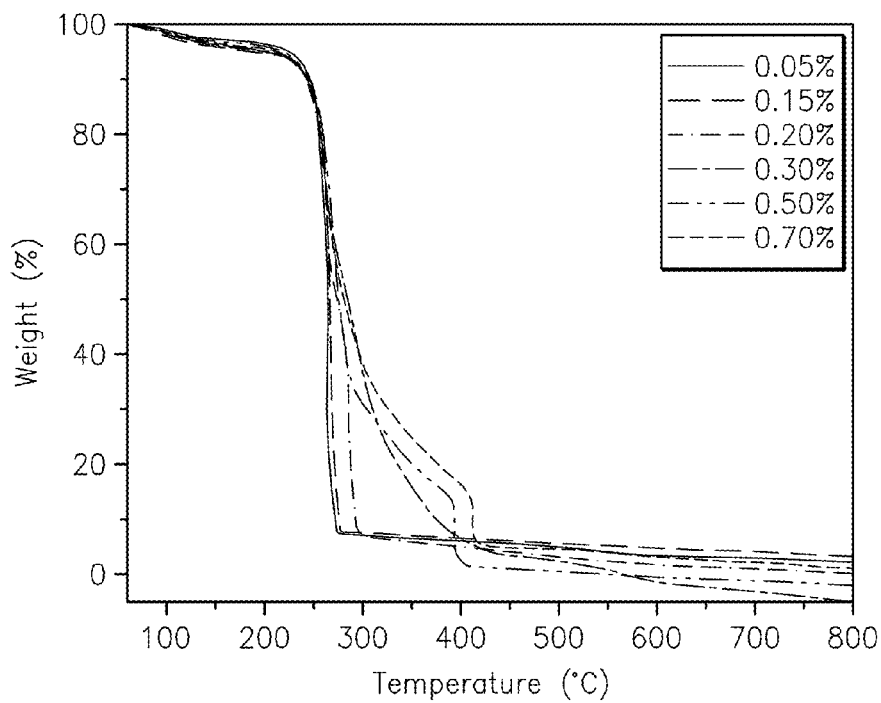
FIG. 30 is a chart showing thermal stability (TGA) of cellulose nanofibers prepared at different % cellulose concentrations after freeze drying, according to an embodiment of the present invention.

FIG. 30 shows thermal stability of cellulose nanofibers prepared by using the mechanical treatment of the oxidized cellulose microfibers (0.7 mmol/L carboxylate content). The decomposition onset of cellulose nanofibers started at about 240° C. for all concentrations of cellulose nanofibers. However, the cellulose nanofibers decompose completely at 275° C. when the concentration is below 0.20%, which matches with FIG. 22, demonstrating that cellulose nanofibers were observed from SEM images after freeze drying at 0.20%. The cellulose nanofibers are completely decomposed at 400° C. at concentrations higher than 0.30%, when only pieces of film were observed from SEM images.

Figure 31:
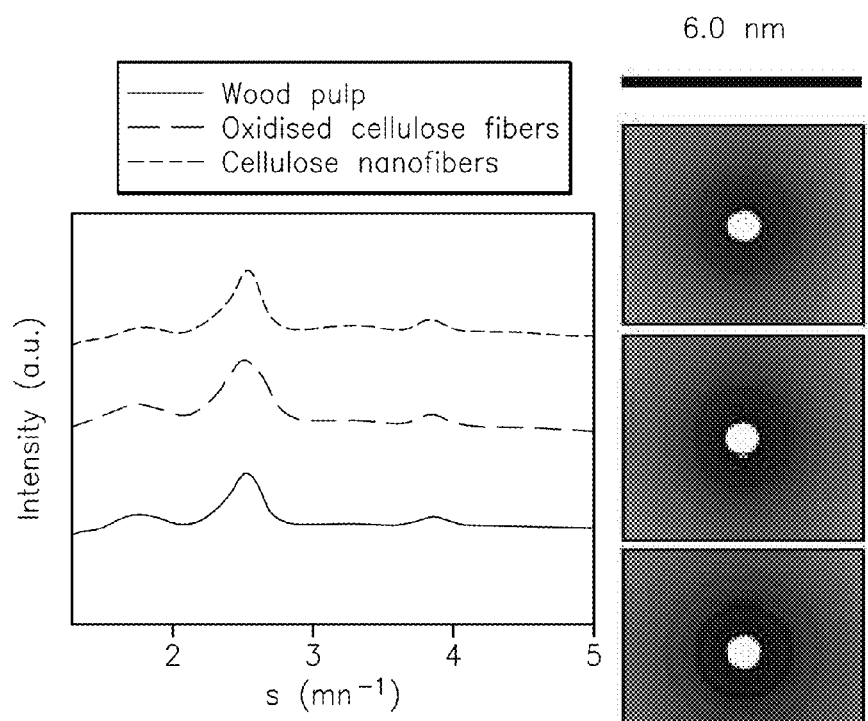
FIG. 31 is a chart showing crystallinity of wood pulp, oxidized cellulose microfibers, and cellulose nanofibers by using freeze drying, according to an embodiment of the present invention.

FIG. 31 illustrates changes of crystallinity of cellulose microfibers before and after oxidation, as well as cellulose nanofibers prepared by post-mechanical treatment. WAXD patterns of cellulose microfibers showed nearly no change before and after oxidation, with little change in crystallinity. This confirms that the oxidation reaction occurred at the surface of the crystalline core or amorphous regions. As the oxidation reaction did not substantially affect the degree of crystallinity of cellulose nanofibers, the process will not change the mechanical strength of modified cellulose nanofibers, even though there could be many carboxyl or aldehyde groups located on the surface of those modified cellulose microfibers. After mechanical treatment, the crystallinity of cellulose nanofibers was 63.6%, being comparable with initial samples having crystallinity of 64.3 and 65.5%, respectively. According to the Scherer equation shown in Equation (4):

$$D = \frac{K\lambda}{\beta\cos\theta}, \quad (4)$$

where K is 0.89, λ is the X-ray wavelength, and β is the Full Width at Half Maximum (FWHM), which is obtained after the peak fit. The crystal size (D) of (200) diffraction pattern was estimated, as shown in FIG. 31. The crystal sizes of cellulose fibers were 6.5, 5.6 nm for initial microfibers and 6.1 nm for cellulose nanofibers, which could be matched with the result measured from TEM images (FIG. 23), with a fiber diameter of about 5 nm.

Cellulose nanofibers can be chemically modified to further expand their physical and chemical properties for different applications. This is particularly important and relatively unique for cellulose and the advantages are desirable not only for liquid filtration but also for air filtration. All the chemical modifications are based on the reactions with carboxyl, hydroxyl, and aldehyde groups located on cellulose nanofibers backbones, and are shown as examples, as the diversity for cellulose modifications is exceptional.

The primary hydroxyl groups of cellulose are about 6.0 mmol/g cellulose, while the secondary hydroxyl groups are about 12.0 mmol/g cellulose. After oxidation, a part of the primary hydroxyl groups is oxidized into carboxyl groups and aldehyde groups, which are affected by the amount of oxidants and the pH value of the reaction system as mentioned before. The carboxyl group content was about 0.7~1.0 mmol/g cellulose, as determined by conductivity titration. Thus, 12.0 to 17.0% (mol %) of primary hydroxyl groups could be oxidized into carboxyl groups. When functional groups are introduced, the density of functional groups located on the surface of the cellulose nanofibers will depend on the content ratio of hydroxyl, carbonyl, and aldehyde. These chemical modifications, including oxidation of 6-position hydroxyl group, provide anti-bacterial properties to the cellulose nanofiber.

The modifications of cellulose nanofibers in aqueous or non-aqueous solvents are shown below. Characterization of cellulose nanofiber derivatives can be carried out using standard physical techniques.

Figure 32:
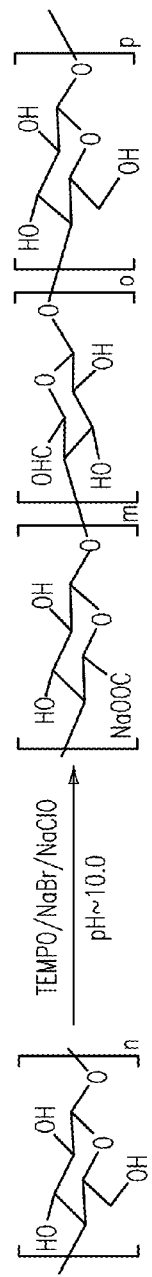
FIG. 32 shows preparation of cellulose nanofibers by 2,2,6,6-Tetramethylpiperidine-1-oxyl (TEMPO)/NaBr/NaClO oxidation, according to an embodiment of the present invention.

Negatively charged cellulose nanofibers were prepared by oxidation of the cellulose microfibers, followed by mechanical treatment. The synthetic preparation of cellulose nanofibers by TEMPO/NaBr/NaClO oxidation is shown in FIG. 32. A series of the cellulose nanofibers with a negatively charged surface and a fine diameter (~5 nm) are prepared. The degree of modification is indicated by the carboxyl group content, which is determined by conductive titration, as shown in FIG. 1.

Figure 33:
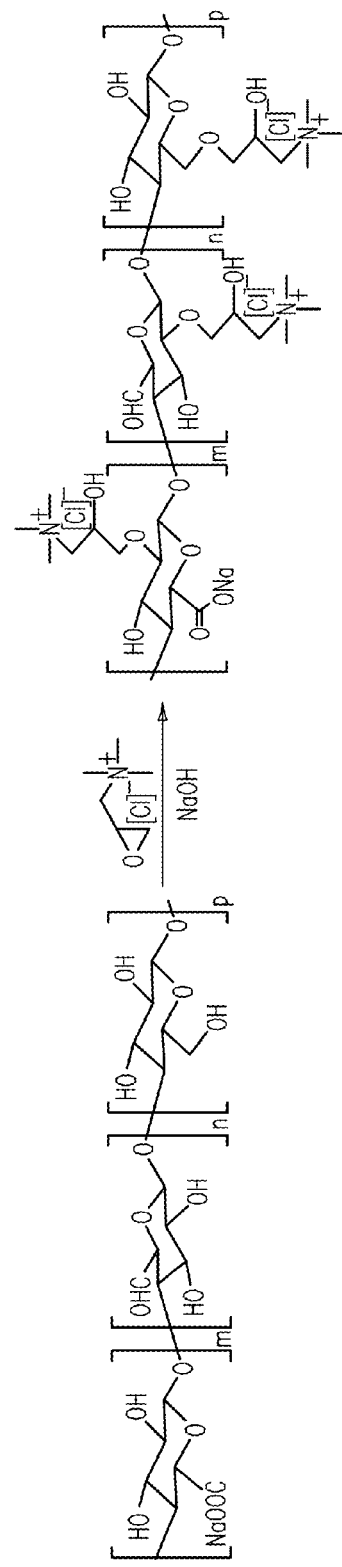
FIG. 33 shows chemical modification of cellulose nanofibers, according to an embodiment of the present invention.

The cationic functionalization of the surface of cellulose nanofibers through a reaction with epoxy-substituted ammonium in alkali aqueous solution was also carried out, as shown in FIG. 33. The size and shape of the crystals remains unchanged, however, the functional process reversed the surface charge and led to a reduction of the total surface charge density.

Cationic cellulose nanofibers were prepared by mixing cellulose nanofibers suspension 200 g (0.20%, 0.4 g of cellulose) and 200 mL (2 mol/L) of NaOH followed by adding 2.3 g of glycidyltrimethylammonium chloride. The mixture was stirred at 40-50° C. for two days. After reaction, the product was washed three times with ethanol and dried.

Figure 34A:
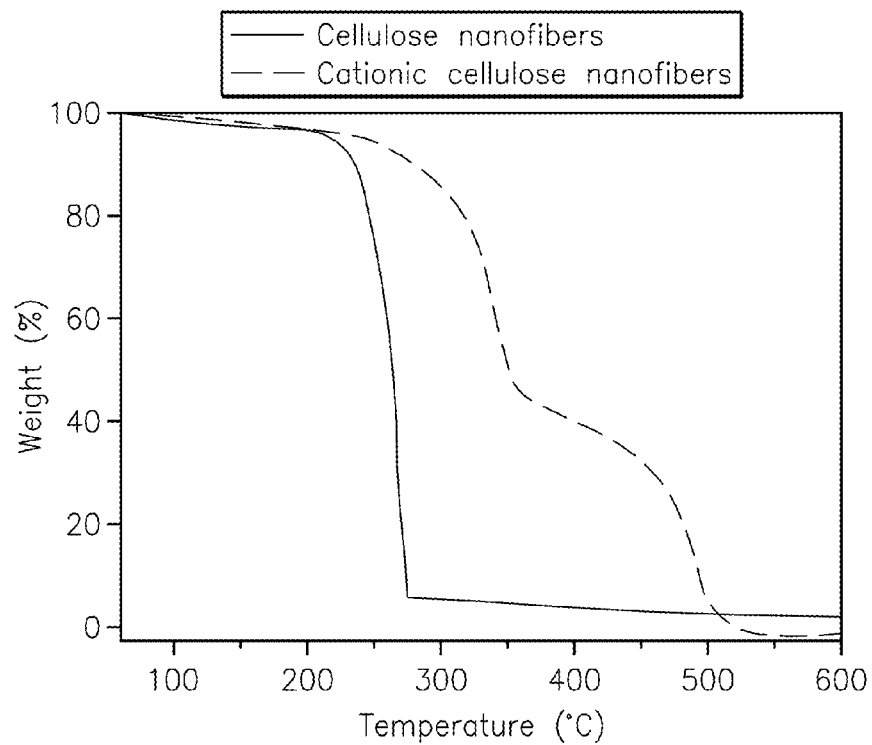
FIGS. 34(a) and 34(b) are charts showing thermal stability ((a) TGA and (b) DSC) of cellulose nanofibers and cationic cellulose nanofibers, according to an embodiment of the present invention.
Figure 34B:
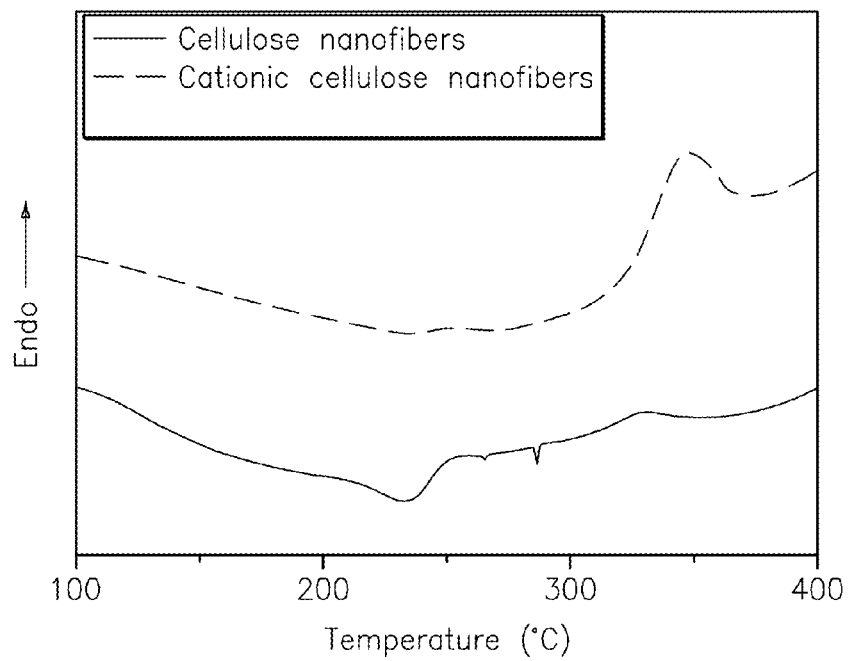

The onset decomposition temperature of the cationic cellulose nanofibers is higher than that of original cellulose nanofibers. Two step decomposition, from 250° C. to 340° C. and from 340° C. to 500° C., respectively, is observed from FIGS. 34(a) and 34(b), due to the introduction of the ammonium substituted group. The endothermic peaks were shifted to higher temperatures from cellulose nanofibers to cationic cellulose nanofibers.

Figure 35:
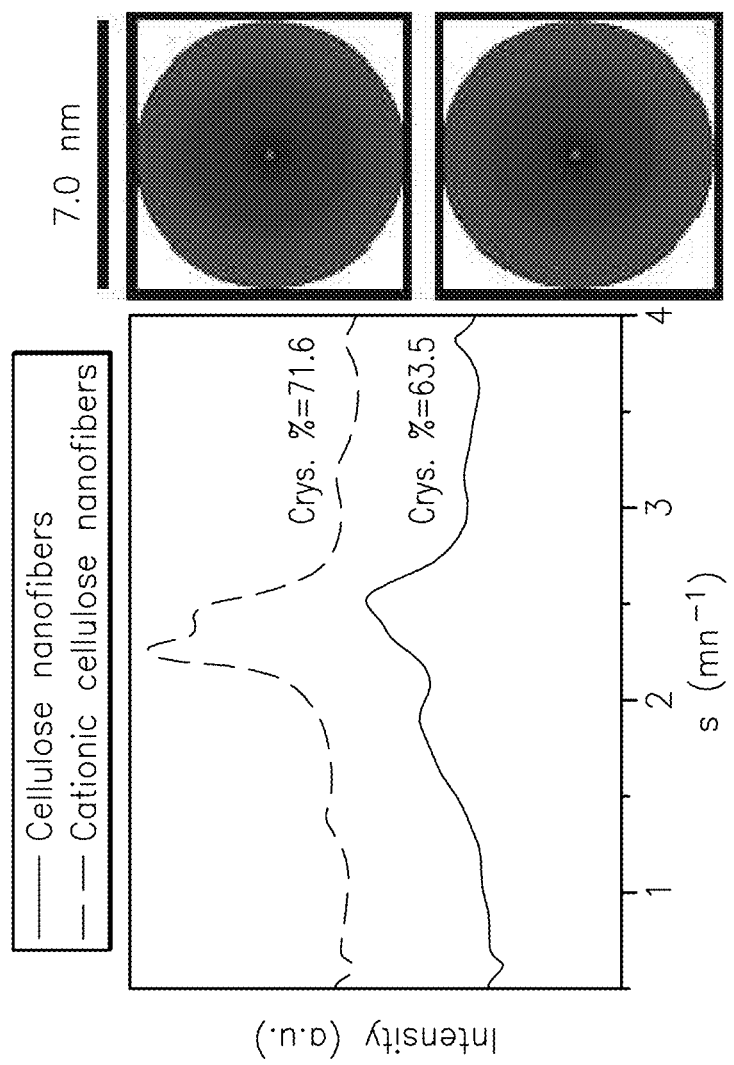
FIG. 35 is a chart showing crystallinity (Wide Angle X-ray Diffraction (WAXD)) of cellulose nanofibers, cationic cellulose nanofibers, according to an embodiment of the present invention.

The crystallinity of cationic cellulose nanofibers was investigated with WAXD patterns. FIG. 35 shows the X-ray diffraction profiles of cellulose nanofibers and cationic cellulose nanofibers. The profile of cationic cellulose nanofibers is quite different from that of original cellulose nanofibers. Moreover, the evaluated crystallinity of cationic cellulose nanofibers increased from original 63.5% to 71.6%. These features also clearly indicate that ammonium groups were introduced to the surface of cellulose nanofibers.

To alter the hydrophilic nature of cellulose nanofibers, cellulose nanofibers could be made more hydrophobic by an esterification reaction using acetic anhydride and a small amount of perchloric acid ($HClO_4$) as a catalyst, as shown in FIG. 36. This reaction is surface modification of cellulose nanofibers by partially acetylating hydroxyl groups, which will provide more hydrophobic property to cellulose nanofibers. The acetylation degree was controlled by the amount of acetic anhydride. The perchloric acid was used as the catalyst. This reaction has to be achieved in a nonaqueous solvent, such as toluene. Freeze dried cellulose nanofibers 0.23 g were immersed in a mixture of 40 mL of acetic acid, 50 mL of toluene, and 0.2 mL of $HClO_4$ (60%). Then, 10 mL of acetic anhydride was added with stirring. The mixture was allowed to stand at room temperature for 16 hours. After acylation, the cellulose nanofibers were washed thoroughly with ethanol and dispersed in DMF, followed by treatment with a homogenizer for five minutes.

The thermal stability of acetyl cellulose nanofibers is compared to cellulose nanofibers, cellulose acetate and cellulose triacetate in FIGS. 37(a) and 37(b). The decomposition temperature is 270.9° C. It is much higher than that of cellulose nanofibers, which started at 240° C. However, it is lower than that of cellulose acetate (295.8) and cellulose triacetate (305.4). The TGA curve of acetyl cellulose nanofibers is very similar to that of cellulose acetate/triacetate, but different from cellulose nanofibers which decomposed very quickly. The DSC results provide a similar result. The endothermic peaks were shifted to a higher temperature, indicating that the acetyl groups have been introduced into the cellulose nanofibers.

Figure 38:
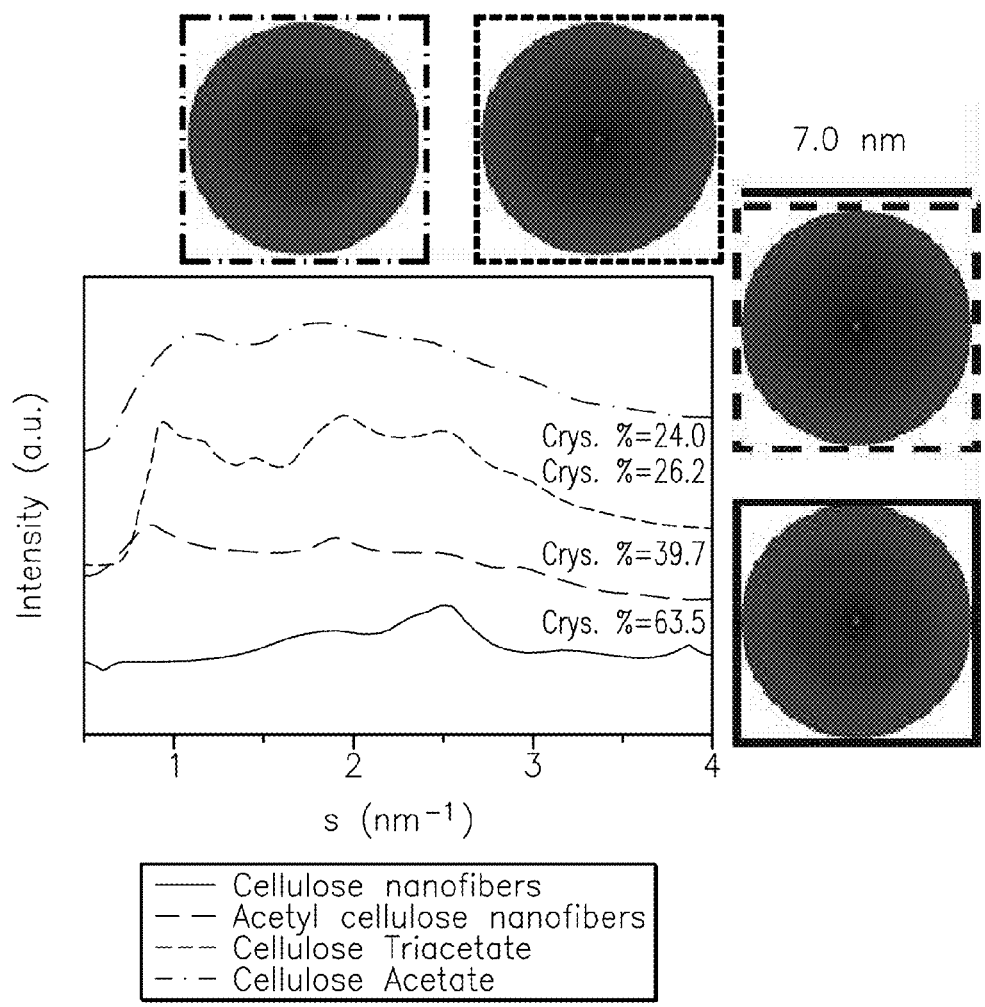
FIG. 38 is a chart showing crystallinity (WAXD) of cellulose nanofibers, acetyl cellulose nanofibers, cellulose triacetate, and cellulose acetate, according to an embodiment of the present invention.

The crystallinity of acetyl cellulose nanofibers was determined with WAXD patterns. FIG. 38 shows the X-ray diffraction profiles of cellulose nanofibers, acetyl cellulose nanofibers, and cellulose acetate/triacetate. The profile of acetyl cellulose nanofibers differs from that of original cellulose nanofibers but is similar to that of cellulose acetate/triacetate. Moreover, the evaluated crystallinity of acetyl cellulose nanofibers decreased from original 63.5% to 39.7%, but still higher than that of cellulose acetate/triacetate (24.0 and 26.2%). These features also indicate that acetyl groups were introduced from the surface to the core of BC nanofibers as described in some references.

Furthermore, the dispersibility of modified cellulose nanofibers was determined with water and DMF, respectively, as shown in Table 5. The cellulose nanofibers are dispersed well either in water or in DMF. After acelylation, they could never be dispersed in water again, but are easily dispersed in DMF with high concentration. The cationic cellulose nanofibers aggregate together because there are both positive (ammonium) and negative (carboxylate) charges in the system. Interaction between ammonium and carboxylate will occur either in water or in organic solvents. In Table 5, a "✓" indicates good dispersion, "×" indicates poor dispersion or precipitate; "*" indicates a concentration of suspension of 0.05 wt % and "**" indicates a concentration of 0.01 wt %.

TABLE 5

|  | $H_2O$ | DMF |
|---|---|---|
| Cellulose nanofibers* | ✓ | ✓ |
| Acetyl cellulose nanofibers* | X | ✓ |
| Cationic cellulose nanofibers** | X | X |

Figure 39:
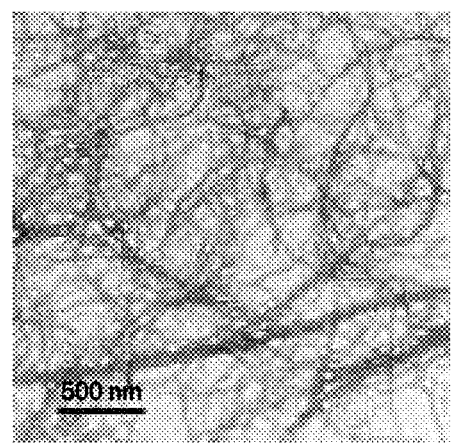
FIG. 39 is a TEM image of cationic cellulose nanofibers, according to an embodiment of the present invention.

An alterative method to prepare cationic cellulose nanofibers, which can be dispersed in water, 10.0 g of cellulose microfibers (Biofloc 92, cellulose content is 2.5 g) are dispersed into 600 mL of NaOH (2 mol/L) aqueous solution followed by adding 7.7 g of glycidyltrimethylammonium chloride. The mixture is stirred at 60° C. for three days. After thoroughly washing the modified cellulose fibers, homogenizer was used to chop up the microfiber into nanofibers. The TEM image of cationic cellulose nanofibers was showed in FIG. 39. The fiber diameter is about 10~20 nm with the length of the nanofiber more than 5 μm.

Figure 40:
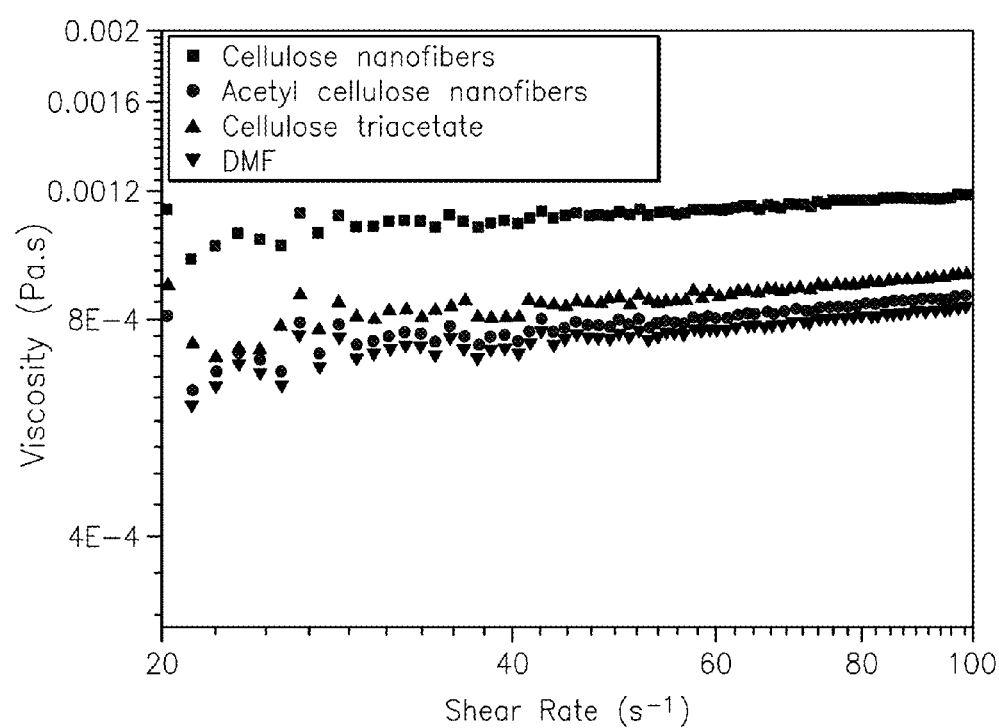
FIG. 40 is a chart showing viscosities of cellulose nanofibers, acetyl cellulose nanofibers, and cellulose triacetate in DMF with 0.05 wt % of concentration, according to an embodiment of the present invention.

The rheological behavior of acetyl cellulose nanofibers in DMF at ambient temperature is shown in FIG. 40. The viscosity of acetyl cellulose nanofibers was much lower than that of cellulose nanofibers, even lower than that of cellulose triacetate at the same concentration. It matches the previous X-ray results indicating the acetylation occurred from surface to the core of cellulose nanofibers, which changed their properties.

Cellulose Nanofiber Membrane

Figure 41:
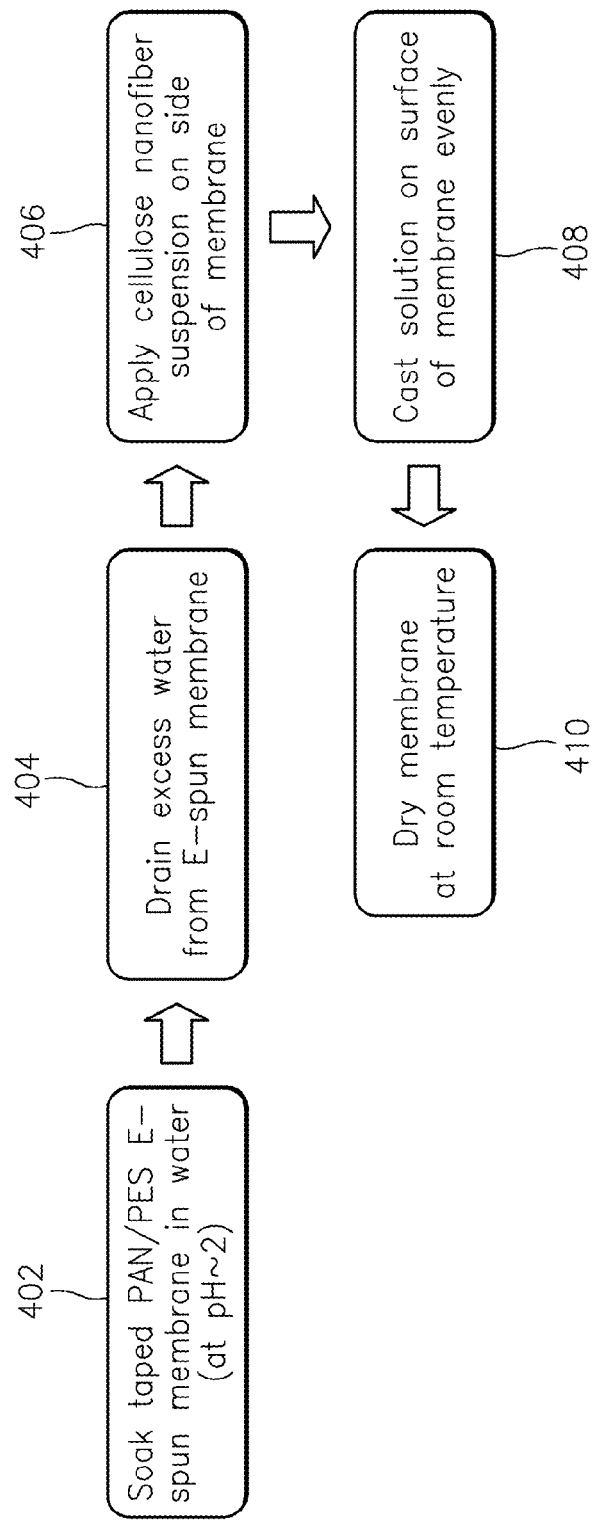
FIG. 41 is a flow chart illustrating preparation of cellulose nanofiber membrane, according to an embodiment of the present invention, according to an embodiment of the present invention.

Cellulose nanofiber aqueous solutions with different concentrations were used to fabricate coating layers on PAN and PES e-spun membranes, as shown in FIG. 41. A taped PAN/PES E-spun membrane is soaked in water in step 402. Excess water is drained from the E-spun membrane in step 404. Cellulose nanofiber suspension is applied on one side of the membrane in step 406. The solution is cast evenly on the membrane surface in step 408. The membrane is dried at room temperature in step 410. All membranes were stored at room temperature in a dry box and wetted with water before use.

Cellulose nanofiber aqueous solutions can be applied in water filtration process. One embodiment of the present invention uses a concentrated cellulose nanofiber aqueous solution (with concentration being higher than 0.05%) as a coating solution to produce a coating layer directly on electrospun substrates. A second embodiment of the present invention uses ~5 nm diameter cellulose nanofibers (with a variable concentration being often lower than 0.05%) as an additive to strengthen the top barrier as a nano-composite and to create liquid (in this case, water) nano-channels in order to increase the permeation flux of the membrane.

There are many advantages to using ionic liquid as the solvent in fabricating cellulose as the barrier layer in the separation membrane. First, the cellulose nanofibers could be dispersed in water, which is regarded as a green solvent. It is environmentally benign when compared with most other coating processes. Second, water can be evaporated directly after coating without further treatment. When an ionic liquid is used, which is also regarded as a green solvent, one more step has to be performed, i.e., removal of the ionic liquid by water or ethanol extraction. Third, with concentration of the cellulose nanofiber aqueous solution being much lower (about 0.05% to 0.20%, and partially because of their high viscosities at higher concentrations), a very thin barrier layer (for example, the range of barrier layer is from 0.05 to 1.0 μm) can easily be achieved. Finally, many cellulose nanofibers with ~5 nm diameter can serve as water channels to improve the permeation flux of water.

The formation of a TFC was used to fabricate this unique class of high-flux membranes containing an integrated nanocomposite cellulose nanofiber coating layer. Typically, the TFC membrane consists of a three-tier composite structure. The top layer is the key for separation of solute and permeates. The middle layer serves as a support, in which the high-flux nano-fibrous membrane with large porosity and uniform structure is used in the present study. This nanofibrous mid-layer is often fabricated by electrospinning that replaces the conventional asymmetric porous membrane, normally fabricated by the phase inversion method. PAN E-spun membrane was used as the middle layer. The bottom layer is a non-woven microfibrous support possessing strong mechanical property. The top cellulose nanofiber coating layer is suitable for both the conventional TFC format and the high flux nano-fibrous format.

Figure 42A:
FIGS. 42(a)-(c) are SEM images of PET, according to an embodiment of the present invention.
Figure 42B:
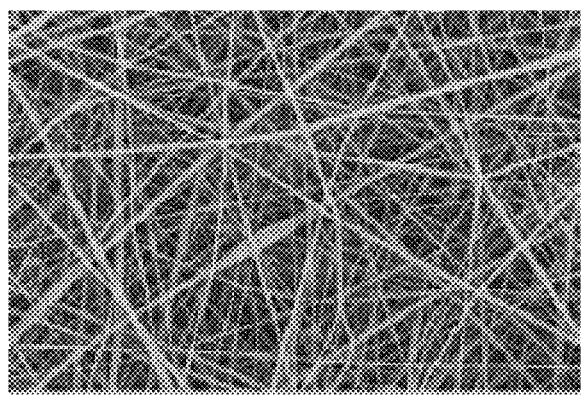
Figure 42B:
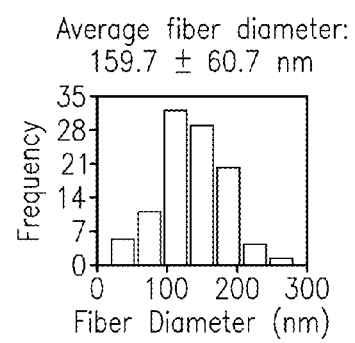
Figure 42C:
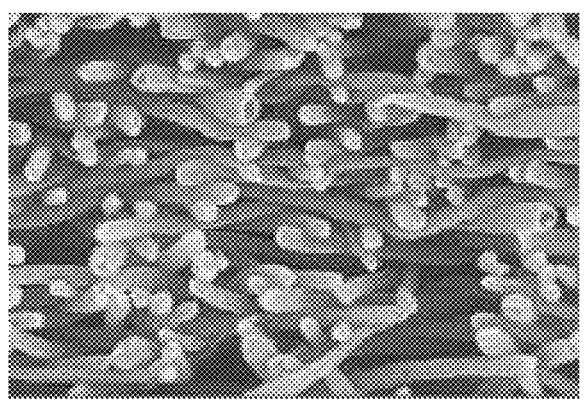
Figure 42C:
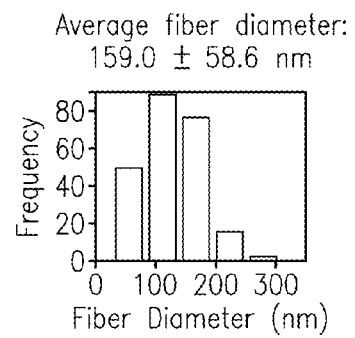

The PAN E-spun membrane, as shown in FIGS. 41(a)-(c), was prepared under prescribed conditions. The surface morphology of the PET non-woven substrate is also included in FIG. 42, with a top view provided in FIG. 42(a), and views tops and cross-sectional view of a PAN electrospun (E-spun) membrane provided in FIGS. 42(b) and (c). The average fiber diameter of E-spun membrane estimated from SEM images was about 159.7±60.7 nm, which was about 180 times smaller than that of the PET non-woven support (28,900±6,200 nm). From the cross-sectional image of the E-spun membrane, the fiber diameter was estimated at about 159.0±58.6 nm, in very good agreement with that estimated from the top view.

Table 6 lists maximum pore size of the E-spun membrane and that of the PET support based on bubble point tests with water as the fluid. The maximum pore size of PET was above 400 μm, representing about one hundred times higher than that of the PAN E-spun membrane (~3.6 μm). In the embodiments of the present invention, although the porosity of the PAN E-spun membrane was about 83.2%, while that of the PET substrate was approximately 62.1%, as measured by the weighing method, the pure water flux of PAN E-spun membrane was about 20 times lower than that of PET at low pressures (e.g., ~2.3 psi). This discrepancy is due to the uneven pore size and blockage of the E-spun membrane.

TABLE 6

|  | Thickness (μm) | Fiber diameter (nm) | Pore size (μm) | Porosity (%) | Pure water flux (L/m²h) | Young's modulus (Mpa) | Ultimate tensile strength (MPa) | Elongation at break (%) |
| --- | --- | --- | --- | --- | --- | --- | --- | --- |
| PET | 135.2 ± 17.8 | 28900 ± 6200 | >400 | 62.1 | 92000 ± 200 | 276.2 ± 113 | 27.2 ± 5.3 | 16.2 ± 6.0 |
| PAN E-spun | 54.0 ± 5.0 | 159.7 ± 60.7 | ~3.6 | 83.2 | 4000 ± 20 | 125.2 ± 2.6 | 6.3 ± 0.1 | 48.0 ± 1.0 |
| Cellulose nanofiber barrier | 0.1 ± 0.05 | — | <0.055 | — | 140.0 | — | — | — |
| PAN10 | 151.8 ± 7.2 | — | <0.013 | 17.3 | 25.1 | — | — | — |
| PAN400 | 141.0 ± 4.0 | — | <0.055 | 15.5 | 84.2 | — | — | — |

The mechanical property of the PAN E-spun membrane as well as that of PET had been determined by tensile experiments, as listed in Table 6. The Young's modulus of the PET was 2-3 times higher than that of the PAN E-spun membrane. Meanwhile, the ultimate tensile strength of the PET was four times higher than that of the PAN E-spun membrane at comparable elongation to break. All results definitely indicated that the PET was a stronger substrate than the PAN E-spun membrane. Thus, the composite membrane of the present invention, the PET was used as the bottom substrate, supplying the needed high mechanical strength.

The PAN E-spun membrane was immersed in DI water (pH ~2) to be wetted and to be filled with water in order to prevent heavy penetration of the cellulose nanofiber solution. At the interface between acidic water and cellulose nanofiber suspension, a gel is immediately formed which slows down the diffusion of the cellulose nanofiber solution from aqueous phase to support phase. As a result, only one or two layers of the E-spun nanofibers are incorporated into the barrier layer. The cellulose nanofiber solution is cast with a coating rack having a thickness of the barrier layer as controlled by the height of the tapes used. After coating, the cellulose nanofiber-coated membrane is dried at room temperature or 100° C. The cellulose nanofiber membrane is stored for use at room temperature after drying.

Figure 43:
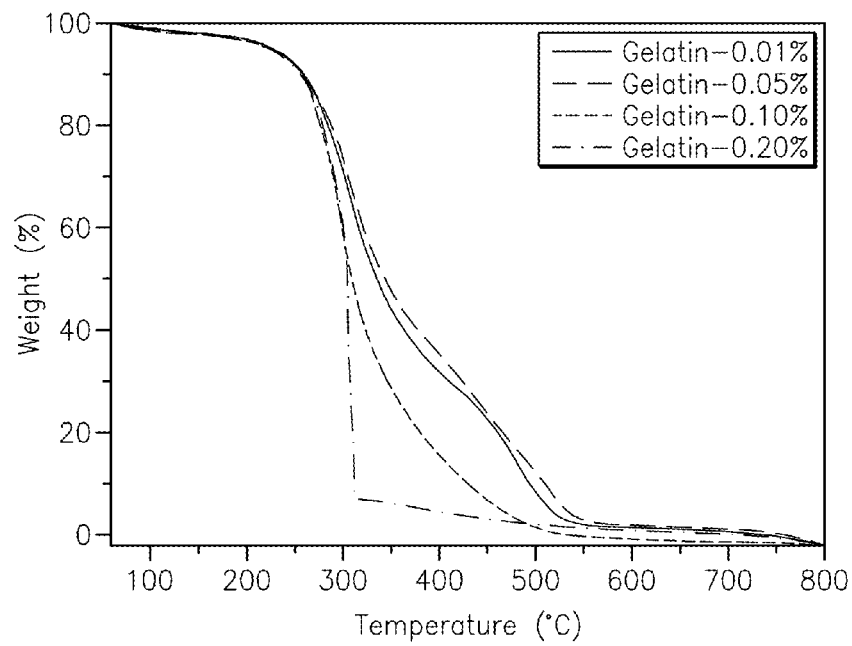
FIG. 43 is a chart showing thermal stability of cellulose nanofiber membranes prepared from different concentration of solutions, according to an embodiment of the present invention.

FIG. 43 shows the thermal stability of the cellulose nanofiber membranes prepared from cellulose nanofiber solutions with different concentrations. The cellulose nanofiber membranes were dried by freeze drying. The onset of decomposition of the membranes are almost same at 240° C., however, the decomposition of the cellulose membrane prepared from lower concentration (e.g., 0.01 or 0.05 wt %) is slower than that of higher concentration of cellulose. This trend is opposite that of FIG. 30, in which the higher concentration, the slower decomposition. The completely decomposed temperature for all membranes is above 310° C., which is higher than that of the original cellulose nanofibers, which is below 280° C. This difference is attributed to the gelatin process of cellulose nanofibers at acidic conditions.

Figures 44A, 44B, 44C, 44D:
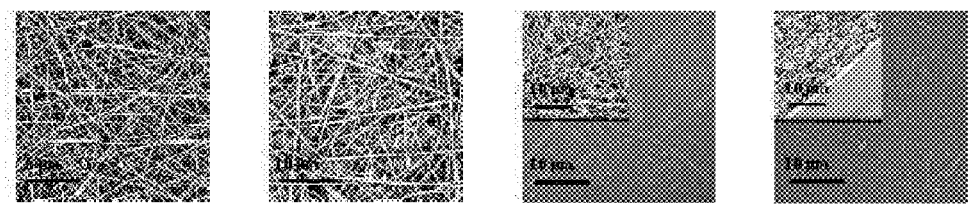
FIGS. 44(a) to 44(h) are SEM images of cellulose nanofiber membranes, according to an embodiment of the present invention.
Figures 44E, 44F, 44G, 44H:
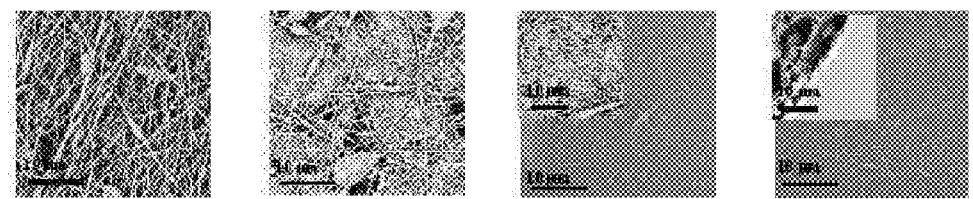

Cellulose nanofiber membranes on PAN/PES substrate, prepared by using different concentrations of cellulose nanofiber solutions were obtained by following the procedure outlined in FIG. 41. FIGS. 44(a) to 44(h) show their SEM images, namely, FIG. 44(a) PAN e-spun membrane; FIG. 44(b) Cellulose nanofiber/PAN coated with the concentration 0.20%; FIG. 44(c) Cellulose nanofiber/PAN coated with the concentration 0.30% (insert is the different part on the membrane); FIG. 44(d) Cellulose nanofiber/PAN coated with the concentration 0.50% (insert is the cross-section of the membrane); FIG. 44(e) PES e-spun membrane; FIG. 44(f) Cellulose nanofiber/PES coated with the concentration 0.20%; FIG. 44(g) Cellulose nanofiber/PES coated with the concentration 0.30% (insert is the different part on the membrane); FIG. 44(h) Cellulose nanofiber/PES coated with the concentration 0.50% (insert is the cross-section of the membrane).

As shown in FIGS. 44(a) to 44(h), after coating with cellulose nanofiber aqueous solution (0.20%), the surface fibers were still present due to the heavy penetration of the coating solution. As described above, the viscosity of cellulose nanofiber aqueous solution with 0.20% concentration was 0.003 Pa·s, which was much lower than that of the cellulose coating solution in an ionic liquid (0.10%, 0.18 Pa·s). Buy increasing the concentration of cellulose nanofiber aqueous solution to 0.30%, the viscosity is increased to ~0.08 Pa·s, thereby improving the coating layer quality due to a decrease in the penetration of the substrate. However, at the same time, the coating solution was distributed less evenly so that some part could not be covered very well by cellulose nanofibers (see FIG. 44(c)). Further increasing the concentration to 0.50%, a flat and evenly coated layer was observed from FIG. 44(d), and the viscosity of the coating solution was increased to about 2.63 Pa·s. This cellulose nanofiber membrane was selected to test the water filtration process. However, the thickness of the coating layer was about 1.5 μm. It was too thick when compared with the cellulose membrane prepared by using an ionic liquid, which has a top layer thickness of only 0.3 to 0.5 μm. Cellulose nanofiber/PES membrane showed similar results when compared with that of cellulose nanofiber/PAN, with the thickness of the top layer being about 2.5 μm when 0.50% of cellulose nanofiber aqueous solution was used. Top layer thickness optimization is dependent upon solution viscosity, the solvent used, and the processing procedure, which can be achieved in a continuous large-scale processing procedure by appropriate adjustment of the variables.

Figure 45:
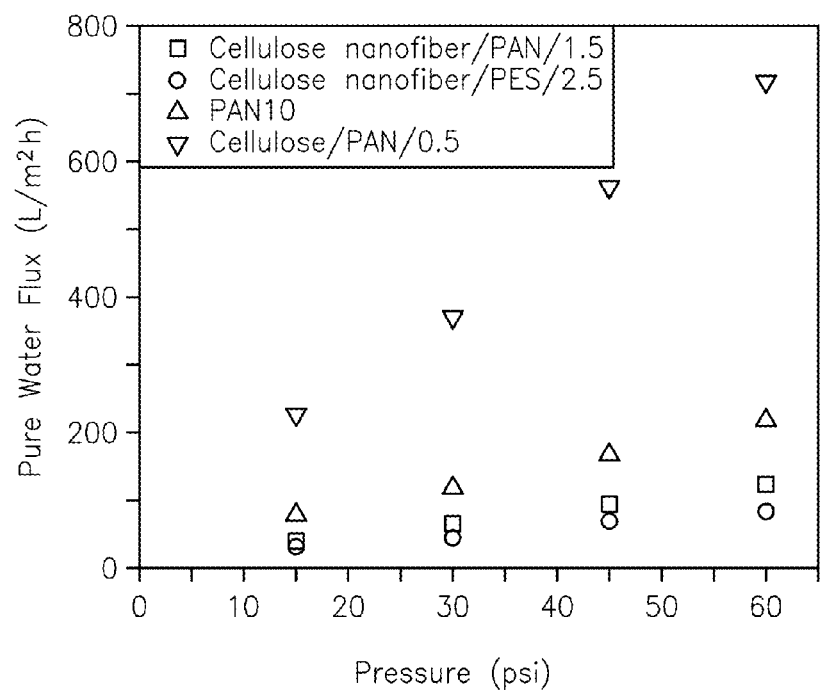
FIG. 45 is a chart showing pure water fluxes of cellulose nanofiber membrane based on PAN and PES E-spun membranes, according to an embodiment of the present invention.

Pure water fluxes of cellulose nanofiber membranes are shown in FIG. 45. When the coating layer was too thick, the pure water flux of cellulose nanofiber membrane/PAN/PES was lower when compared with a commercial membrane PAN10 (Sepro). Thus, cellulose nanofiber membranes with thinner layers (~0.5 μm) are required without heavy penetration into the substrate, specifically, with concentration of cellulose nanofiber aqueous solution lower than 0.50%.

Figures 46A, 46B:
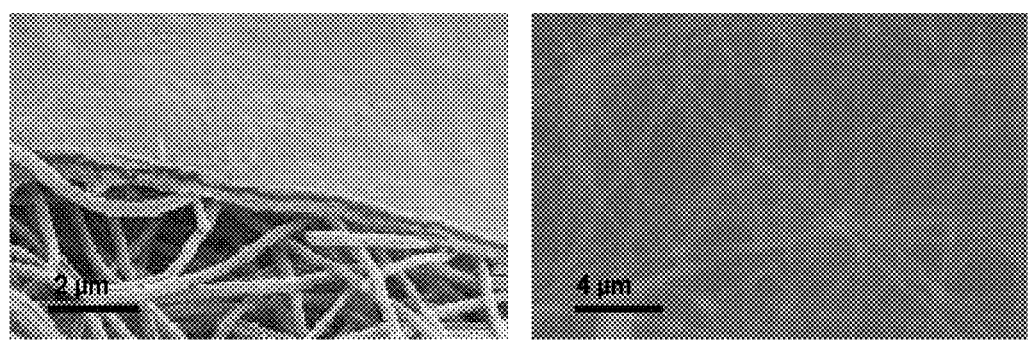
FIGS. 46(a) and 46(b) include SEM images of cellulose nanofiber membrane based on PAN (cross-sectional and top views) with 0.50 µm thickness of top layer, according to an embodiment of the present invention.
Figure 49A:
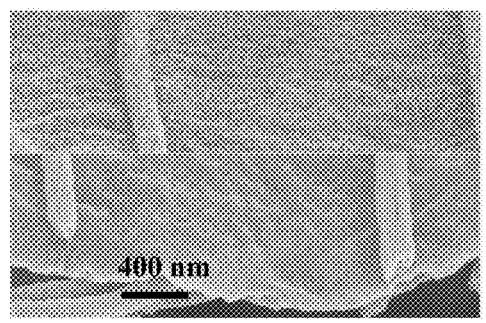
FIGS. 49(a) through 49(d) provide SEM images of cellulose nanofiber membranes, according to an embodiment of the present invention.
Figure 49B:
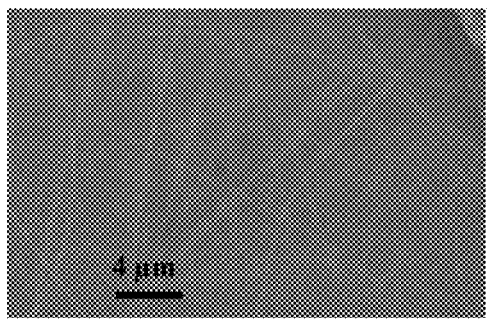
Figure 49C:
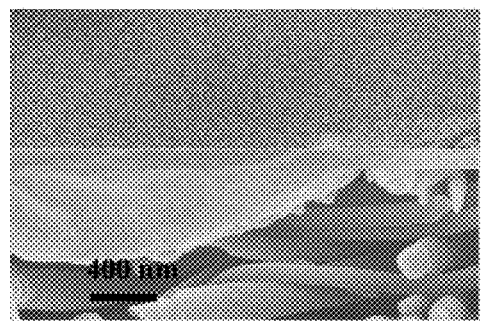
Figure 49D:
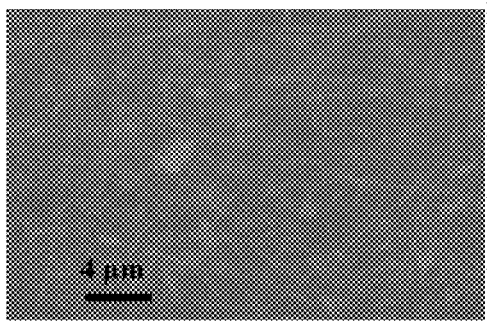

As described above, the cellulose nanofiber aqueous solution is sensitive to pH value and ionic strength, and decreasing pH or increasing ionic strength of the solution will promote the formation of gelatin. The e-spun PAN/PES membrane is immersed in water with the pH value less than 2.0, or in water with the concentration of sodium chloride more than 0.04 mol/L before coating the cellulose nanofiber aqueous solution. At the interfacial phase between E-spun fibers and coating solution, gelatin was formed which avoids penetration even at very low concentrations of cellulose nanofiber solution. A cellulose nanofiber aqueous solution with a concentration=0.20% was used to prepare the cellulose nanofiber/PAN membrane. FIGS. 46(a) and 46(b) show corresponding SEM images. The surface of cellulose nanofiber membrane is very flat and the thickness of the top layer was about 0.5 μm. However, in this case, 0.01 mol/L of HCl has to be used which may challenge steel instruments used in large scale production.

Another cellulose nanofiber membrane, prepared with 0.2 mol/L of sodium chloride aqueous solution, followed the same procedure. The corresponding SEM images are shown in FIGS. 47(a) and 47(b). Sodium chloride crystals are formed after drying the membrane, which could produce defects on the surface of the membrane. After pouring the coating solution on the surface of the E-spun membrane and waiting one minute, the coated membrane may be inserted into water to remove salt for one-half hour. The membrane is then dried at room temperature. FIGS. 48(a) and 48(b) show the corresponding SEM images of the membrane with cellulose top layer coating.

The pure water flux of the cellulose nanofiber membrane increased with increasing pressure. However, the flux depends dramatically on the thickness of the top layer. The thinner the top layer, the higher the flux, according to D'Arcy's law, as shown in Equation (5):

$$J = \frac{KP}{\eta L}, \tag{5}$$

in which K is hydraulic permeability of the membrane, η is viscosity of the liquid, L is thickness of the membrane and P is pressure.

This result suggests that J is inversely proportional to L and thinner coating is preferred in order to obtain higher permeation flux without decreasing the rejection ratio. However, the mechanical stability of the cellulose membrane is also taken into account, i.e., the thinner coating layer will eventually not be able to withstand higher pressures, more easily producing defects on the membrane during the coating process.

In the present invention, a 0.1-0.2 μm thickness for the barrier layer is preferable for the cellulose membrane. Compared to that of PAN10 with a water permeation flux of 3.44 L/(m²h·psi), the pure water permeation flux of the cellulose nanofiber membrane at a barrier layer thickness of approximately 0.1 μm was 61.40 L/(m²h·psi), about 18 times higher based on the same applied pressure. Even for PAN400, the permeation flux was approximately 36.90 L/(m²h·psi), about 1.7 times lower than that of cellulose nanofiber membrane.

Following the similar procedure as shown in FIG. 41, a series of cellulose nanofiber membranes were prepared with PAN E-spun membranes as the support and with different concentrations of cellulose nanofiber aqueous solution to prepare the barrier layer. 0.10 wt % and 0.05 wt % of cellulose nanofiber solutions were used to prepare cellulose nanofibers membrane in order to obtain the membrane with a very thin barrier layer. The SEM images of the cellulose nanofiber membranes were obtained and the surface morphology as well as the cross-sectional part of the membranes was observed. FIGS. 49(*a*) and 49(*b*) show at A and B cross-sectional and top views for a membrane from 0.10 wt %. FIGS. 49(*c*) and 49(*d*) show cross-sectional and top views for the membrane from 0.05 wt % of solution.

The thickness of the barrier can be estimated from the cross-sectional image. For the membrane prepared from cellulose nanofiber solution with 0.10 wt % of concentration, it is about 0.2 μm thick. The thickness of the membrane prepared from 0.05 wt % of cellulose nanofiber solution was about 0.1 μm, which is fairly thin compared to the barrier of other ultrafiltration membranes and implies a very high permeation flux even at lower pressure.

Figure 50A:
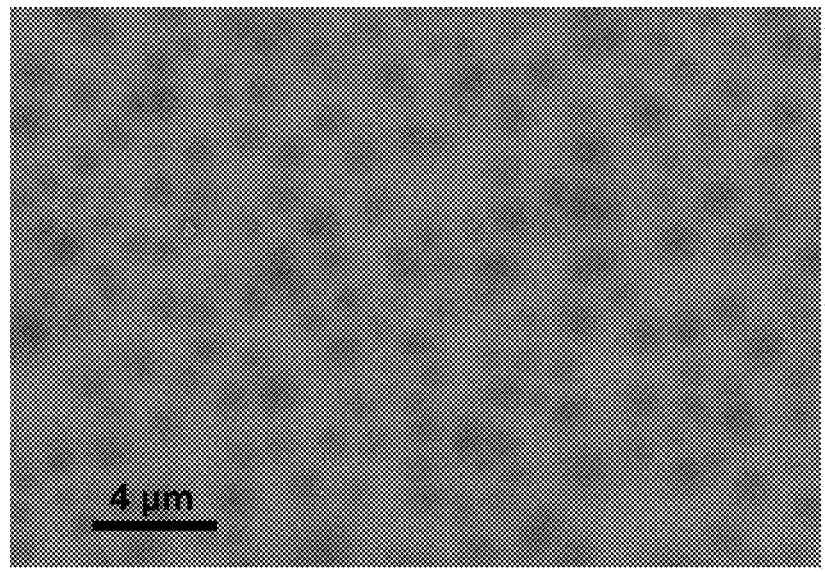
FIGS. 50(a) and 50(b) provide SEM images of PAN10 (A) and PAN400 (B) commercial membranes with top view, according to an embodiment of the present invention.
Figure 50B:
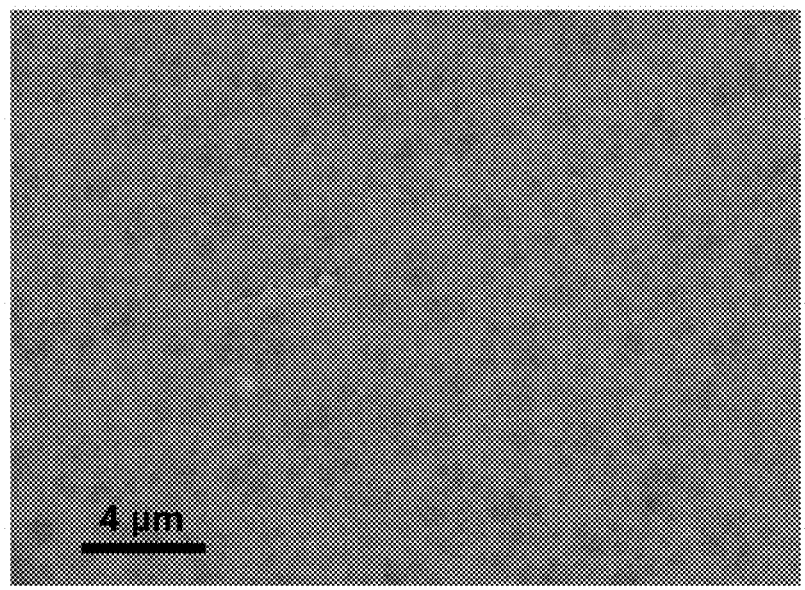

The barrier layer thickness in the resulting nanofibrous membrane was about 0.1 μm, and its surface was smooth and flat. From the cross-sectional image, the cellulose nanofiber barrier layer was shown to be relatively uniform with some segments of the PAN E-spun nanofibers being imbedded in the barrier layer. This integrated nanocomposite format reinforces the mechanical strength of the top coating layer, if the nanofibers are stronger than the more amorphous top layer. From the top view of the membrane, some streaks which could come from the contour of the nanofibrous scaffold were evident. The surface porosity of the nanofibrous scaffold was about the same as the bulk porosity of the scaffold (about 83.2%), being several times higher than that of current commercial asymmetric membranes (about 15.5~17.3% estimated from SEM images, FIGS. 50(A) and (B)) being fabricated by the phase inversion method.

Figure 51:
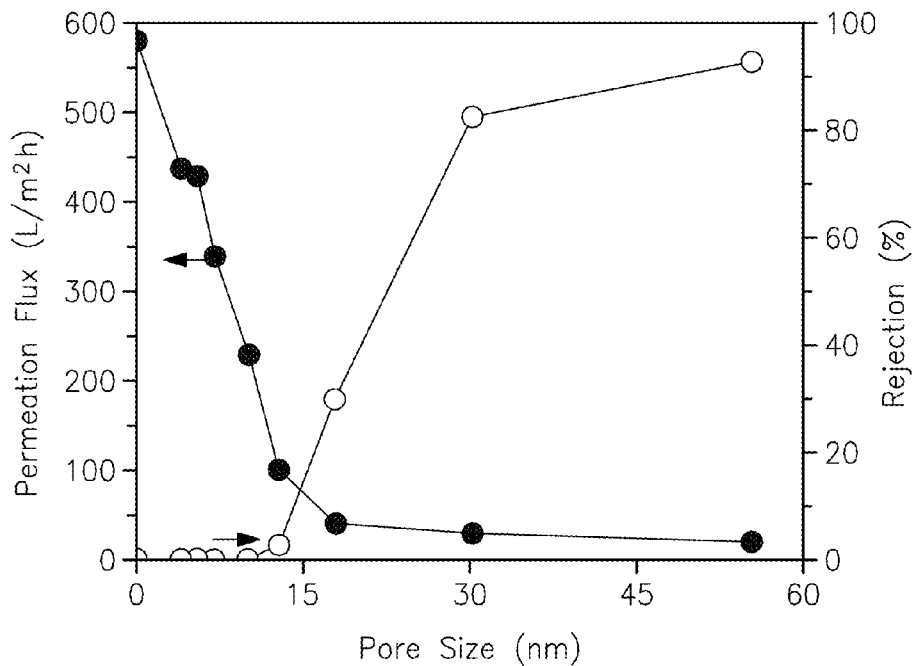
FIG. 51 is a chart showing permeation flux and rejection ratio of cellulose nanofiber membrane as a function of Molecular Weight Cut-Off (MWCO), according to an embodiment of the present invention.

The MWCO of the cellulose nanofiber membrane based on the PAN E-spun membrane support is shown in FIG. 51. The MWCO of the cellulose nanofiber membrane with 0.1-μm thickness of the top layer was ~2,000 KDa while the rejection ratio was higher than 90%, according to the TOC result. The Stokes-Einstein radius ($r_s$ in Å) of polydispersed dextran can be calculated from Equation (6):

$$r_s = 0.33 \times (MW)^{0.463} \quad (6),$$

with MW being the molecular weight of dextran in Da. According to the Equation (6), the radius of the dextran with molecular weight of 2,000 KDa was 27.3 nm. The MWCO of the cellulose nanofiber membrane was ~2,000 KDa, implying that more than 90% of the pores of the cellulose nanofiber membrane were smaller than the diameter of the dextran with 2000 KDa which is about 54.6 nm, thus, the pore size ($d_p$ in Å) of cellulose nanofiber membrane could be estimated according to Equation (7):

$$d_p = 2r_s \quad (7)$$

According to Equation (7), the pore diameter of the cellulose nanofiber membrane was less than 50 nm (for ~90% of pores).

The MWCO of PAN10 was about 70 KDa, while that of PAN400 was about 2,000 Kda, comparable with that of the cellulose nanofiber membrane.

Oil/water emulsion is used a simulated model for purification of bilge water in naval and other ships. Bilge water is a major pollutant, especially of the ocean. The oil particle size of oil/water emulsions could be estimated from 0.2 to 5.0 μm, being much higher than the MWCO of the cellulose nanofiber membrane, indicating that the fabricated cellulose nanofiber membrane could be used to separate impurities beyond the oil/water emulsion, although for oil molecules, smaller pores would be needed. The oil concentration of the permeate after filtration with the cellulose nanofiber membrane was less than 6.75 ppm (as the rejection ratio is above 99.5%), which satisfies environmental wastewater discharge standards, typically of <10 ppm, indicating that the cellulose nanofiber membrane is a good candidate for the treatment of oil/water wastewater.

The filtration efficiency was calculated in terms of the rejection percentage (R %) as follows in Equation (8):

$$R\% = \frac{C_f - C_p}{C_f} \times 100\% \quad (8)$$

where $C_f$ and $C_p$ are concentrations of the feed solution and the permeation solution, respectively. The concentrations were determined by UV at a wavelength of 240 nm.

Figure 52:
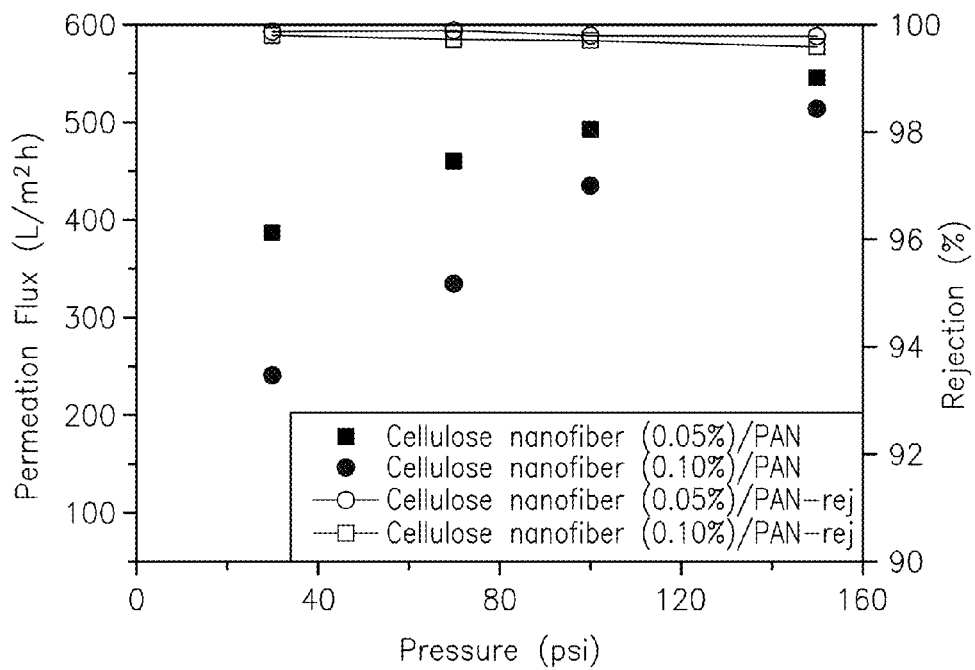
FIG. 52 is a chart showing permeation flux and rejection ratio of cellulose nanofiber (prepared from 0.10% and 0.05% aqueous solutions, respectively)/PAN membranes for filtration of oil/water emulsion at different pressures, according to an embodiment of the present invention.

Cellulose nanofiber membranes were employed to filter the oil/water emulsion at different pressures. FIG. 52 shows the permeation flux and the rejection %. The permeation fluxes of cellulose nanofiber membranes with different thickness of barrier layers increased with increasing pressure, while keeping the rejection ratio higher than 99.6%.

The permeation flux of thinner cellulose nanofibers membranes increases slower than that of the thicker one, implying that the thinner cellulose nanofiber membrane can most likely be used very effectively at low pressures. The permeation flux of thinner cellulose nanofiber membrane was about 400 L/m² h at 30 psi. However, for the thicker cellulose nanofiber membrane, higher pressure will be better if high permeation flux is required.

Figure 53:
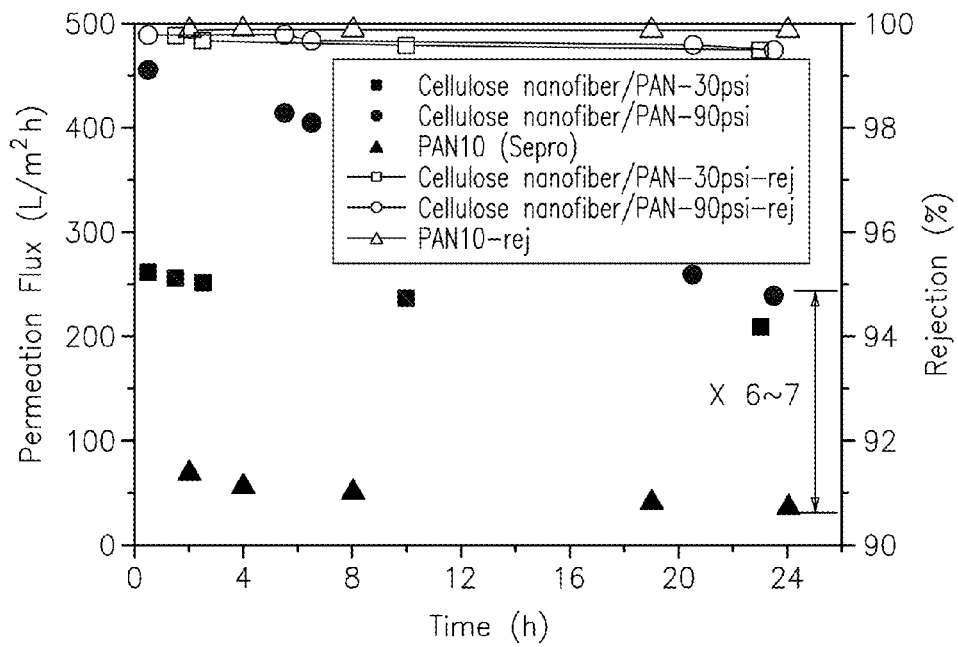
FIG. 53 is a chart showing permeation flux and rejection (%) of cellulose nanofiber (0.10 wt % aqueous solution)/PAN and PAN 10 (30 psi) membranes during 24 hours for filtration of oil/water emulsion, according to an embodiment of the present invention.

FIG. 53 shows the thicker cellulose membrane used for 1 day at 30 and 90 psi. The permeation flux of cellulose nanofiber membrane decreased after a 1-day filtration of oil/water emulsion. Only about 20% decrease in the permeation flux of cellulose nanofiber membrane was observed at 30 psi. The permeation flux decreased by about 48% at 90 psi, implying less fouling at lower operating pressure. However, the permeation flux was still 6~7 times higher than that of PAN 10 (about 50% decreased in permeation flux at 30 psi for one day). The rejection ratio was kept higher than 99.6% during the performance.

Figure 54:
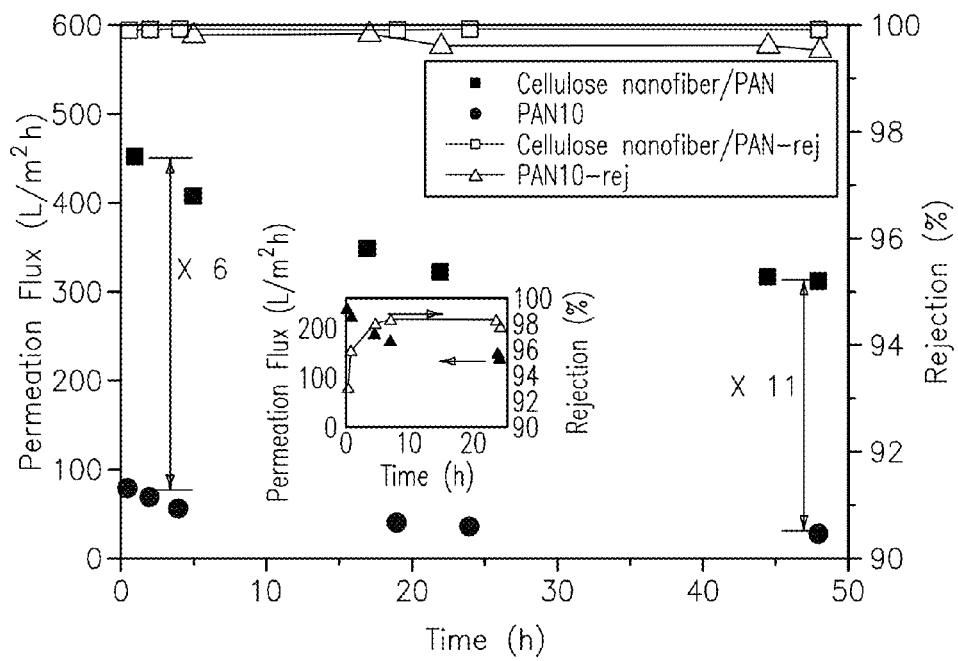
FIG. 54 is a chart showing permeation flux and rejection (%) of cellulose nanofiber prepared from aqueous solution with 0.05% of concentration/PAN and PAN 10/PAN400 membranes during 48 hours for filtration of oil/water emulsion, according to an embodiment of the present invention.

The performance of cellulose nanofibrous membrane was compared with that of two commercial PAN UF membranes:

PAN10 and PAN400. Although the membrane PAN10 has a lower MWCO (~70 KDa), it shows a similar rejection ratio for oil/water emulsion to that of the cellulose nanofiber membrane. FIG. 54 shows that the fluxes of both membranes decreased slowly during the filtration process because of the combined effects of the scaffold compaction as well as the fouling of oil on the surface of the membranes, while the corresponding rejection ratio increased slightly. After 48 hours of operation, the flux became more stable. The permeation flux of the cellulose nanofiber membrane was decreased by ~31%, while that of PAN10 was seriously decreased by ~66% of the starting value. The permeation flux of cellulose nanofiber membrane was consistently approximately eleven times higher than that of PAN10, while retaining the similar rejection ratio (above 99.6%) in both systems.

As for PAN400, the MWCO was about 2,000 KDa, similar to that of the cellulose nanofiber membrane. However, it had a much lower rejection ratio of only about 90.0% for the oil/water filtration at the start of the filtration process and 98.2% after operation for 24 hours, being much lower than that of the cellulose membrane (approximately 99.7%), while the permeation flux of the cellulose nanofiber membrane was still two and one-half times higher than of PAN400.

Membrane fouling remains a major problem for ultrafiltration membranes in the application of oil/water separation, with usual concerns being surface morphology and fluid affinity. Two kinds of fouling have to be considered during the ultrafiltration process: reversible and irreversible. Reversible oily fouling can be reduced by making the surface morphology smoother or enhancing surface hydrophilicity, while irreversible fouling would depend on surface pore size and its distribution which could be manipulated by considering the materials property and the coating process. The surface hydrophilicity can be estimated on the basis of contact angle measurements (CAM200 Optical Contact Angle Meter, KSV Instruments, LTD. In this test, Milli-Q water was used as the probe liquid.). For the cellulose nanofiber membrane, the contact angle of water was about 18.7°, while that of PAN E-spun membrane was about 57.6°, as well as that of PAN UF membrane at approximately 50°, implying that the cellulose nanofiber membrane should have lower fouling than that of commercial PAN10/400 membranes. From FIGS. 49(*a*) and 49(*b*), the PAN E-spun nanofibers were partially imbedded in the cellulose barrier layer. Thus, the surface morphology of the cellulose membrane would be affected by that of the PAN E-spun mid-layer. Furthermore, the thinner fiber diameter would produce a smoother top layer surface. Thus, the effects of E-spun mid-layer support have a dual effect on the performance of the top barrier layer.

Figure 55:
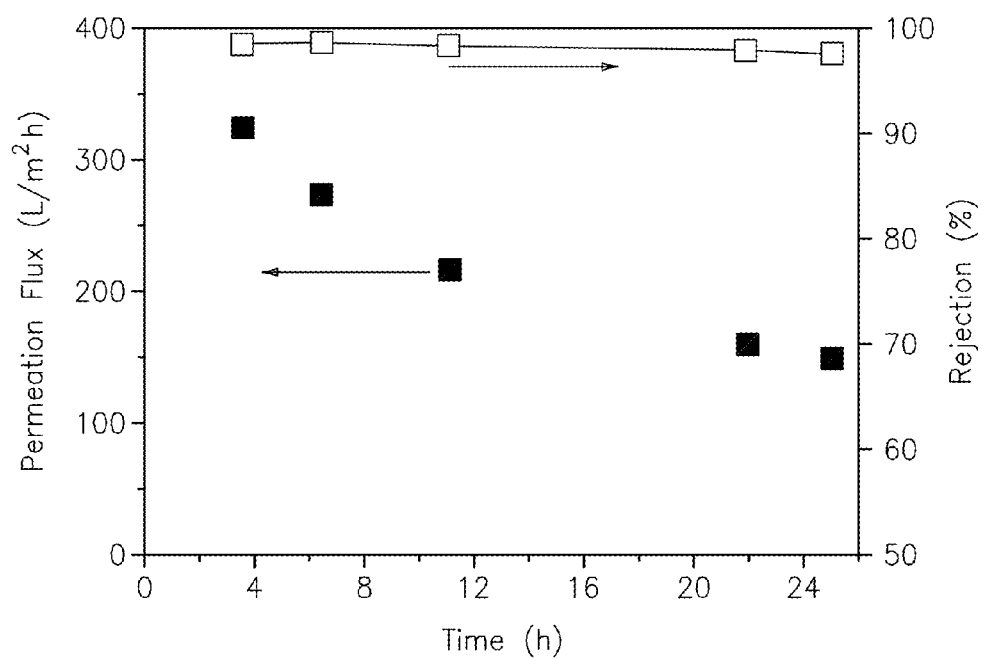
FIG. 55 is a chart showing permeation flux and rejection ratio of cellulose nanofiber membrane during 24 hours of filtration for sodium alginate solution, according to an embodiment of the present invention.
Figure 56A:
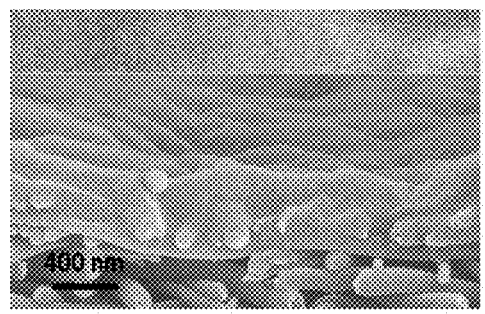
FIGS. 56(a)-(f) provide SEM images of PVA (cross-sectional (A) and top view (B)), PVA/cellulose nanofiber (0.005 wt %) (cross-sectional (C) and top view (D)), and PVA/cellulose nanofiber (0.025 wt %) (cross-sectional (E) and top view (F)) composite membranes, according to an embodiment of the present invention.
Figure 56B:
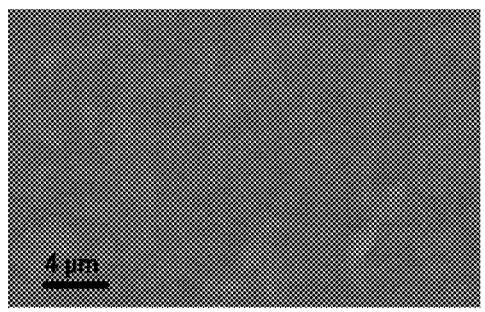
Figure 56C:
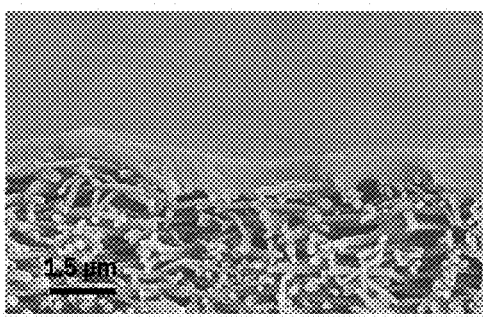
Figure 56D:
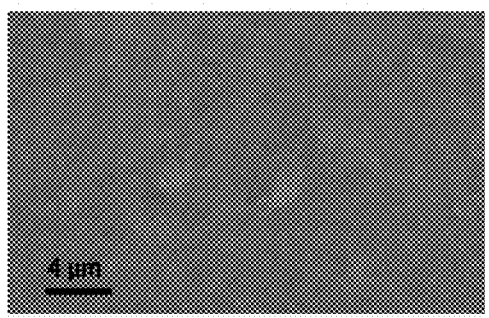
Figure 56E:
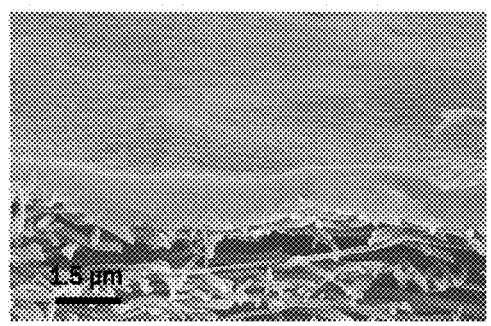
Figure 56F:
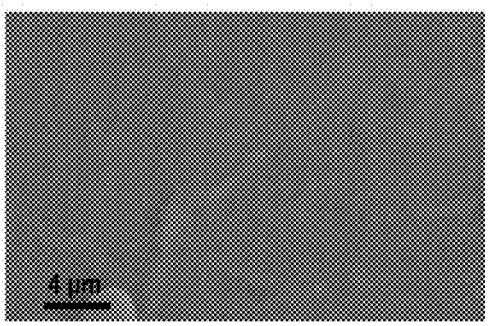

Another the fouling test was carried out with sodium alginate (500 ppm, 80-120 KDa), a microbial polysaccharide, which usually represented extracellular polymeric substances, was added in water. The permeation flux and the rejection ratio of the cellulose nanofiber membrane were carried out for a period of 24 hours. The results are shown in FIG. 55. The permeation flux decreased with time to approxiniately 55% of the starting flux, implying a higher fouling rate than that of the oil/water emulsion because of the adsorption of sodium alginate on the more hydrophilic surface of the cellulose nanofiber membrane. However, the rejection ratio was higher than 97.7% according to the TOC results.

Cellulose Nanofiber Composite

In another embodiment of the present invention, the cellulose nanofibers are introduced into the barrier layer by simply mixing the cellulose nanofiber aqueous solution and PVA solution at a different ratio in order to obtain a coating solution with a certain amount of cellulose nanofiber. The preparation of PVA (2 wt % and 4 wt %) coating solution is performed by adding 0.6 g (or 1.2 g of PVA for 4 wt %) of PVA in 29.4 g of water following by heating the solution for 1 day at 90° C. Cellulose nanofiber aqueous solutions having concentrations of 0.01%, 0.05%, 0.10%, 0.20%, and 0.40% are added into the PVA aqueous solution (4.0%) at equal weight ratio. The mixture is stirred at room temperature over night. A clear solution is obtained containing PVA (2.0%) and cellulose nanofibers (from 0.005 to 0.20%). However, the PVA solutions with 0.10 and 0.20% of cellulose nanofibers were heterogeneous under the mixing conditions (a phase separation was observed).

The PVA/CN composite membrane is prepared according to the following procedure. The procedure for the coating of the cross-linked PVA top layer is as follows. (1) Soak the PAN E-spun membrane in $H_3BO_3$ aqueous (0.8 mol/L) solution and drain after putting on PET support. (2) Tape the edges of membrane to control the thickness of the top coating layer of the membrane. (3) 2 wt % PVA aqueous solution (cross-linked by GA, r=[—OH]/[GA]=0.25, 19.5 minutes reaction with GA.) is cast-coated on the surface of PAN E-spun membrane. (4) The membrane is incubated in an oven (humidity: 100%) at room temperature for twelve hours before test.

SEM images of PVA and PVA/cellulose nanofiber composite membranes are shown in FIGS. 56(*a*) and 56(*b*). The thickness of the barrier of all membranes was about 0.5-0.8 μm. The surface morphology of the membranes was very flat, which is a very important factor to affect on the low fouling property of PVA membranes.

0.01 and 0.05 wt % of cellulose nanofiber aqueous solutions were employed to prepare PVA/CN composite membranes. After dilution, the cellulose nanofiber concentration of the coating solutions were 0.005 wt % and 0.025 wt %, respectively.

Figure 57:
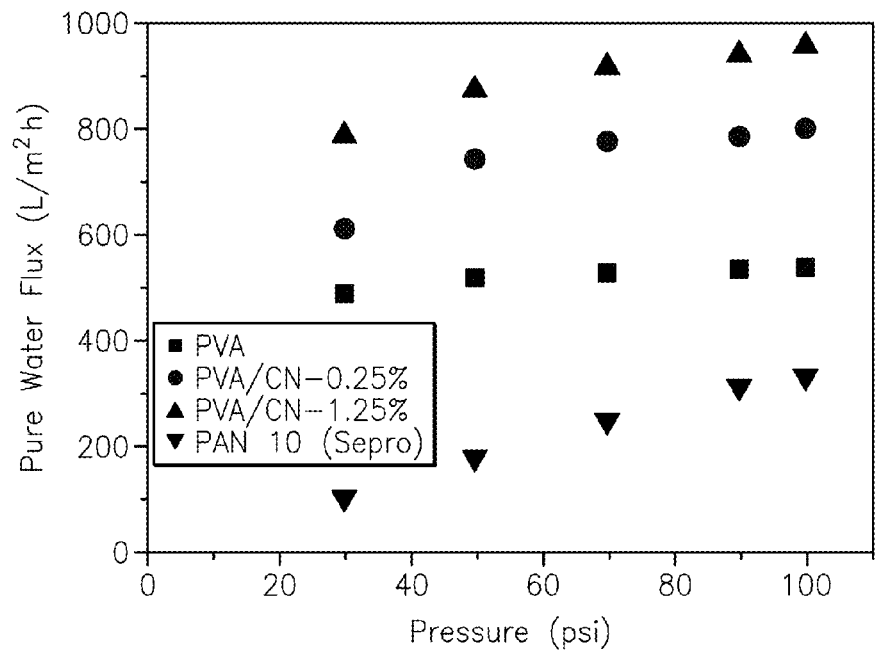
FIG. 57 is a chart showing pure water flux of PVA/CN composite membranes compared with PAN 10 commercial membrane at different pressures, according to an embodiment of the present invention.

FIG. 57 shows pure water flux of PVA/CN composite membranes compared with PAN 10 commercial membrane at different pressures, while the temperature was about 25° C. The thickness of the barrier layers of all PVA membranes were about 0.5 μm. It is demonstrated that the pure water flux increases with increased content of cellulose nanofibers in the PVA composite membrane, which proved the creation of water channels in the PVA matrix. The pure water flux of PVA/CN (1.25% to PVA) composite membrane is shown as being two times higher than that of pure PVA without cellulose nanofibers.

Figure 58:
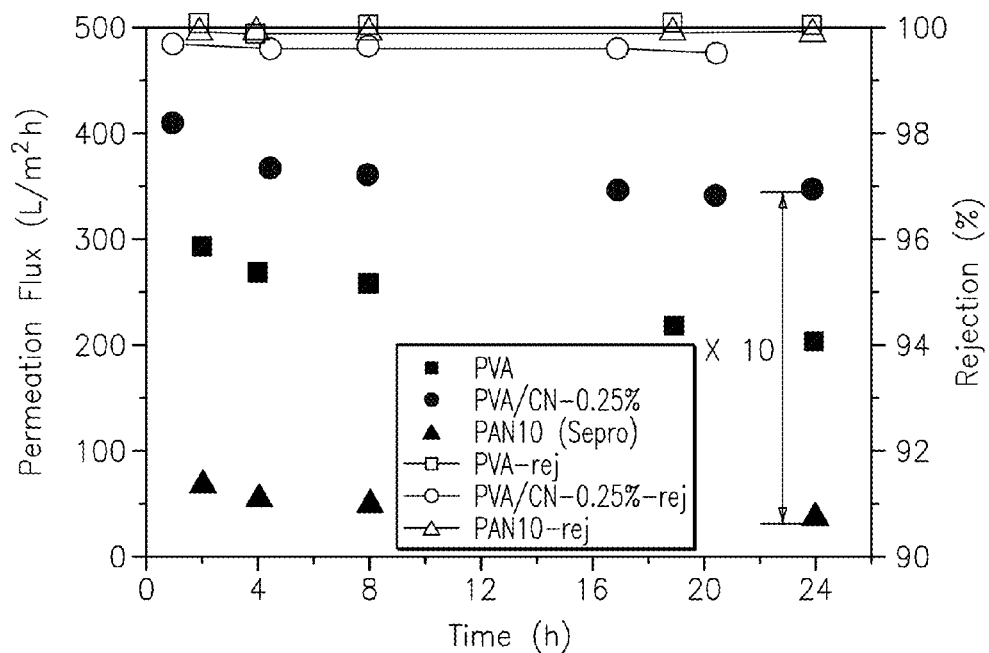
FIG. 58 is a chart showing permeation flux and rejection (%) of PVA/CN composite and PAN 10 membranes during 24 hours for filtration of oil/water emulsion, according to an embodiment of the present invention.

FIG. 58 shows the permeation flux and rejection % of PVA/CN composite membrane during the filtration of oil/water emulsion. The permeation flux PVA/CN composite membrane increased by approximately 70% compared with that of pure PVA when cellulose nanofibers (0.25 wt % to PVA) had been introduced into the PVA matrix. The permeation flux was ten times higher than that of PAN 10 (Sepro).

Figure 59A:
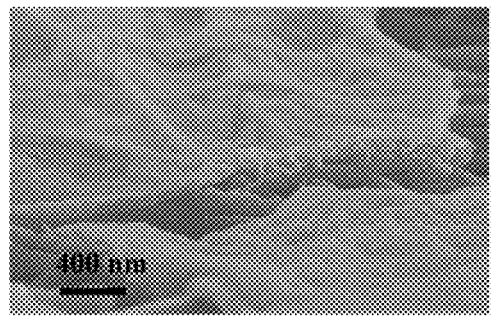
FIGS. 59(a) and 59(b) provide SEM images of cellulose (0.10 wt % in EAc)/cellulose nanofiber (0.01 wt %) composite membrane, according to an embodiment of the present invention.
Figure 59B:
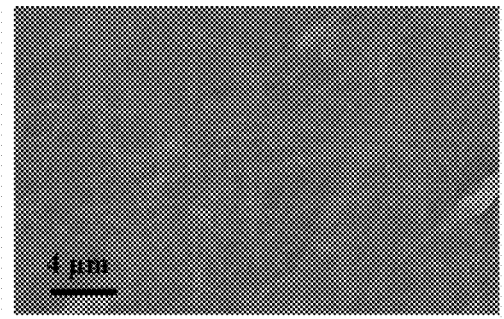

In order to introduce higher amounts of cellulose nanofibers into the barrier layer without phase separation or gelation during the coating, the E-spun membrane is first coated with cellulose nanofibers, then the holes are filled with a coating material such as cellulose. An SEM image of the cellulose/CN composite membrane is shown in FIGS. 59(*a*) and 59(*b*).

Figure 60:
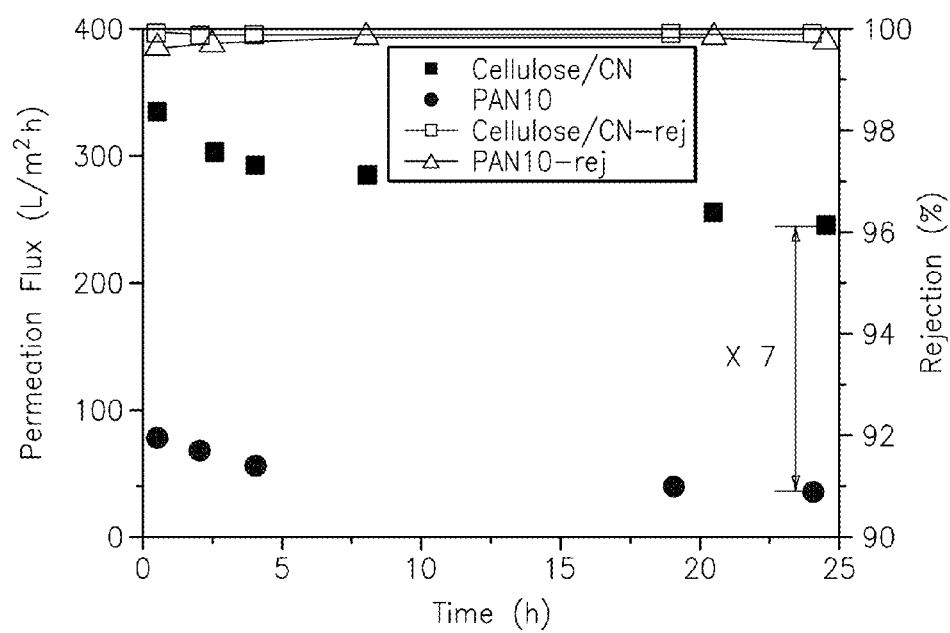
FIG. 60 is a chart showing permeation flux and rejection ratio of cellulose/CN and PAN10 membranes during 24 hours for filtration of oil/water emulsion, according to an embodiment of the present invention.

FIG. 60 shows the results of oil/water emulsion for the cellulose/CN composite membrane. The permeation flux of cellulose/CN composite membrane was seven times higher than that of PAN 10 while keeping similar rejection (%) above 99.5%.

Cellulose and cellulose nanofibers prepared from oxidized cellulose were employed to prepare ultrafiltration membranes that serve in filtration of oil/water emulsion. Chemically inert cellulose membrane is well known, but can be consumed by bacteria in an aerobic environment. Oxidized cellulose with 18~25% of oxidation degree was used as hemostat in medical area. Thus, the cellulose nanofiber membrane was anti-bacterial.

Membrane Adaptation

The chemical resistance study of cellulose membranes for bilge water filtration was carried out to identify any potential material compatibility problems associated with the know constituents present in bilge water. After testing at 80° C. for 7 days, the cellulose nanofiber membrane still keeps higher flux and higher rejection as before. The chemical resistance of cellulose nanofiber membrane is higher than that of cellulose membrane.

The chlorine resistance of cellulose and cellulose nanofiber membranes was investigated. The percent rejection of cellulose nanofiber membrane remained higher than 99.6% at pH 10, meaning that the cellulose nanofiber membrane has higher hypochlorite resistance and could be used in hypochlorite-existing solution.

The anti-bacterial property of cellulose nanofiber membrane was studied with *E-coli* (the concentration is $5.5 \times 10^5$ cfu/mL) as the model. The experiment is carried out at 37° C. for 3 days. The cellulose nanofiber has good tolerance to bacteria because it is produced from oxidized cellulose which usually is used as anti-bacterial materials (hemostat). Besides, cellulose nanofiber membrane has a good stability in wide pH range from 4 to 10, as well as cellulose membrane.

The stability of cellulose and cellulose nanofiber membranes is summarized in Table 7, in which "√" indicates good resistance and "×" indicates poor resistance.

As described above, the cellulose nanofiber has three different functional groups, hydroxyl, carboxylic, and aldehyde groups that provide a platform to modify the cellulose nanofiber membrane. Considering the continuous production process in the future, as well as the property of cellulose nanofiber aqueous solution, there are different strategies to do the cross-linking.

There are two possible places to add the cross-linking reagent. First, the cross-linking agent may be added to the cellulose nanofiber coating solution. Second, the cross-linking process may be added in the aqueous bath, which serves as the protection of heavy penetration to E-spun membrane. Some cross-linking reagents can be dissolved into the water bath before coating without negative effect on the coating process.

Figure 61:
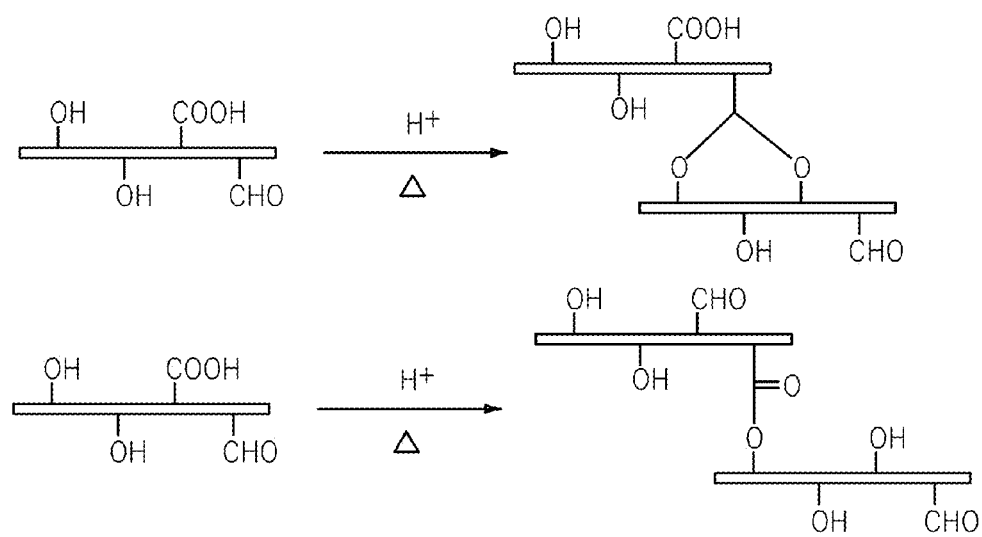
FIG. 61 shows a cellulose nanofiber membrane cross-linked by heating process, according to an embodiment of the present invention.

The cross-linking preferably occurs during the drying of the membrane under heating conditions, or through post-cross-linking which requires one more step to do the cross-linking reaction. A first method is a heating cross-linking reaction based on the aldehyde groups and carboxylic groups located on the surface of cellulose nanofibers produced by TEMPO/NaBr/NaClO oxidizing system. Such a cross-linking mechanism is shown in FIG. 61.

Figure 62:
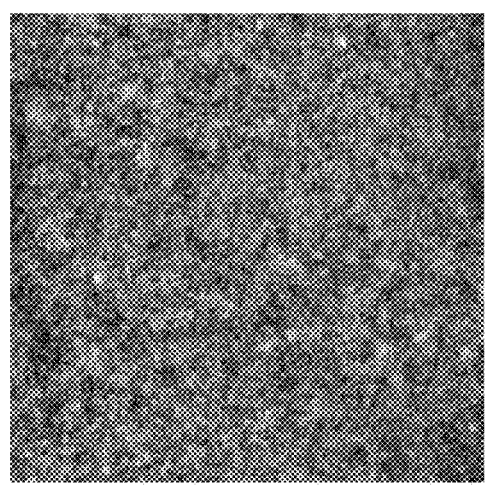
FIG. 62 shows a TEM image of cellulose nanofiber membrane coated on TEM grid and stained by uranyl acetate (2.0%), according to an embodiment of the present invention.

The content of aldehyde is determined by hydroxylamine hydrochloride titration experiment. The aldehyde group content is about 0.25 mmol/g cellulose in cellulose nanofiber. The carboxylic group content is determined as ~0.70 mmol/g cellulose. After coating, the membrane is heated at 100° C. for 20 min in an oven, the thickness of the barrier is about 0.2 µm. The TEM image of the cellulose nanofiber film prepared from cellulose nanofiber aqueous solution (0.05 wt %) coated on TEM grid and stained by uranyl acetate (2.0%) was obtained, as shown in FIG. 62. The surface morphology of cellulose nanofiber membrane was completely composed with cellulose nanofibers and very dense after formation of the membrane, which implies that the cellulose nanofiber membrane could be applied for ultrafiltration process.

To estimate the new filtration performance, the membrane is tested with oil/water emulsion. The filtration performance pressure is 30 psi and temperature is ~39° C. The % rejection

TABLE 7

| | | | Cellulose | | | | | Cellulose nanofiber | | |
|---|---|---|---|---|---|---|---|---|---|---|
| | | | | Before | After | | | | Before | After |
| Chemical resistance | √ | Reducing | Flux (L/m²h) | 83.1 | 54.9 | | Reducing | Flux (L/m²h) | 60.3 | 69 |
| | | | Rejection % | 99.9 | 96.0 | | | Rejection % | 99.8 | 99.7 |
| | √ | Oxidizing | Flux (L/m²h) | 75.2 | 77.1 | √ | Oxidizing | Flux (L/m²h) | 67.5 | 86 |
| | | | Rejection % | 99.9 | 98.0 | | | Rejection % | 99.9 | 99.4 |
| Bacteria resistance | × | | Flux (L/m²h) | 112.7 | 95.3 | √ | | Flux (L/m²h) | 100.9 | 124.6 |
| | | | Rejection % | 99.9 | 99.1 | | | Rejection % | 99.8 | 99.7 |
| Chlorine resistance | √ | pH = 4 | Flux (L/m²h) | 94.9 | 80.1 | × | pH = 4 | Flux (L/m²h) | 124.6 | 92 |
| | | | Rejection % | 99.9 | 99.9 | | | Rejection % | 99.7 | 98.2 |
| | × | pH = 10 | Flux (L/m²h) | 94.9 | 111.3 | √ | pH = 10 | Flux (L/m²h) | 124.6 | 118.7 |
| | | | Rejection % | 99.9 | 98.3 | | | Rejection % | 99.7 | 99.6 |
| pH sensitive | √ | pH = 4 | Flux (L/m²h) | 71.2 | 65.3 | √ | pH = 4 | Flux (L/m²h) | 142.4 | 169.1 |
| | | | Rejection % | 99.9 | 99.9 | | | Rejection % | 99.9 | 99.9 |
| | √ | pH = 10 | Flux (L/m²h) | 71.2 | 89.0 | √ | pH = 10 | Flux (L/m²h) | 142.4 | 151.3 |
| | | | Rejection % | 99.9 | 99.9 | | | Rejection % | 99.9 | 99.9 |

In industry, an ultrafiltration membrane has to be used for long time, e.g., half of a year, before being discarded. Moreover, two weeks can be required for cleaning, to save cost and energy. That means that the life of a membrane must long enough for scale up production and practical application. Further decreasing fouling in order to increase the efficiency is also an urgent task for water purification. Based on those requirements, the cellulose membrane is modified by further cross-linking reactions.

remains higher than 99.8% with little higher fouling after filtration for 72 hours, as shown in FIG. 63. As compared with previous results, the membrane structure is more stable during the filtration, demonstrating successful cross-linking of the cellulose nanofiber membrane through the heating process.

Figure 64:
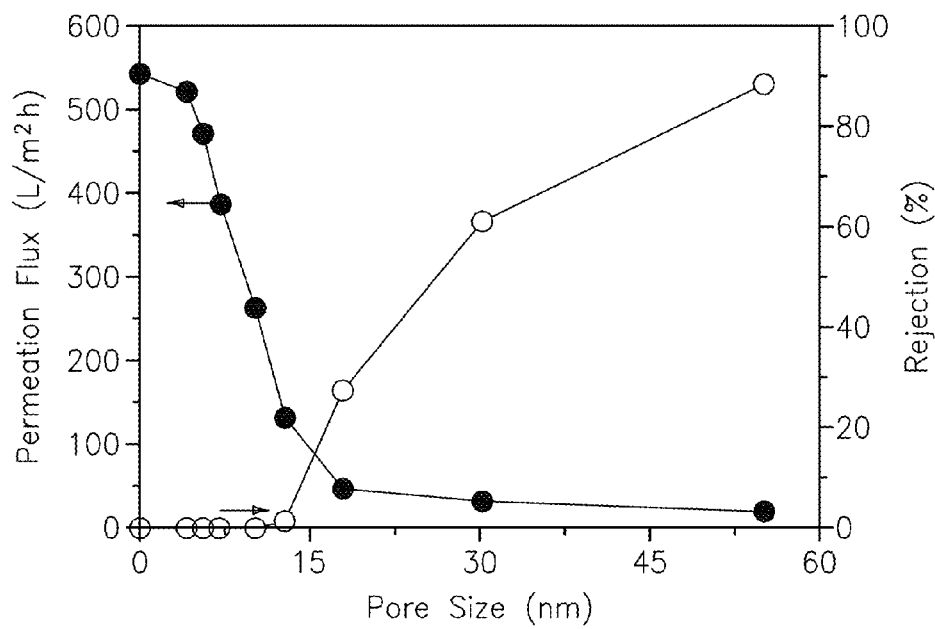
FIG. 64 is a chart showing permeation flux and rejection ratio of cellulose nanofiber membrane as a function of MWCO, according to an embodiment of the present invention.

The MWCO of the membrane remains similar to that of a membrane without a heating treatment, i.e., about 2,000 KDa, as shown in FIG. 64.

Figure 65:
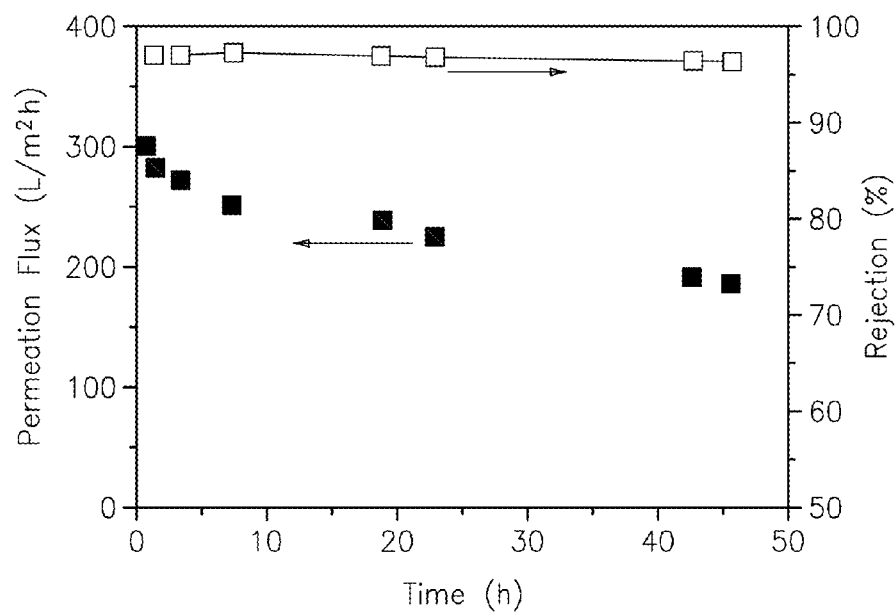
FIG. 65 is a chart showing permeation flux and rejection ratio of cellulose nanofiber membrane during 48 hours of filtration for sodium alginate solution, according to an embodiment of the present invention.

The fouling test was also carried out with sodium alginate (500 ppm, 80-120 KDa) in water. The permeation flux and the rejection ratio of the cellulose nanofiber membrane were obtained after a period of 48 hours, and the results are shown in FIG. 65. The permeation flux decreased with time to approximately 30% of the starting flux, implying a lower fouling rate than that of the cellulose nanofiber membrane without heating. However, the rejection ratio was only about 96.3% according to the TOC results.

Figure 66:
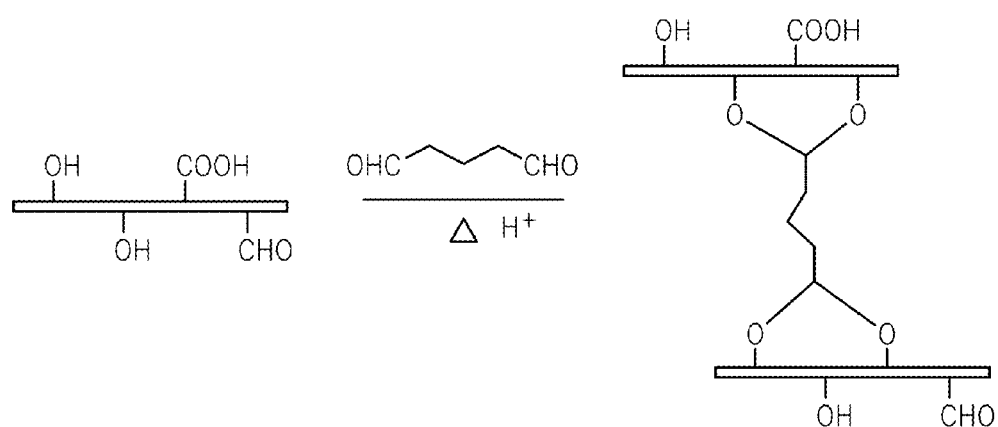
FIG. 66 shows a cellulose nanofiber membrane cross-linked by GA, according to an embodiment of the present invention.

To further cross-link cellulose nanofibers, GA with different concentration was employed in the coating process by immersing PAN e-spun membrane into GA acidic aqueous solution. The cross-linking reaction is shown in FIG. 66. A concentration of GA lower than 0.0015 mol/L is more helpful than that of higher concentration of GA in this coating recipe. Furthermore, glyoxal is another good cross-linker for cellulose.

Figure 67:
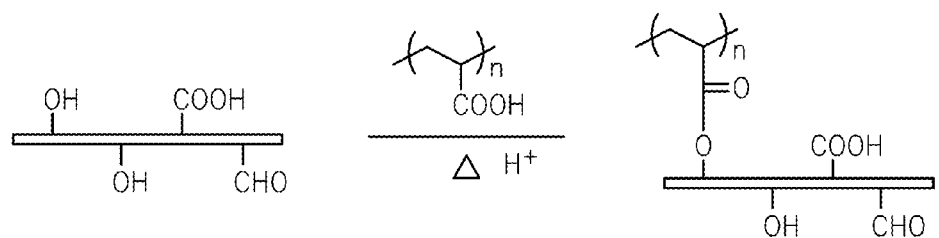
FIG. 67 shows a cellulose nanofiber membrane cross-linked by PAA, according to an embodiment of the present invention.

Considering that aldehyde reagents are slightly toxic when only a small amount of GA or glyoxal is used in the coating process, another good cross-linking reagent regarded as non-toxic and also very cheap is PolyAcrylic Acid (PAA) with different molecular weight. FIG. 67 shows a cellulose nanofiber membrane cross-linked by PAA.

Figure 68:
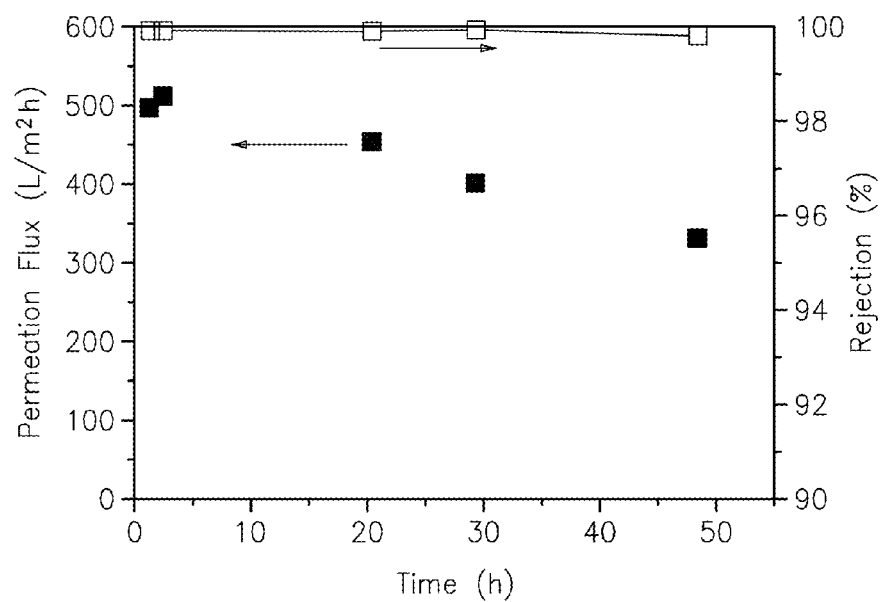
FIG. 68 is a chart showing permeation flux and rejection ratio of cellulose nanofiber membrane after PAA cross-linking for filtration of oil/water emulsion, according to an embodiment of the present invention.

PAA (molecular weight is 450 KDa) could be added into the cellulose nanofiber aqueous solution because the pKa of PAA is 4.30, which does not encourage cellulose nanofiber to form a gel. The concentration of PAA seriously affects the anti-fouling property of the cellulose nanofiber membrane, as shown in FIG. 68. A catalyst, Sodium HypoPhosphite (SHP), may be employed to promote the cross-linking reaction with PAA. Following the same procedure as above, except using water bath (pH=2.02) containing $NaH_2PO_2$ (0.01 mol/L) instead of the original.

A similar cross-linker, PolyVinylamine Hydrochloride, may be used to cross-link the cellulose nanofiber membrane. PVAH can not be added into cellulose nanofiber solution directly because is may form a gel before the coating process due to its strong acidic property. However, PVAH (0.0015 mol/L) can be added into the water bath with pH=1.90. The membrane fouling is a little heavy, however, the rejection remains very high ~99.8%.

Epichlorogydrin (ECH) is a common cross-linking reagent in the food industry for polysaccharides. It based on the reaction between epoxy group, chlorine, and hydroxyl groups under basic conditions. This cross-linking reaction can not be carried out during the coating process. An additional cross-linking step has to be done after preparation of the cellulose nanofiber membrane.

Figure 69:
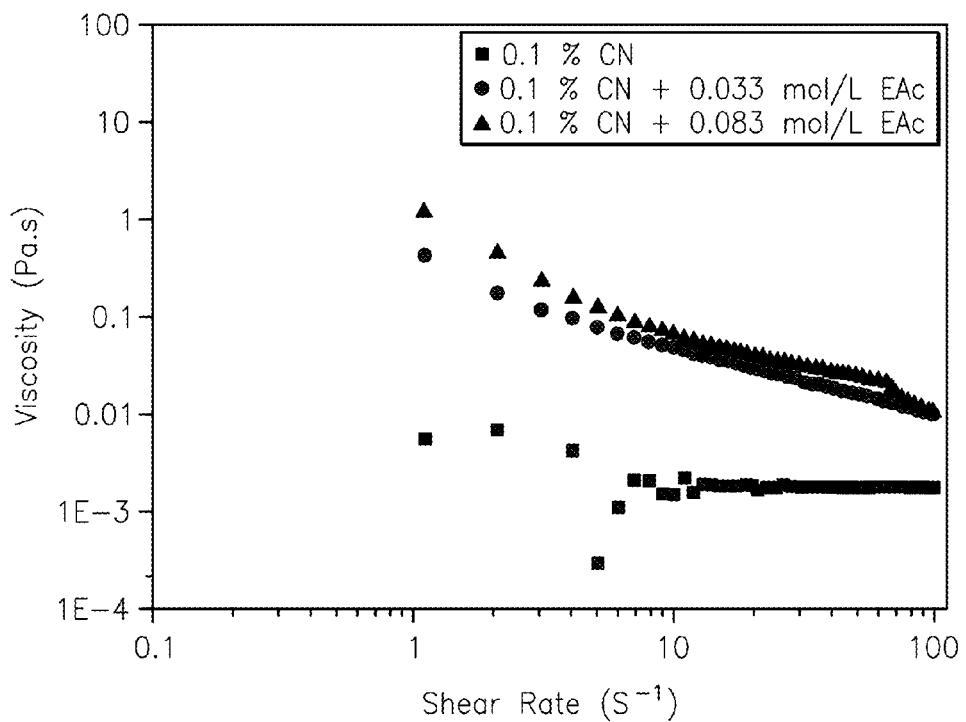
FIG. 69 is a chart showing rheological behavior of cellulose nanofiber solution gelled by an ionic liquid, according to an embodiment of the present invention.

As described above, cellulose nanofibers can gelatin with an increase in the ionic strength of the solution. The gel forms completely and rapidly when the concentration of sodium chloride is higher than 0.033 mol/L. Ionic liquid, such as 1-ethyl-3-methylimidazolium acetate, is also a salt but liquid at room temperature. Thus, it could be used to form a gel of cellulose nanofiber instead of sodium chloride. The rheological behavior of cellulose nanofiber aqueous solution is shown in FIG. 69. The gelatin occurred when the concentration of EAc is above 0.033 mol/L, the viscosity of the gel solution is about 16.3 Pa·s.

Figure 70:
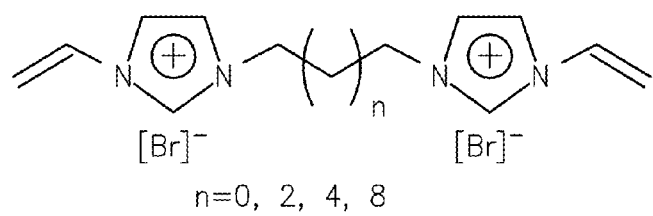
FIG. 70 shows the structure of the ionic liquid compounds, according to an embodiment of the present invention.

A structure of new ionic liquid cross-linkers (C2IL) is shown in FIG. 70. The structure of the compounds was confirmed by $^1$H NMR. For the samples when n=0 and 8, The $^1$H NMR data ($D_2O$ as the solvent) are shown below: (n=0, δ, ppm): 9.059 (N—CH—N, s, 2H), 7.779 (N—CH—CH, s, 2H), 7.489 (N—CH—CH, s, 2H), 7.070 (N—CH=, m, 2H), 5.772 and 5.411 (N—CH=$CH_2$, s, 4H), 4.769 (N—$CH_2$, t, 4H). (n=8, δ, ppm): 8.940 (N—CH—N, s, 2H), 7.676 (N—CH—CH, s, 2H), 7.486 (N—CH—CH, s, 2H), 7.032 (N—CH=, m, 2H), 5.730 and 5.345 (N—CH=$CH_2$, s, 4H), 4.135 (N—$CH_2$, t, 4H), 1.791 (N—$CH_2$—$CH_2$, m, 4H), 1.203 (N—$CH_2$—$CH_2$—$(CH_2)_6$, m, 12H).

Figure 71:
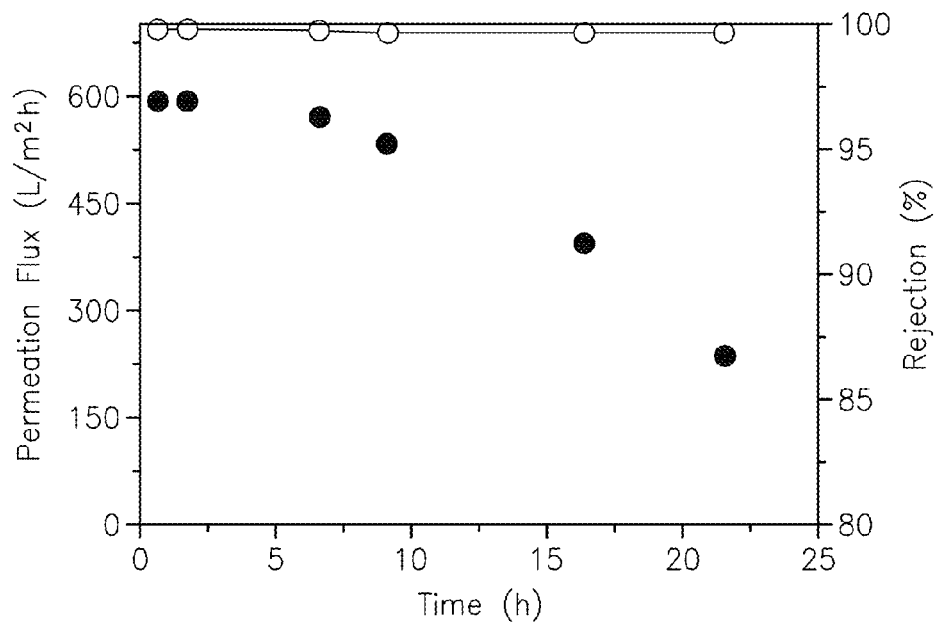
FIG. 71 is a chart showing permeation flux and rejection ratio of cellulose nanofiber membrane after ionic liquid cross-linking for filtration of oil/water emulsion, according to an embodiment of the present invention.

The new ionic cross-linker (n=0) was employed to incorporate into the cellulose nanofiber matrix during coating process, and polymerized to form a network with $K_2S_2O_8$ as the thermal initiator. Specifically, $K_2S_2O_8$ was dissolved in water bath with the concentration of 0.017 mol/L (0.2 wt %), the C2IL was also dissolved into the water bath with the concentration of 6.2 g/L. After coating the membrane was dried at 100° C. for 30 min. The thickness of barrier layer is ~0.2 μm. The permeation flux decreased after one day of filtration, while kept higher rejection ~99.8%, as shown in FIG. 71. The ionic surface of the membrane might lead to a little heavy fouling, however, it is very benefit to adsorb viruses during the filtration.

PolyEthylene Oxide (PEO) usually was considered as anti-fouling materials, however, incorporated PEO into the membrane by simply blending is not a good method because it may be washed out during the filtration. In-situ cross-linking the PEO by thermal or photo initiating the monomer containing two/three vinyl groups could be helpful to immobilize PEO in the membrane.

A di-functional monomer, polyethylene glycol 400 diacrylate (SR344), was incorporated into the cellulose nanofiber coating solution (0.05 wt %) with the concentration of 0.025 wt %. The thermal initiator, $K_2S_2O_8$ (0.01 wt %), was dissolved in the water bath with pH=1.92. After coating, the membrane was dried at 100° C. for 25 min. The thickness of the barrier is ~0.2 μm.

Figure 72:
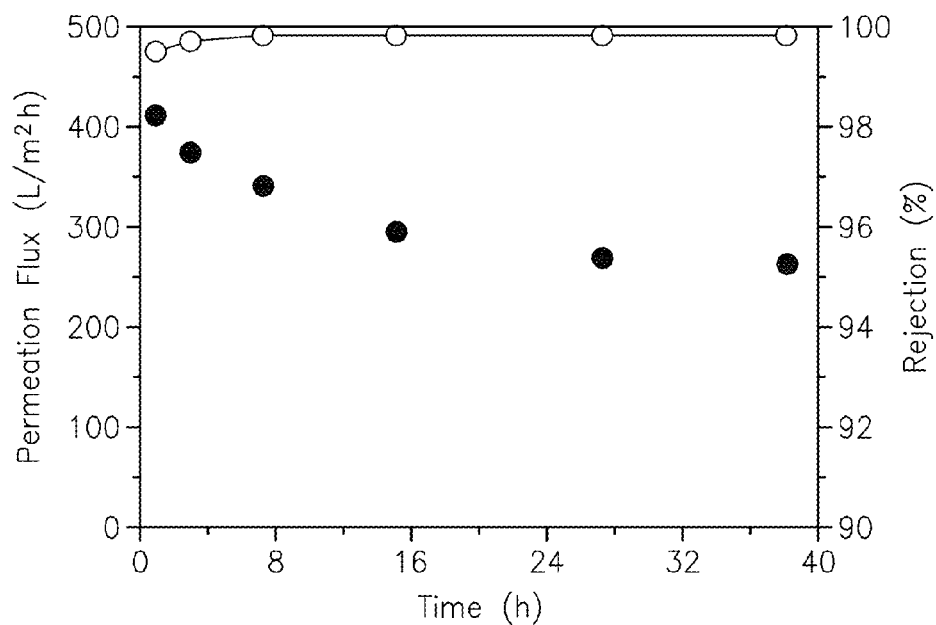
FIG. 72 is a chart showing permeation flux and rejection ratio of cellulose nanofiber membrane after PEO-monomer cross-linking for filtration of oil/water emulsion, according to an embodiment of the present invention.

The permeation flux was about 260 L/$m^2$ h after two days of filtration and going to a constant value while keeping the higher rejection than 99.7%, as shown in FIG. 72. This indicated that the introduction of PEO segment definitely decreases the fouling during the filtration of oil/water emulsion, and the membrane could be used for long time with high rejection.

The surface modification of cellulose nanofiber membrane had been also carried out based on the chemical modification of cellulose nanofiber. This modification has to be achieved after preparation of the membrane because it occurred in an organic solvent, such as toluene. The cellulose nanofiber membrane was prepared first following the same procedure: cellulose nanofiber coating solution (0.05 wt %) was coated on the PAN E-spun membrane immersed into water bath at pH=1.70. The membrane was dried at 100° C. for 20 min. The thickness of the barrier is about 0.3 μm. The dry membrane was immersed in a mixture ($HClO_4$: 0.4 mL; Acetic anhydride: 20 mL; acetic acid: 80 mL; toluene: 100 mL) for thirty minutes at room temperature. After wash it with ethanol, the membrane was dried at room temperature before using.

Figure 73:
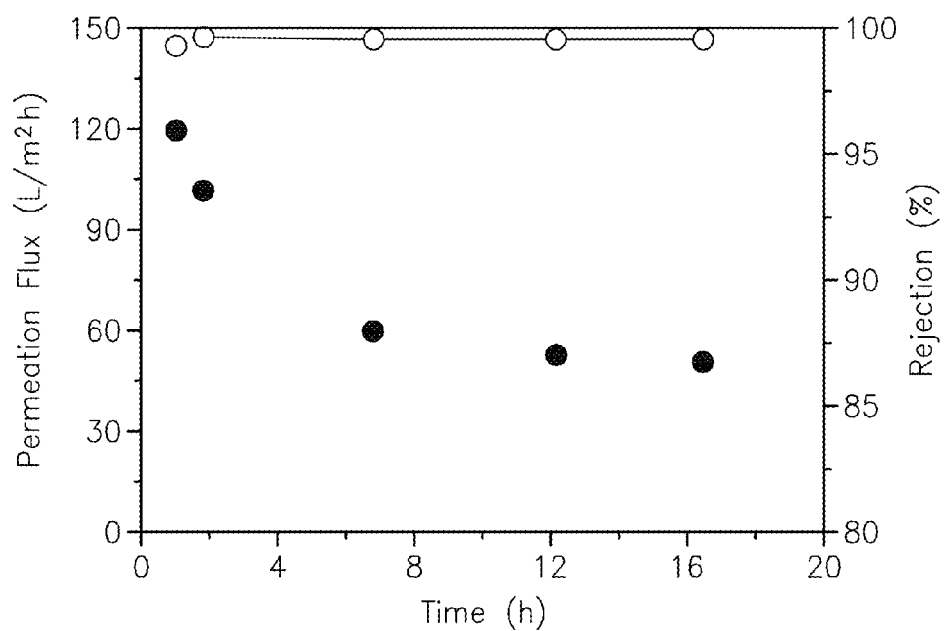
FIG. 73 is a chart showing permeation flux and rejection ratio of cellulose nanofiber membrane after surface esterification for filtration of oil/water emulsion, according to an embodiment of the present invention.
Figure 74:
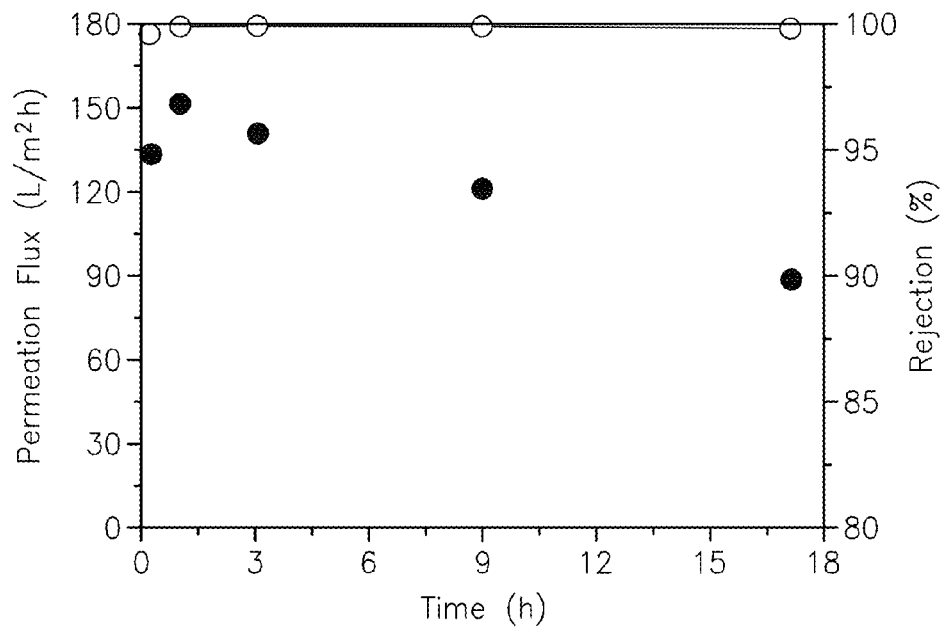
FIG. 74 is a chart showing permeation flux and rejection ratio of cellulose nanofiber membrane after polyether-b-polyamide (PEBAX)-coating for filtration of oil/water emulsion, according to an embodiment of the present invention.

The permeation flux is relatively low, as shown in FIG. 73, because the hydrophobic property of the membrane after esterification which implies the different application for this membrane instead of the filtration of oil/water emulsions. However, the acetyl groups were introduced into the membrane, which will enable anti-bacterial property to the cellulose membrane since cellulose acetate/triacetate has higher bacterial tolerance.

Another strategy to decrease fouling by oil is the application of polyether-b-polyamide (PEBAX). This material has a super anti-fouling property due to the composition of the block copolymer. Thus, PEBAX 1074 is introduced on the surface of cellulose nanofiber membrane and check the anti-fouling performance, results of which are shown in FIG.

74. The coating conditions are: cellulose nanofiber solution (0.05 wt %) was coated on PAN E-spun membrane immersed in water bath first at pH=1.79. The thickness of the barrier is ~0.2 μm and the membrane was dried at 100° C. for 10 min. The PEBAX (0.01 wt % in butanol) was coated on the surface (the thickness of the PEBAX layer is ~15 nm), and the membrane was dried at 100° C. for 10 min again.

Additional polysaccharides can also be employed to prepare nano-scale materials for production of ultrafiltration membranes. Chitin is a universal material and its production is only less than cellulose on the earth. Chitin is a good candidate compared to cellulose when in the form of nanofibers or dissolved in ionic liquids for use in ultrafiltration membranes with anti-bacterial and low fouling properties. Chitin nanofibers are prepared from Chitin powder (Aldrich, from crab shell, 90%) following a similar procedure as the preparation of cellulose nanofibers. Briefly, the chitin powder is oxidized with TEMPO/NaBr/NaClO system followed by homogenizer-treatment.

10.0 g of Chitin powder is dispersed in 192 g of water. 0.2 g of sodium bromide and 0.04 g of TEMPO is dissolved in the suspension solution. The reaction is started by adding 20 g of sodium hypochlorite solution (10-13%) under stirring condition for 24 h. The pH value is kept at about 10.0 to 10.3 monitored with a pH meter by adding 0.5 mol/L of sodium hydroxide aqueous solution. The reaction is stopped by adding 10 mL of ethanol followed by stirring for 20 minutes. The rough product is separated by centrifuging (5000 rpm) of the reaction mixture and then decanting the supernatant. The product was washed with De-Ionized (DI) water 5 times and separated finally by centrifugation. The yield is approximately 80%.

Figure 75:
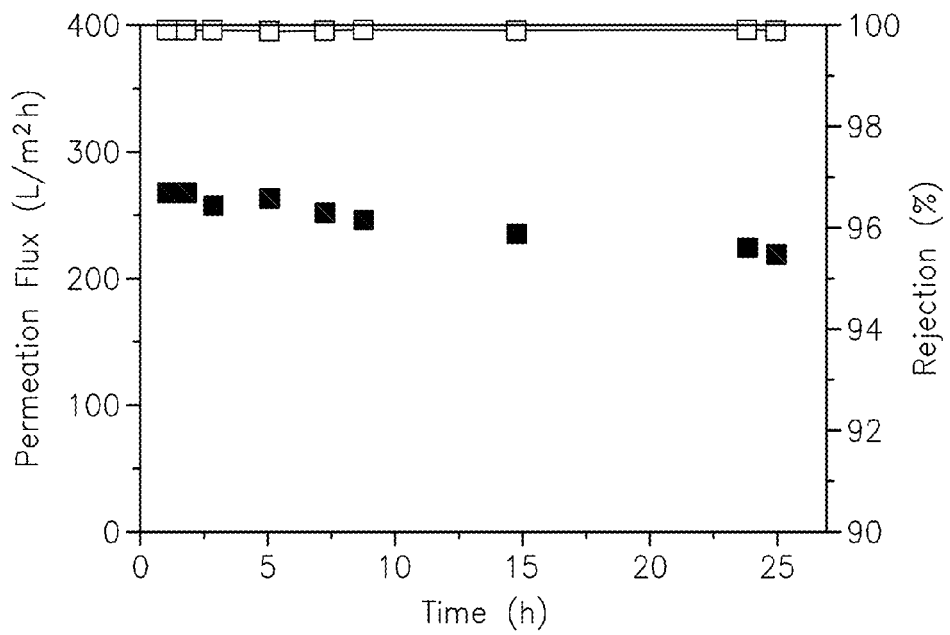
FIG. 75 is a chart showing permeation flux and rejection ratio of chitin nanofiber membrane for filtration of oil/water emulsion, according to an embodiment of the present invention.

1.50 g of oxidized chitin slurry are dispersed in 70 g of water and sonicated for 5 min with a homogenizer. Almost all the oxidized chitin was defibrillated and the suspension was centrifuged at 5000 rpm. The supernatant was the chitin nanofiber suspension in water with a concentration of 0.10 wt %. Chitin nanofiber/PAN 0.1 wt % aqueous solution is used as the coating solution on the support PAN E-spun membrane immersed in pH=1.86 aqueous solution. The membrane was dried at room temperature after coating and the thickness of coating layer was about 0.5 μm. FIG. 75 shows Permeation flux and % rejection of chitin nanofiber membrane for filtration of oil/water emulsion. The filtration performance pressure is 30 psi and temperature is 35° C.

The permeation flux remains high after 1 day's test, and % rejection is approximately 99.9%. The permeation flux of the chitin nanofiber membrane decreases very slowly, which implies that the fouling is lower than that of cellulose nanofiber membrane.

Chitosan nanofibers could also be prepared from chitin nanofibers by hydrolysis of chitin nanofibers with sodium hydroxide aqueous solution (0.1 mol/L) at ambient temperature for 24 h. After the reaction, the chitosan nanofibers were separated by filtering the suspension with microfiltration membrane (0.1 μm) and washing thoroughly with water.

Figure 76:
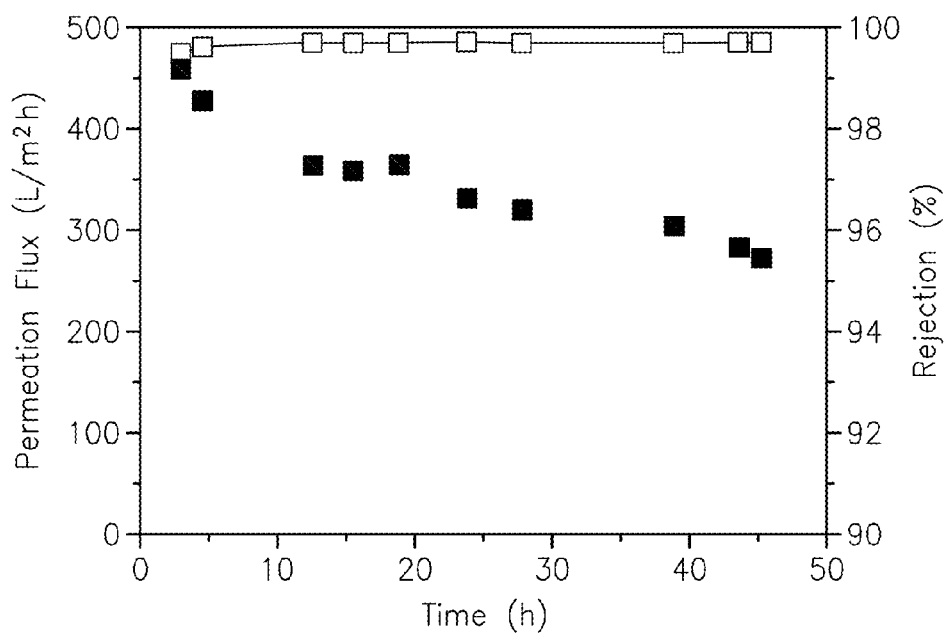
FIG. 76 is a chart showing permeation flux and rejection ratio of cellulose nanocrystal membrane for filtration of oil/water emulsion, according to an embodiment of the present invention.

Cellulose nanocrystals are also universally used materials, and specifically used as additives in optical devices. The permeation flux of the cellulose nanocrystal membrane decreases slowly, which implies that the fouling is lower than that of cellulose nanofiber membrane, as shown in FIG. 76. Cellulose nanocrystal is a good candidate for an ultra-filtration process with high flux and high percentage rejection for oil/water emulsion, and with high crystallinity for potential special applications.

Cellulose nanocrystal is prepared from microcrystal cellulose, which is a commercially available material (Aldrich), with same method as the preparation of cellulose nanofibers. The crystallinity of cellulose nanocrystals at greater than 85% provides for more mechanical and other special properties. For example, the high crystallinity of cellulose nanocrystals might be a better material for anti-bacterial application. The aqueous solution of cellulose nanocrystal (0.1 wt %) is completely transparent which is differs from that of cellulose nanofibers.

Following the same coating procedure, cellulose nanocrystal membrane was prepared and tested in oil/water filtration process. The cellulose nanocrystal (0.1 wt %) aqueous solution is the coating solution of the PAN E-spun membrane immersed in the aqueous solution at pH=1.86. The membrane was dried at room temperature and the thickness of barrier is about 0.2 μm. FIG. 76 shows the permeation flux and % rejection of cellulose nanocrystal membrane for filtration of oil/water emulsion. The filtration performance pressure is 30 psi and temperature is 43° C.

The permeation flux remains relatively high after 2 days of filtration, and % rejection is about 99.7%. The permeation flux of the cellulose nanocrystal membrane decreases slowly, which implies that the fouling is lower than that of cellulose nanofiber membrane.

Similarly, as a comparable example, microcrystal cellulose may be dissolved into the ionic liquid (EAc) for preparation of a cellulose microcrystal membrane. Microcrystal cellulose may be a good candidate for ultrafiltration process with high flux and high % rejection for oil/water emulsion.

The diameter and length of nanofibers are estimated from TEM images and listed in Table 8, showing diameter and length of polysaccharide nanofibers. All polysaccharide nanofibers have ultra-fine fiber diameter compared to that of E-spun nanofibers which usually higher than 100 nm in diameter. The fiber diameter of wood cellulose nanofibers is smallest and its length is higher than that of other polysaccharide nanofibers.

TABLE 8

| Nanofibers | Diameter (nm) | Length (μm) |
| --- | --- | --- |
| Wood cellulose | 5~8 | 1~3 |
| Chitin | 15~20 | 0.3~0.5 |
| Microcrystal cellulose | 5~10 | 0.3~0.5 |
| Cotton cellulose | 20~30 | 0.2~0.5 |

Figure 77:
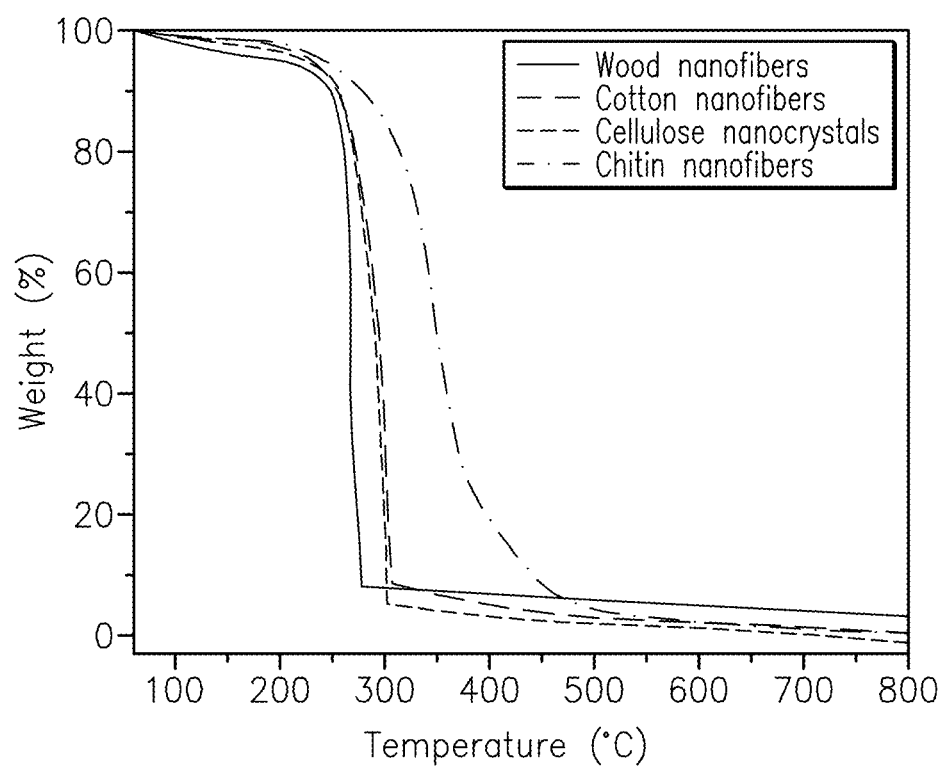
FIG. 77 is a chart showing thermal stability of polysaccharide nanofibers, according to an embodiment of the present invention.

FIG. 77 shows the thermal stability of polysaccharides nanofibers including wood and cotton nanofibers, cellulose nanocrystals from microcrystal cellulose, and chitin nanofibers.

Pathogenic enteroviruses such as poliovirus and hepatitis A virus, usually discharged from sewage system, are surviving in water environment involving rivers, lakes, and ponds, etc., which are often the reservoirs of drinking water. Modified cellulose materials including sulfated cellulose, nitrocellulose, and phosphate cellulose usually have been made into affinity membranes to adsorb viruses from water in order to clean the drinking water. The mechanism of the adsorption is mainly based on two important interactions: electrostatic interaction and hydrophobic interaction. Among them, the electrostatic interaction is often considered as the foundation of adsorption. The reason is that the basic composition of viruses is proteins, which have net charges in water environment when the pH value is lower or higher than the isoelectric point (pI). Below pI, the protein has positive charges which much easily to be adsorbed onto the surface of negative charged membrane (e.g., sulfated cellulose), while above pI, the protein will be captured with positive charged membrane (e.g., ammonium modified cellulose). At the isoelectric point, the net charge of the protein was zero which will has minimum adsorption. There is special interaction between sugar and protein called pseudo-affinity binding is also an important factor which affects on the adsorption of viruses.

Commercial sulfated cellulose including beads or membrane had been used as the adsorbed materials many years ago. The higher efficiency and flexible performance of sulfated cellulose membrane is the advantages over that sulfated cellulose beads and ion-exchange chromatography. Nitrocellulose is a common material which could be used to adsorb proteins due to the negative charged surface at neutral environment. An alternative strategy is tethered special ligands (e.g., Cibacron blue dye) onto the surface of the membrane for adsorption of bovine serum albamin (BSA).

Figure 78:
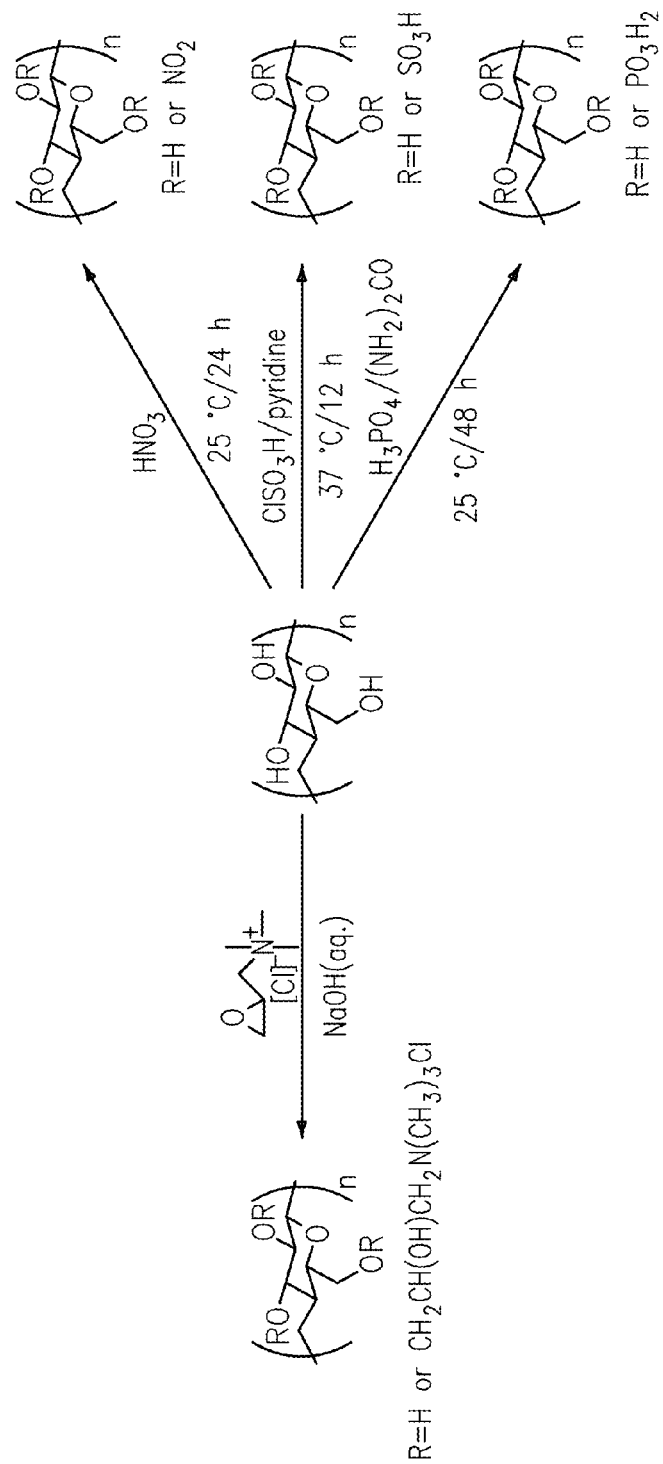
FIG. 78 is a diagram illustrating a strategy of modification of cellulose nanofiber membrane for the adsorption of viruses, according to an embodiment of the present invention.

A modification strategy of cellulose nanofibers for adsorption of viruses is shown in FIG. 78. The sulfated cellulose nanofiber membrane was prepared following the procedure described in WO 2008/125361, the contents of which are incorporated herein by reference, with slight modification. Chlorosulfonic acid (24 mL) was dropwise added to pyridine (400 mL) in an ice bath. Then, the solution was heated to 60° C. and 200 mL of additional pyridine was added. After completely dissolving the precipitated components, the solution was cooled to 37° C. and 10 pieces of cellulose nanofiber membranes were added. Those Membranes were incubated for 16 hours at 37° C. Subsequently, membranes were washed with phosphate buffered saline (PBS) and pure water thoroughly to remove the residue pyridine and dried at room temperature. The sulfate content of the sulfated cellulose membranes was determined to ~4.9 wt % by elemental analysis.

Figure 79A:
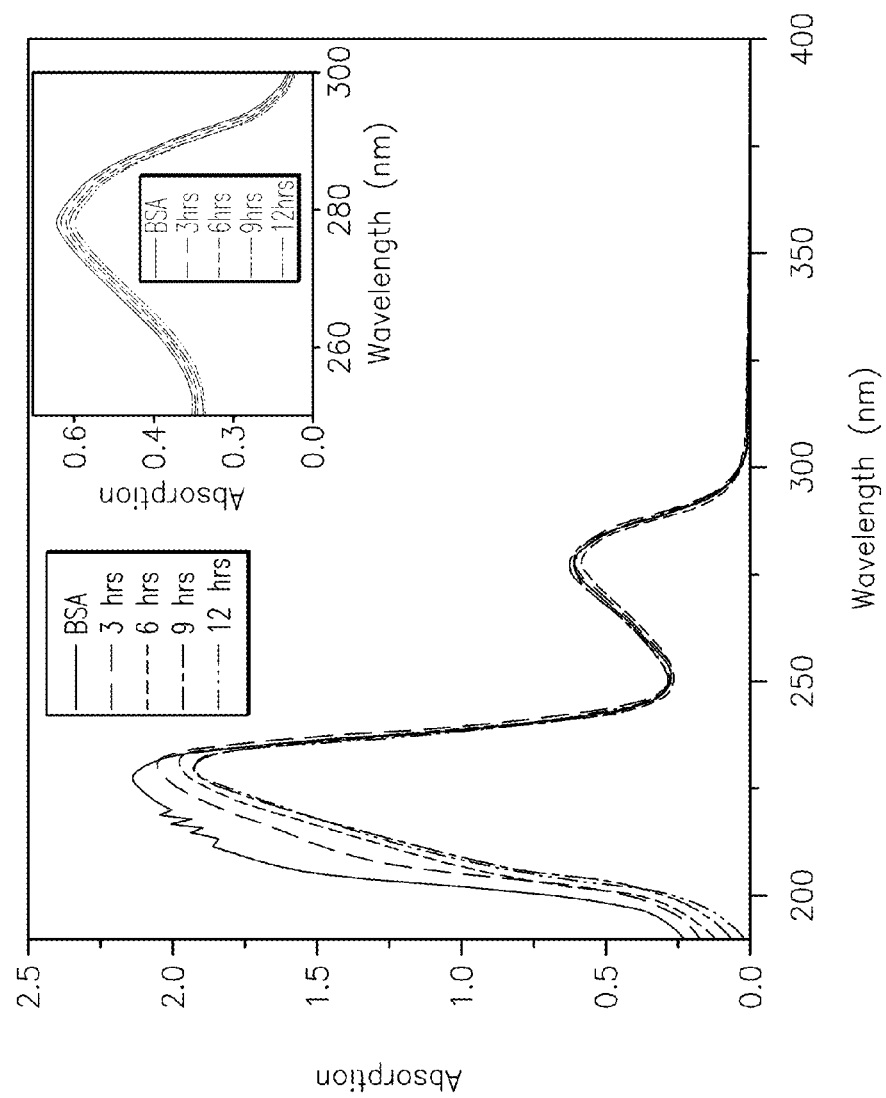
FIGS. 79(*a*) and 79(*b*) include charts showing adsorption capacity of BSA in cellulose nanofiber membrane as a function of time, according to an embodiment of the present invention.
Figure 79B:
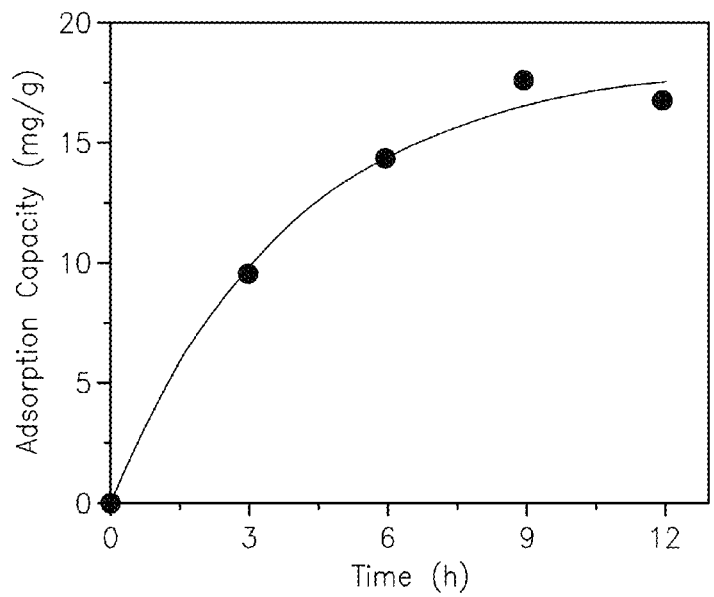

The molecular weight of BSA is 69.3 KDa, and pI in water is 4.7 at 25° C. The optical absorbance of 1 mg/mL is at 279 nm which could be determined by UV. The dimension of BSA is 4×4×14 $nm^3$. The adsorption capacity of BSA in the cellulose nanofiber membrane was measured batch wise. 0.328 g of cellulose nanofiber membrane was immersed in 10 mL BSA solution (1.0 mg/mL) in PBS (pH=7.2) on a shaking bed for 12 h. The amount of the BSA adsorbed on the membrane was calculated from the concentration change of the BSA solution before and after the adsorption determined by optical absorption at 280 nm. The BSA adsorptive capacity as the function of time was determined, as shown in FIGS. 79(a) and 79(b). After twelve hours, the concentration of BSA reaches to equilibrium and the adsorption of cellulose nanofiber membrane to BSA was saturated and the capacity of the adsorption reaches the maximum level at this conditions. The adsorption capacity in 1 mg/mL of BSA solution (pH=7.2) is approximately 16.8 mg/g membrane, excluding the PET substrate.

The recycling and reusing of cellulose nanofiber membrane was investigated by desorption of BSA adsorbed membrane in the elution buffer (PBS+2M NaCl, pH 11) for six hours under stirring. The membrane was then rinsed with DI water thoroughly. The BSA adsorption test described above was repeated to measure the amount of the BSA newly captured by the recycled membrane. The cycle was repeated twice for the same membrane to study the reusability of the membrane, as shown in Table 9 of BSA adsorption capacities of the recycled cellulose nanofiber membranes.

TABLE 9

| Recycle times | Adsorption capacity (mg/mL) |
|---|---|
| 0 | 16.8 |
| 1 | 14.9 |
| 2 | 15.4 |

Figure 80:
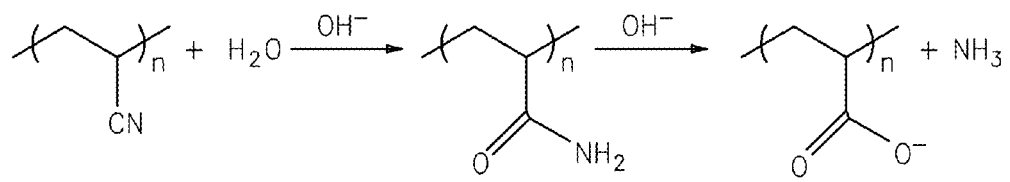
FIG. 80 shows hydrolysis of PAN E-spun membrane for the adsorption of viruses, according to an embodiment of the present invention.

PAN E-spun membrane was another good candidate for the adsorption of proteins because of the big surface area to volume as mentioned before. In order to introduce negative charges on the surface of PAN nanofibers, the membrane was treated by sodium hydroxide aqueous solution. The hydrolytic reaction occurred at the interface of the solid and the solution, thus those nitrile groups contacting the solution can be converted into carboxylic group, as shown in FIG. 80.

The PAN E-spun membrane was modified by immersion in 1 mol/L NaOH solution for five days. After modification, the membrane was thoroughly washed with water to remove the excess NaOH. The hydrolysis converted some of the surface nitrile to carboxylic groups. The number of carboxylic group increases with the time, the temperature, and the concentration of the NaOH solution The product is polyacrylamide and polyacrylic acid. Both are hydrophilic, and PAA is ionizable in water. Therefore, hydrolyzed PAN E-spun nanofibers can serve as virus-adsorbers.

While the invention has been shown and described with reference to certain embodiments thereof, it will be understood by those skilled in the art that various changes in form and detail may be made therein without departing from the spirit and scope of the invention as defined by the appended claims and their equivalents.

What is claimed is:
1. A method for producing a membrane, the method comprising steps of:
producing a coating layer having a non-woven structure format from polysaccharide nanofibers, wherein the polysaccharide nanofibers have diameters between 2 to 50 nanometers;
immersing an electrospun substrate having a non-woven structure format into a water-based solution; and
applying the coating layer to the electrospun substrate, wherein a gel barrier is formed at an interface between the electrospun substrate and the coating layer to slow diffusion of the coating layer into the electrospun substrate, and wherein nanofibers of the electrospun substrate have diameters greater than that of the polysaccharide nanofibers,
wherein the electrospun substrate is disposed on a non-woven support having microfibers with diameters greater than that of the nanofibers of the electrospun substrate,
further comprising heating the coating layer after application to the electrospun substrate to cross-link the polysaccharide nanofibers.

* * * * *